United States Patent
Zaloom et al.

(10) Patent No.: US 11,399,258 B2
(45) Date of Patent: Jul. 26, 2022

(54) SYSTEM FOR AUTOMATICALLY DETERMINING THE POSITION AND VELOCITY OF OBJECTS

(71) Applicants: George Zaloom, Pacific Palisades, CA (US); Alex Perez, San Francisco, CA (US)

(72) Inventors: George Zaloom, Pacific Palisades, CA (US); Alex Perez, San Francisco, CA (US)

(*) Notice: Subject to any disclaimer, the term of this patent is extended or adjusted under 35 U.S.C. 154(b) by 0 days.

(21) Appl. No.: 17/177,129

(22) Filed: Feb. 16, 2021

(65) Prior Publication Data

US 2022/0014874 A1 Jan. 13, 2022

Related U.S. Application Data

(63) Continuation-in-part of application No. 16/003,314, filed on Jun. 8, 2018, now abandoned.

(60) Provisional application No. 62/521,487, filed on Jun. 18, 2017.

(51) Int. Cl.
*H04W 4/02* (2018.01)
*H04W 4/029* (2018.01)
*H04W 4/80* (2018.01)

(52) U.S. Cl.
CPC .......... *H04W 4/027* (2013.01); *H04W 4/023* (2013.01); *H04W 4/029* (2018.02); *H04W 4/80* (2018.02)

(58) Field of Classification Search
None
See application file for complete search history.

(56) References Cited

U.S. PATENT DOCUMENTS

| | | | | |
|---|---|---|---|---|
| 7,340,260 | B2* | 3/2008 | McAlexander | G01S 19/48 455/457 |
| 9,049,545 | B2* | 6/2015 | Duggal | H04M 3/42357 |
| 10,650,621 | B1* | 5/2020 | King | H04L 67/12 |
| 10,721,730 | B2* | 7/2020 | Bolin | H04W 72/0446 |
| 2002/0077124 | A1* | 6/2002 | Hunzinger | H04W 64/00 455/457 |
| 2007/0287473 | A1* | 12/2007 | Dupray | H04W 4/029 455/456.1 |

(Continued)

*Primary Examiner* — Muhammad Adnan
(74) *Attorney, Agent, or Firm* — Keith Swedo

(57) ABSTRACT

A ground-based wireless system named the Autonomous Transceivers Positioning System ("ATPS"), performs complete autonomous tracking of multiple moving objects and determines position and velocity components (speed and direction) of a moving object, or the stationary position of an object. For a moving object, the ATPS provides position determination, with accuracy of several centimeters, and velocity determination with an accuracy of centimeters per second. The ATPS tracks the position of multiple objects simultaneously and continuously for as long as the object(s) reside within the workspace of the ATPS wireless system. The ATPS is expandable in its workspace continuously by allowing for tracking information to be autonomously handed over to new added sections of the ATPS. The ATPS contains RFID inspired components including advanced multiple fixed location Autonomous Wireless Interrogators ("AWIs") within the defined workspace of the system and multiple Autonomous Wireless Responders ("AWRs") affixed to the moving and/or stationary objects.

5 Claims, 43 Drawing Sheets

(56) References Cited

U.S. PATENT DOCUMENTS

| | | | |
|---|---|---|---|
| 2008/0136775 A1* | 6/2008 | Conant | G06F 3/014 345/156 |
| 2008/0143482 A1* | 6/2008 | Shoarinejad | G01C 21/00 340/8.1 |
| 2010/0159958 A1* | 6/2010 | Naguib | H04W 24/04 455/457 |
| 2010/0159986 A1* | 6/2010 | Lewis | H04M 1/72412 455/557 |
| 2011/0060600 A1* | 3/2011 | Fox | H04W 4/02 340/572.1 |
| 2011/0281550 A1* | 11/2011 | Peabody | G08B 25/001 455/404.2 |
| 2012/0058775 A1* | 3/2012 | Dupray | G01S 5/0257 455/456.1 |
| 2013/0030931 A1* | 1/2013 | Moshfeghi | G01S 5/0009 705/16 |
| 2013/0285855 A1* | 10/2013 | Dupray | G01S 19/48 342/451 |
| 2013/0344842 A1* | 12/2013 | McDonald | H04W 4/90 455/404.2 |
| 2014/0145828 A1* | 5/2014 | Bassan-Eskenazi | G06K 7/10297 340/10.1 |
| 2014/0155086 A1* | 6/2014 | Bhatia | H04L 67/2842 455/456.1 |
| 2014/0210662 A1* | 7/2014 | Hatami | G01S 19/48 342/450 |
| 2016/0234342 A1* | 8/2016 | Oonk | H04Q 9/00 |
| 2016/0255471 A1* | 9/2016 | Marri Sridhar | H04W 56/006 455/456.2 |
| 2016/0259061 A1* | 9/2016 | Carter | G01S 19/14 |
| 2017/0103440 A1* | 4/2017 | Xing | G06Q 30/0633 |
| 2018/0035258 A1* | 2/2018 | Pon | H04W 40/005 |
| 2018/0084374 A1* | 3/2018 | Jain | G01S 19/09 |
| 2019/0007377 A1* | 1/2019 | Bender | H04L 51/32 |
| 2019/0066504 A1* | 2/2019 | Zaloom | G08G 1/144 |
| 2019/0213368 A1* | 7/2019 | White | G06K 7/10099 |
| 2020/0120450 A1* | 4/2020 | Lee | H04W 4/48 |
| 2020/0128359 A1* | 4/2020 | Patil | H04W 84/005 |
| 2020/0187150 A1* | 6/2020 | Eisner | H04W 76/50 |

* cited by examiner

Fig 31. PVD Data Generation within the Designated GBT

Fig 32. Data Generation within the 3 Non-Designated GBTs

Fig. 38

Mobile Position Data handling and memory operations words. Control flow operations

| | Operation | Frame IO (message type) | Source Address | Destination Address | Length of Frame | | Op Sequence | Parity | |
|---|---|---|---|---|---|---|---|---|---|
| Word 1 | Operation | Frame IO (message type) | Source Address | Destination Address | Length of Frame | R# TTF_RFID# | Op Sequence | Parity | 845 |
| Word 2 | Operation | Frame IO (message type) | Source Address | Destination Address | Length of Frame | R# TOA_GBT# | Op Sequence | Parity | 850 |
| Word 3 | Operation | Frame IO (message type) | Source Address | Destination Address | Length of Frame | R# TTL_RFID# | Op Sequence | Parity | 855 |
| Word 4 | Operation | Frame IO (message type) | Source Address | Destination Address | Length of Frame | R#_SSRFID# | Op Sequence | Parity | 860 |
| Word 5 | Operation | Frame IO (message type) | Source Address | Destination Address | Length of Frame | TOA_Ping# to RFID# | Op Sequence | Parity | 865 |
| Word 6 | Operation | Frame IO (message type) | Source Address | Destination Address | Length of Frame | AN_RFID# | Op Sequence | Parity | 870 |
| Word 7 | Operation | Frame IO (message type) | Source Address | Destination Address | Length of Frame | RFID# | Op Sequence | Parity | 875 |
| Word 8 | Operation | Frame IO (message type) | Source Address | Destination Address | Length of Frame | GBT# | Op Sequence | Parity | 880 |

*Descriptions*

R# time of transmission from RFID = R# TTF_RFID#     R# signal strength from RFID# = R#_SS_RFID#     RFID ID # = RFID#
R# time of arrival at GBT# = R# TOA_GBT#     Time of arrival (TOA) of Ping# to RFID# = TOA_Ping# to RFID#     GBT# ID # = GBT#
GBT# time to launch ping1 to RFID# = R# TTL_RFID#     Angle of RFID# = AN_RFID#     GBT# Coordinates = GBT#XY Mobile Position Data handling and memory operations words. Control flow operations (Cont)

| Word 9 | Operation | Frame IO (message type) | Source Address | Destination Address | Length of Frame | GBT#XY | Op Sequence | Parity | 885 |

| Word 10 | Operation | Frame IO (message type) | Source Address | Destination Address | Length of Frame | Ti = time of signal arriving at GBTi from mobile | Op Sequence | Parity | 890 |

| Word 11 | Operation | Frame IO (message type) | Source Address | Destination Address | Length of Frame | Di = distance between mobile and GBTi | Op Sequence | Parity | 895 |

Fig. 38

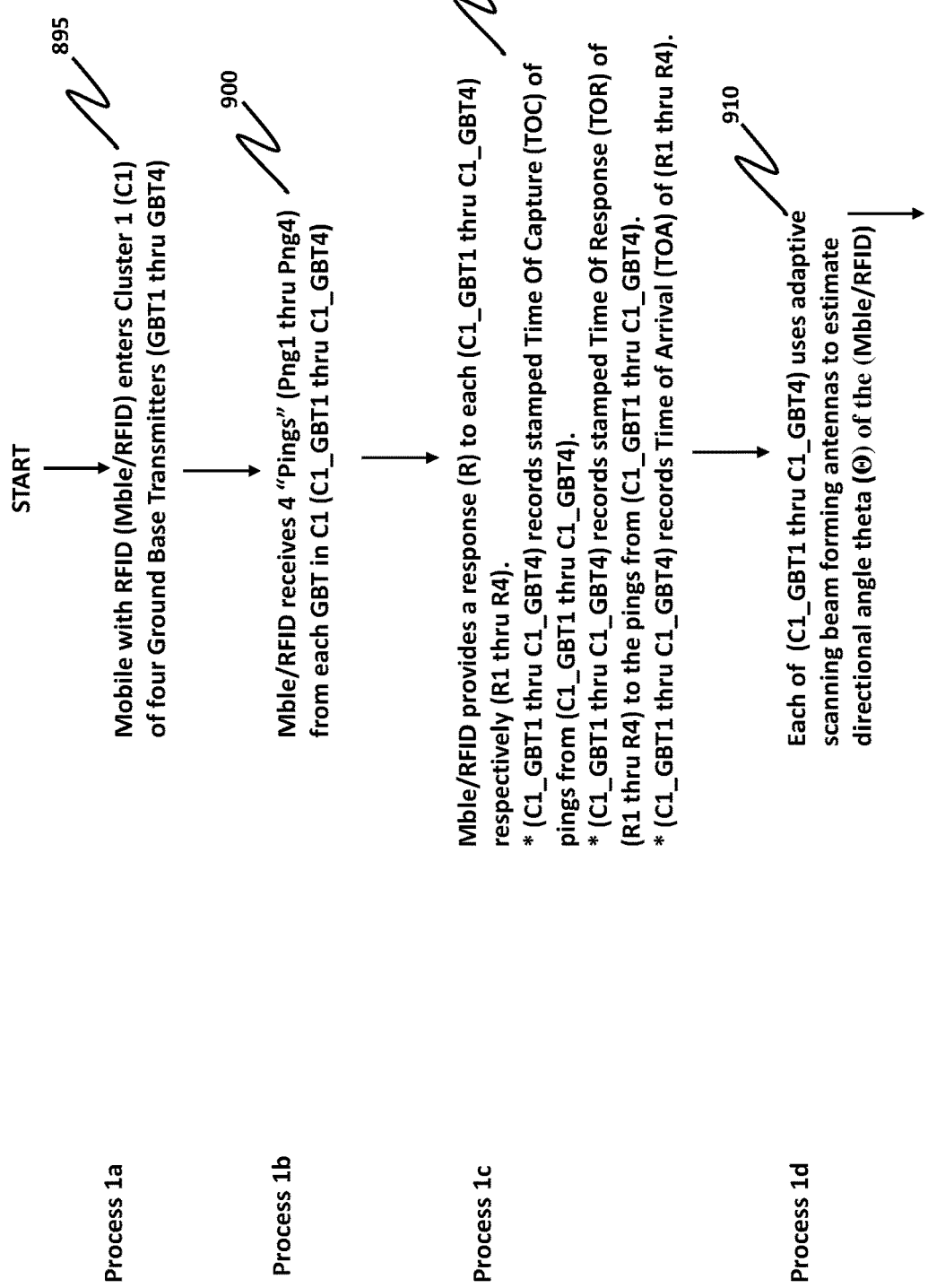

Signal Acquisition, Signal Processing, Signal Handover, and Tracking of Mobile (Cont.)

Fig. 39

Process 2a

Each (C1_GBT1 thru C1_GBT4) sends their own TOR & TOA data to each other via a process called managed transmission (MT). The following MT occurs: — 915

- MT2T1/MT1T2 = managed transmission between GBT2 and GBT1.
- MT2T3/MT3T2 = managed transmission between GBT2 and GBT3.
- MT2T4/MT4T2 = managed transmission between GBT2 and GBT4.
- MT3T4/MT4T3 = managed transmission between GBT3 and GBT4.
- MT1T4/MT4T1 = managed transmission between GBT1 and GBT4.
- MT1T3/MT3T1 = managed transmission between GBT1 and GBT3.

Process 2b

Each of (C1_GBT1 thru C1_GBT4) compares its own TOA with the TOA from the other three GBTs. If its own TOA is shorter than the other three TOAs, it assumes control of C1, and such GBT becomes the *Designated Ground Based Transmitter* (D_GBT) of C1, or C1_D_GBT. The C1_D_GBT provides notification to the other three GBTs that it has assumed control of C1. It its own TOA is not the shortest, each GBT goes into idle mode and waits the arrival of the C1_D_GBT signal. Communications among (C1_GBT1 thru C1_GBT4) for selection of D_GBT is done via a dedicated channel. — 920

Fig. 39

Signal Acquisition, Signal Processing, Signal Handover, and Tracking of Mobile (Cont.)

Process 2c

The C1_D_GBT from (C1_GBT1 thru C1_GBT4) assumes also the responsibility of handover by transferring the tracking of the Mble/RFID from C1 to the next cluster, cluster 2 (C2) —925

Process 2d

Position Determination of Mble/RFID. Velocity Determination —930
(Step 1): The C1_D-GBT "Pings" the other three (3) GBTs (from C1_GBT1 thru C1_GBT4) to coordinate Mble/RFID position determination. Upon the "Pings", each of non-C1_D-GBT (from C1_GBT1 thru GBT4) calculates position (Di) of the mobile, where i = 1 thru 3, and where "i" is a non-C1_D-GBT. Also calculated is the Ti (needed to calculate Di) which is the TOA at a non-C1_D-GBT.
(Step 2) The C1_D_GBT requests position (Di) and velocity information from each non-C1_D-GBT (from C1_GBT1 thru C1_GBT4).
(Step 3) The C1_D_GBT performs position triangulation of the Mble/RFID and calculates position of the mobile (Xm, Ym). It further calculates velocity of Mble/RFID (Vm), where Vm = $\Delta Dm/\Delta Tm$ where $\Delta Dm = (\Delta Xm, \Delta Ym)$ and $\Delta Tm = \Delta TOA$ for $(\Delta Xm, \Delta Ym)$

Fig. 39

Signal Acquisition, Signal Processing, Signal Handover, and Tracking of Mobile (Cont.)

Process 3a

As the Mble/RFID moves from C1 to C2, the C1_D_GBT starts experiencing a continuous loss of signal strength. When a threshold is reached the C1_D_GBT starts the process of handling over the tracking of the mobile to a D_GBT in C2, or C2_D_GBT. The handover process has the following steps: — 935

(Step 1): C1_D_GBT provides signal strength of Mble/RFID to all (C2_GBT1 thru C2_GBT4).

(Step 2): Each (C2_GBT1 thru C2_GBT4) compares the received Mble/RFID signal strength from Step 1 to its own allowed signal strength threshold.

(Step 3): When received signal strength from Mble/RFID reaches minimum threshold for each (C2_GBT1 thru C2_GBT4), each (C2_GBT1 thru C2_GBT4) provides an acknowledge response to C1_D_GBT.

(Step 4): Upon receiving the acknowledge response from each (C2_GBT1 thru C2_GBT4), C1_D_GBT commands each (C2_GBT1 thru C2_GBT4) to start sending "Pings" to Mble/RFID.

(Step 5) Each (C2_GBT1 thru C2-GBT4) starts providing "Pings" to Mble/RFID.

(Step 6): C1_D_GBT releases control of Mble/RFID.

(Step 7): Repeat Process 1b thru Process 2d for C2.

940 — Repeat Process 1b thru Process 3a as mobile goes to Cluster 3 and beyond other consecutive clusters. ⟶ END — 945

SYSTEM FOR AUTOMATICALLY DETERMINING THE POSITION AND VELOCITY OF OBJECTS

CROSS-REFERENCE TO RELATED APPLICATIONS

The present application claims priority to U.S. provisional patent application Ser. No. 62/521,487, filed on Jun. 18, 2017, entitled "System for Location Determination Using advanced RFID Technology," which is hereby incorporated by reference in its entirety. The present application also claims priority to, and is a continuation-in-part of, U.S. nonprovisional patent application Ser. No. 16/003,314, filed on Jun. 8, 2018, entitled "System for automatically determining the position and velocity of objects," which is hereby incorporated by reference in its entirety.

BACKGROUND

Over many years now the desire to know the position of a mobile object has been the subject of research, publications, patents, and development of intellectual property and trade secrets. The early efforts in position knowledge were limited by technology. The tools for the knowledge of position determination are mostly of "static" nature. That is, the position of a mobile object (which may herein be referred to as a "mobile") is known at a specific time and place after some measurements are made. After a certain length of time has elapsed, measurements are taken again, and the new position of the mobile is recorded. An example of static measurements for position determination is that of imaging satellites, which are still widely used today. Using an imaging satellite, the location and characteristics of a certain target are acquired when the satellite passes over the target, and are acquired again when the satellite passes over the target a few hours later. The motion of the target, if any, is then measured by correlating the previous and after images to determine the target displacement.

Much more recent technology for tracking the positioning and movement of targets has been in the form of RFID technology. U.S. Pat. Nos. 8,629,762, 8,838,135, 8,842,013, 8,866,615, 9,291,699, 9,332,394, 9,338,606, 9,472,075, and 9,619,679 are based on RFID technology. Using RFID technology, the moving object is first affixed or tagged with a passive tag and the object movement is then tracked using active RFID tags located at strategic locations throughout a workspace of interest where the object will move about. This is considered a "dynamic" positioning determination. As the objects moves along, and the passive RFID transceivers communicate with the active RFID transceiver, the locations of the objects are registered. Only through the dynamic interlocking of communications between the RFID transceivers can the positions of moving objects can be known. Many of previously filed and issued patents use different techniques or modalities of dynamic position determination. Another example of dynamic positioning technology is in the use of laser technology (U.S. Pat. Nos. 8,565,913 and 9,360,300). Other previously filed and issued patents disclose developing technologies that make different attempts at methods for position determination using a combination of existing technologies such a mobile computing (U.S. Pat. Nos. 9,043,069, 9,177,476), parking technology (U.S. Pat. Nos. 8,395,968, 9,064,414, 9,123,034), and a variety of sensors, radars, range finders, communications devices such as cell phones and other handsets, navigational aids, and other RF transmission devices (U.S. Pat. Nos. 8,284,100, 8,428,913, 8,442,482, 8,725,416, 8,929,913,8954292, 9071701, 9094816, 9339990, 9295027, 9369838, 9373241, 9386553, 9485623, 9641978, 9734714, 6501955, 5379047, 6021371, 7489240, 6907224, 9749780 and others).

Presently, the most advanced and most popular positioning determination method for mobiles or stationary objects is the Global Position System (GPS) as shown in U.S. Pat. Nos. 8,478,299, 9,274,232, and 9,612,121. GPS is categorized herein as a "continuous" positioning determination method, and it has been available to the public for several years now. Continuous position determination means that an object with GPS technology can be continuously tracked and its position can be determined without any elapsed time if the object can continuously receive GPS signaling from GPS satellites. Therefore, for GPS technology, continuous tracking is dependent on the uninterrupted availability of GPS received signals.

Current geo positioning applications such as GPS, rely on four satellites to triangulate their location. For the most part, these systems return accurate results except when operating within the cement canyons of densely populated cities and geographic obstructions. In densely populated cities, buildings' "shadows" make it difficult for the Global Navigation Satellite Systems (GNSS) to perform accurately. Without continuous direct received signals from four or more GPS satellites, a precise positioning cannot be determined.

The positional accuracy of a GPS system, assuming no fading and multipath, is on the order of 15-30 feet. In congested structural environments GPS signals have troubles being acquired. The technology for position determination using GPS is based on the time of arrival (TOA) and the time of reception (TOR) of the GPS signal by the GPS receiver and the triangulation of the four GPS received signals. There can't be any lapse in TOA and TOR if continuous position determination is desired.

To compensate for the deficiencies in signal coverage due to physical obstructions in the environment, and to improve the accuracy of GPS positioning technology, a strategy known as "differential GPS" is used, where corrections are made to the measurements by a mobile receiver (user) by using as reference the measurements done by the nearest fixed GPS base station using the same four GPS satellites.

In a cellular phone system where mobiles (e.g., people) are equipped with cellular technology and the cellular technology is equipped with GPS receivers, as the mobile object moves, the GPS differential position of the mobile unit also moves. The mobile unit can move through an extensive route and the cell towers will track the GPS position along the route. The "hand-over" of the tracking from one cell tower to the next occurs when the signal strength received at one tower decreases as the signal strength received at another tower increases. There is continuous communication among the towers as the hand-over occurs.

However, even with all the advances in GPS positioning technology, GPS can only perform the function of a "beacon" in space. To the user, GPS positioning is nothing more than an electrical beacon overlaid on a geographic information system (GIS) map on the user's mobile device (e.g., the GIS of a Google map on a cellular phone). The only reason this beacon is successfully tracked is because of cellular technology. The two technologies (GPS and cellular) are unrelated, even though they complement each other concerning the subject of positioning.

Therefore, there is a need for a more accurate determination of positioning (presently between 15 to 30 feet as provided by GPS) for a mobile system. It would be ideal to determine the position of an object or a mobile accurately to within several inches or centimeters of uncertainty. A much more accurate position determination of mobiles is needed to: a) avoid collisions among mobiles, b) enable the mobiles to avoid obstacles in their paths, c) enable the mobiles to navigate autonomously. If there is a need for autonomous movement for a mobile (e.g., Google car) there needs to be a great accuracy in the knowledge of mobile location, d) enable the mobile to navigate in congested physical environments and yet be able to distinguish among the paths of different mobiles, and e) enable the mobiles to not always rely on GPS technology, especially when GPS signaling is not available or is being obstructed. It would also be of great advantage for mobiles to decrease their dependency on the effects of shadow issues (e.g., multipath and fading) which are common and obstruct GPS positioning.

There is also a need to establish data communications with the mobile system while the mobile is being tracked, a capability not available in GPS positioning since GPS signaling behaves only as an electronic beacon. For example, an airborne drone can be accurately tracked by a futuristic non-GPS system while at the same time the futuristic non-GPS system can get information about the drone's flight path and the status of its instrumentation. This futuristic system can also provide information to the drone such as in the form of commands or telemetry information.

There is even a foreseen need, which can also be realized, for mobiles to communicate with each other, and within the framework of inter-mobile communications. Furthermore, there is a foreseen need for mobiles to know not only their own position (known as absolute positioning), but also the position of the other neighboring mobiles circulating nearby (i.e., the concept of relative positioning) within a prescribed distance. Finally, there is a foreseen need to measure the speed and relative direction of motion of the mobiles. These three additional capabilities, inter-mobile communication, relative positioning, and velocity components, are not presently available in GPS or any other positioning technology, but they are highly desirable for the technological future of mobile systems.

SUMMARY

The present invention may include an autonomous transceiver positioning system (ATPS) which provides a ground-based autonomous wireless system that accurately determines the position of a moving or stationary object. For a moving object, the ATPS may provide position determination with an accuracy of several centimeters. The ATPS may also provide velocity (speed and direction) determination for a moving object. For a stationary object, the ATPS may provide position determination with an accuracy of several centimeters. The ATPS may be able to track the positions of multiple objects simultaneously and continuously within a defined workspace. The ATPS may include multiple autonomous wireless interrogators (AWIs) on fixed ground locations within a defined space of interest and multiple autonomous wireless responders (AWRs) affixed to the moving and/or stationary objects. The ATPS may use an advanced form of RFID inspired technology such that the AWIs may be able to determine, via hardware and software implementation, the position and tracking of multiple AWRs, and the AWRs may be able to communicate with multiple AWIs. The ATPS may also enable the AWRs to inter-communicate among each other using the AWIs, and the AWIs themselves can also inter-communicate with each other. Therefore, the ATPS may behave as a closed loop system. The coverage of the ATPS is only limited by the numbers of AWIs available and their coverage, and therefore can be expanded to suit an application. Therefore, the coverage of the ATPS is dependent on the coverage of the AWIs. The ATPS, though essentially a closed loop, also has external access points for different external interfaces. These external interfaces enable the ATPS to access the world wide web (WWW) and other future forms of external sources of information.

The ATPS may be an autonomous wireless system that is intentionally deterministic from its creation. All the elements of the ATPS may be for determining the accurate location and tracking of an object in a confined space (also known as a workspace). In the ATPS, location is not determined from the manipulation of incidental knowledge that is available from other existing technologies, including wireless, which serve other purposes. Rather, the ATPS uses advanced technologies to develop new approaches for position determination, which means that all the elements of the technology may be specifically designed for position determination.

The ATPS has the capability of locating and tracking the position of multiple objects (AWRs) simultaneously as they move. In addition to position determination, the ATPS can also track simultaneously the direction of motion of multiple objects and the speed of multiple objects. The number of objects that ATPS can track is limited only by the number of wireless AWIs available in the defined space.

A capability of the ATPS is that the system can facilitate large amounts of data exchanges within a closed loop consisting of AWIs and AWRs. That is, the AWRs being tracked can exchange data among themselves through the wireless AWIs which are tracking the AWRs. In the simplest form, this data exchange consists of information revealing the relative position of one AWR with respect to other AWRs and the velocity vectors for each of the AWRs. Larger volumes of data exchanges can also be achieved among the AWRs and among AWIs. For example, larger data exchanges can be used for providing diagnostics, instructions & commands, and many other types and information with uses that are consistent with the potential different applications.

The AWIs may have nine major sub-systems, and each subsystem may be on a different respective electronic board. All the boards in the AWIs may be interconnected and may include: a) a transceiver sub-system to communicate with AWRs (the transceiver sub-system may also include a GPS receiver); b) a microprocessor-based sub-system to process data, commands, and implement embedded software algorithms; c) a positioning electronic board including electronics responsible for calculating the position and velocity of the AWR transceiver, and having ASIC and FPGA electronics in addition to interface electronics; d) a digital signal processing sub-system to process analog and digital data; e) power supply and power distribution; f) memory; g) an interfaces board to account for multiple interfaces such as remote access, hardware testing, antennas, and externally- and internally-generated data; h) antennas and their feed network; and i) embedded software.

There are many potential applications of the ATPS, but the most significant one is in autonomous vehicles (e.g., airborne drones and self-drive automobiles). Other potential applications include data off-loading from autonomous vehicles, smart parking, guidance of pedestrians with disabilities, social mobile gaming applications where game-play is dependent upon precise geo-location, delivery tracking, emergency services, cell phones and many other applications.

The ATPS is a ground-based wireless electronic system with advanced electronic hardware which uses advanced RFID inspired modes (interrogating and responding) of operation. The system includes autonomous wireless transceivers electronics known as interrogators (AWIs). Multiple interrogators (AWIs) work in an ensemble mode to track the position and velocity components (speed and direction) of any object (mobile or stationary) which is equipped with another type of autonomous wireless transceiver electronics known as responders (AWRs). AWIs are stationary and can simultaneously track multiple AWRs. A variety of beamforming antennas and smart antennas are used on the AWIs. In some embodiments omnidirectional antennas are used for AWRs. The number of AWRs that can be tracked is only limited by the number of AWIs available. AWIs are capable of autonomously communicating with each other. AWRs can autonomously communicate with several AWIs. Position and velocity components of AWRs can be accurately measured in cm and cm/sec respectively. A defined workspace for the tracking of AWRs is defined by the number of AWIs available. As the AWRs move through the defined workspace, the AWIs have the capability of autonomously transferring (or handing over) to other AWIs the tracking of AWRs that move within AWIs' workspace. Therefore, the AWRs are always being tracked, but the responsibility of tracking the AWRs changes from previous AWIs to newer AWIs that are closer to the AWRs as the AWRs move along.

The ATPS electronic system described above may enable AWIs to determine the position and velocity of individual AWRs. The AWIs also may be capable of determining the relative position and velocity of AWRs with respect to other AWRs.

The ATPS can facilitate data exchanges within a closed loop consisting of AWIs and AWRs. For example, the AWRs being tracked can exchange data among themselves through the wireless interrogators (AWIs) which are tracking them.

The AWIs in the ATPS may have nine major sub-systems, with each subsystem being represented by an electronic board. All the boards in the AWIs may be interconnected: a) transceiver sub-system to communicate with AWRs. The transceiver also contains a GPS receiver, b) a microprocessor based sub-system to process data, commands, and implement embedded software algorithms, c) the positioning electronic board is the electronics responsible for calculating the position and velocity of the AWR transceiver. It is composed of ASIC and FPGA electronics in addition to interface electronics, d) a digital signal processing sub-system to process analog and digital data, e) power supply and power distribution, f) memory, g) interfaces board to account for multiple interfaces such as remote access, hardware testing, antennas, and external and internal-generated data, h) antennas and their feed network, and i) embedded software.

The ATPS may include certain elements of the embedded software that are of artificial intelligence nature.

The AWRs in the ATPS may have three major components: a) a transceiver system to communicate with AWIs, b) microcontroller system, and c) antennas. The AWRs may be battery powered. Batteries may last about one year on average.

The AWIs in the ATPS may include electronics such as ASICs, FPGAs, control electronics, telemetry, data manipulation, processing and handling, memory management, data storage, smart antennas, and PLC. These electronics are used for all eight major subsystems.

The AWIs in the ATPS may be matched with installation fixtures which enable AWIs to be installed on many types of vertical and horizontal surfaces.

The AWRs in the ATPS may be matched with installation fixtures which enable AWRs to be installed on many types of vertical and horizontal surfaces.

The AWIs in the ATPS may be able to simultaneously track the motions of AWRs up to 100 meters away. The AWIs can track hundreds of AWRs simultaneously.

The AWIs may be approximately the size and shape of a half-gallon milk carton. The AWRs may be the size of, or slightly larger than, a credit card.

The ATPS electronic system can be configured to track the motion of objects in the form of airborne and/or terrestrial autonomous mobile devices. This configuration consists in equipping the mobile devices with AWRs electronics. The AWRs may serve as active tags in the mobile devices moving within the AWIs workspace.

In the ATPS the AWRs may also have passive tags.

The ATPS electronic system may be configured to accurately track the motion of AWRs as they move through the AWIs workspace. As AWRs move away from some AWIs and move closer to other AWIs in the workspace, the task of tracking the AWRs is autonomously handed over from those AWIs farther away to those AWIs closest to the AWRs (the AWIs closest to the AWRs may be those AWIs experiencing higher signal strength when communicating with AWRs). A series of software driven algorithms embedded in all AWIs may be responsible for the handing over process.

Several AWIs in the ATPS electronic system may be connected to the internet. The number of AWIs connected to the internet may be correlated to the size of the AWIs workspace and to the specific application of that workspace. The connection to the internet may be via Wi-Fi signals. Communications among the AWIs may be accomplished via WiMAX, Wi-Fi or W-Fi-direct depending on the availability to the AWIs workspace to access such modes of communications. The communication link between AWIs and AWRs may be at 3.2 GHz.

The AWIs in the ATPS can be remotely accessed for programming and set-up purposes to tailor their functions to the requirements and environments of the AWIs' given workspace.

In certain embodiments of the ATPS, AWIs and AWRs can use different types of directional and omnidirectional antennas instead of smart antennas or in addition to smart antennas. Using directional and omnidirectional antennas may require an increase in the number of AWIs, and this approach may cause an increase in the number of these antennas as well as change in the location and velocity calculations algorithms. Using directional and omnidirectional antennas may also decrease the overall implementation costs. For example, if velocity calculations are not required and only location position is required, smart antennas may not be needed.

In certain embodiments of the ATPS, the AWRs architecture can be a passive tag with no electrical interfaces and only a microcontroller unit instead of a microprocessor-based system. This approach requires only minimum data exchange between AWIs and AWRs.

In certain embodiments of the ATPS, the ATPS can be integrated with cell phone tower base stations where the cell tower accommodates an additional set of antennas for the AWIs, and the cell base station integrates with the additionally needed AWIs electronics.

In certain embodiments of the ATPS, the ATPS workspace can be aggregated in the form of clusters, as in cell phone towers communications, and where communications among the AWIs can be handed over among clusters. This approach may be greatly facilitated if AWIs' locations are as described in the immediately preceding paragraph.

In certain embodiments of the ATPS, the AWRs can be integrated as a feature in cell phones.

In certain embodiments of the ATPS, the location of AWIs within their workspace can be any fixed location that can accommodate solar power or power provided by public utility companies.

The AWIs in the ATPS can communicate and provide data exchange with non-autonomous (e.g., manned) entities which the AWIs may access remotely.

All AWIs in the ATPS may have GPS capability. In certain embodiments some AWRs may have GPS capability.

In certain embodiments of the ATPS, the AWIs and AWRs can not only be used in open spaces but also in closed spaces, such as in parking structures and inside buildings.

In certain embodiments of the ATPS, the locations of the AWIs can be off-ground and the AWRs can be airborne.

The ATPS can be habilitated for many applications such as autonomous vehicles like airborne drones and self-drive automobiles, data off-loading from autonomous vehicles, smart parking, pedestrians with disabilities, social mobile gaming applications where game-play is dependent upon precise geo-location, delivery tracking, emergency services, cell phones and many other applications that require accurate tracking and position determination.

In one embodiment, the invention comprises an arrangement for determining a position of an object within a space. The arrangement includes a first wireless transceiver carried by the object and transmitting a signal including time information. At least four second wireless transceivers are fixedly mounted within the space. Each of the second wireless transceivers receives the signal. At least one of the second wireless transceivers calculates a position of the object based upon the time information and respective times at which each of the second wireless transceivers receives the signal.

In another embodiment, the invention comprises an arrangement for informing a moving object of its position within a space. The arrangement includes a first wireless transceiver carried by the moving object and transmitting a first signal including time information. At least four second wireless transceivers are fixedly mounted within the space. Each of the second wireless transceivers receives the first signal. At least one of the second wireless transceivers calculates a position of the object based upon the time information and respective times at which each of the second wireless transceivers receives the first signal. At least one of the second wireless transceivers transmits a second signal to the moving object indicative of the calculated position of the object.

In yet another embodiment, the invention comprises an arrangement for managing occupancy of a parking area by vehicles each carrying a first wireless transceiver. The arrangement includes at least four earthbound second wireless transceivers associated within the parking area. Each of the second wireless transceivers receives a respective first signal from each of the vehicles occupying the parking area. Each of the first signals includes time information. An electronic processor is communicatively coupled to the four earthbound second wireless transceivers and calculates a respective position of each of the vehicles occupying the parking area based upon the time information and respective times at which each of the second wireless transceivers receives the first signal. It is determined which parking spaces of a plurality of parking spaces within the parking area are occupied by the vehicles. The determining is based on the calculated positions of each of the vehicles occupying the parking area.

When the ATPS is designed for ground system (i.e. ATPS-Ground), an AWI is renamed a Ground-Based Transceivers (GBT) and an AWR is renamed as the mobile-with-RFID-active-tag or mobile/RFID for short.

In certain embodiment, the ATPS-Ground is composed of multiple clusters of four (4) GBTs each. The GBTs are identical in design. The GBTs will track the motion of mobiles/RFID within a cluster and provide further capabilities for the tracking of the mobiles/RFID as they move from one cluster to the next cluster. As the mobiles/RFID move from cluster to cluster they can communicate with GBTs and also with external wireless devices via Wi-Max, Wi-Fi, 5G, etc. The GBTs within a cluster exchange mobile/RFID information with each other as the mobile moves within a cluster and such tracking information is handed over to the next cluster as the mobile/RFID moves into the next cluster.

In certain embodiment, the mobile/RFID responds quickly to the Pings from each of the four (4) GBTs within a cluster. Timing information received from both, the mobile/RFID and the GBTs, is used to calculate the distance from each GBT to the mobile/RFID on a continuous basis as the mobile/RFID moves through the clusters of four (4) GBTs. The timing data is also used to calculate the coordinates of the mobile/RFID on a continuous basis. Within each cluster of four (4) GBTs, and based on timing data, one of the GBTs within a cluster assumes a commanding role over the other three (3) GBTs of the cluster. The commanding GBT, to be named the designated GBT, will carry the responsibility of handing over the tracking of the mobile/RFID to the following cluster and will perform some of the most crucial measurements concerning the mobiles/RFID, such as the coordinates of the mobile/RFID, the mobile/RFID velocity, and the relative velocity of the mobile/RFID with its nearest neighbor.

Using the timing information acquired by the GBTs, the position of the mobile/RFID, the velocity of the mobile/RFID, and the relative velocity of the mobile/RFID with its nearest neighbor is accomplished by a complex design of four (4) field programmable gate arrays (FPGAs), a digital signal processing (DSP) interface block, and two (2) processors. The four processors are named as followed: (a) the main processor, and (b) the application processor. The four FPGA are named as followed: (a) master controller, (b) external input controller, (c) position and velocity determination hybrid system (PVD-HS), and (d) the App processor interconnect. The complex design also incorporates three (4) SRAM architectures named as followed: (a) the PVDS-HS, (b) the FPGA controller, (c) the FPGA-App processor, and (d) the external input controller SRAM memory.

The position of the mobile/RFID, the velocity of the mobile/RFID, and the relative velocity of the mobile/RFID with its nearest neighbor can also be accomplished by using beam forming antennas arrays in each of the ground-based transceivers (GBTs). The beamforming antennas can calculate the angle of arrival (AOA) between the mobile/RFID and the antenna array. The AOA can be used to calculate the coordinates of the mobile/RFID but such will be a secondary capability since the coordinates of the mobile/RFID can be more accurately determined from timing measurements analyzed by the PVD-HS.

In certain embodiment external commands and external networking (e.g. Wi-Fi, Wi-Max, 5G) can be interfaced with a GBT. Such interface has its own FPGA controller, memory and interface circuitry. The interface circuitry connects to the main bus (known as system bus) within a GBT. Likewise, all data generated within a GBT can be externally interfaced to a PCI bus for information, testing or troubleshooting purposes. Therefore, each GBT and its internal electronics can be externally interface to receive data and/or transmit data.

The tasks for position of the mobile/RFID, the velocity of the mobile/RFID, and the relative velocity of the mobile/RFID with its nearest neighbor can be accomplished with FPGA designs and multiprocessors assistance. The FPGA designs perform mathematical operations embedded in the hardware for maximum speed and accuracy. The multiprocessors perform data flow management and some final mathematical operations. The combined approach is a way to maximize data gathering and processing for constantly tracking services of multiple mobiles/RFID.

The four (4) BGTs in a cluster are identical in design and functional capabilities but only one ground-based transceiver (GBT) can become the designated (D) GBT, i.e. D_GBT. The D_GBT controls the functions of the remaining three (3) GBTs in a cluster while the mobile/RFID moves through the cluster. The GBT closest (in distance) to the mobile/RFID when the mobile/RFID enters the cluster becomes the D_GBT. The distance is determined by timing analysis of the signals between the GBTs and the mobile/RFID. The choice of which GBT is the D_GBT is mandated by the GBT which has the lowest response time (i.e. the time it takes for the acknowledge signal (response) from the mobile/RFID to travel between the mobile/RFID and each GBT when the mobile/RFID get pinged by the four (4) GBTs). For each GBT, the timing data is first processed by the DSP block which received the information from the RF subsystem. The main processor and the PVD-HS perform the data management which calculates the lowest response time. The lowest response time data is sent out via the DSP block and the RF-subsystem to each GBT. One GBT becomes the "winner" and becomes the D_GBT when it informs the other GBTs that such GBT is closest to the mobile/RFID that just entered the cluster.

Timing analysis of the signals being received and transmitted by the mobile/RFID, as well as the timing analysis of the signals being transmitted and received by the ground-based transceivers (GBT) is performed by FPGAs which have been designed to perform multiple analytical and arithmetic operations. Separate FPGAs are also designed to perform control functions for the analytical and arithmetic operations being performed. More advanced operations related to position determination and vector velocities of the mobile are performed by microprocessor working in conjunction with the FPGAs.

The GBT design contains interface circuits to access data transport venues which allow the data to be sent externally and internally. There is interface circuitry design to send the raw timing data to any applicable non-wireless (i.e. dedicated hardwired) external application. The raw timing data can be used for analyzing data quality, data errors, data integrity, diagnostics, troubleshooting, and for other independent analyses. There is interface circuitry design to allow timing data to be sent via a system bus. The system bus communicates essentially with all the major data generation center within the GBT. There is interface circuitry to allow external wireless links (Wi-Fi, Wi-Max, 5G, etc.) to be connected directly with the system bus. The external links allow for timing information and other data being generate to be sent wirelessly for other applications.

BRIEF DESCRIPTION OF THE DRAWINGS

The novel features of the invention are set forth in the appended claims. However, for purpose of explanation, several embodiments of the invention are set forth in the following figures.

FIG. 38. Provides formatting details of the 10 words described in FIG. 31 and FIG. 32.

FIG. 39. Sequence of steps (known as processes: Process 1a thru Process 3a) concerning signal acquisition (from the mobile RFID) as it enters a cluster of GBT, signal processing by the four GBT of the cluster, signal handover from one cluster to another cluster, and signal tracking in general as the mobile moves through clusters of four GBT each.

DETAILED DESCRIPTION

Figure 1:
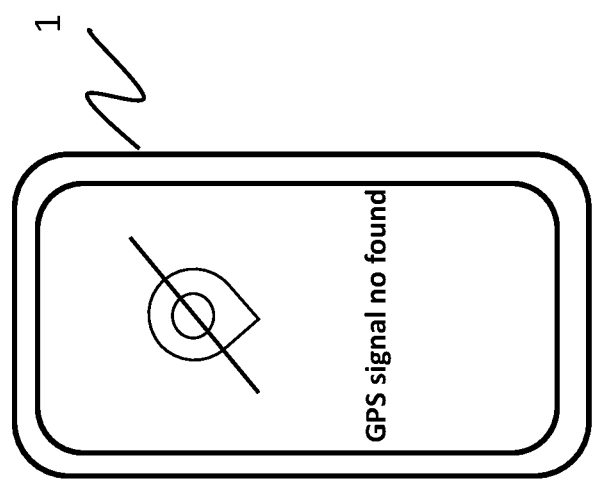
FIG. 1. GPS signals are often blocked from being received by cell phones. In congested physical obstruction areas, a GPS signal is often blocked in a GPS receiver. An example is the loss of GPS signal in a cell phone when the cell phone loses lock with its assigned cell tower in a congested physical environment.

FIG. 1 shows a typical cell phone in its GPS mode, but the phone shows no GPS received signal. Cell phones contain a GPS receiver chip which allows a cell phone user to fix its position on a geographical information map (GIM) with an accuracy of 15-30 feet. The GIM is always part of the geographical information system (GIS) that is being facilitated to the cell phone architecture by cell phone towers closest to where the cell phone is located (i.e. those cell phone towers responsible with communicating with the given cell phone). The accuracy of the geographical positioning provided by a cell phone GPS receiver depends totally on the quality of the GPS received signal from GPS satellites. Inherently, the accuracy of the GPS positioning signaling is only 15-30 feet. However, the accuracy can decrease even further due to the presence of other factors, such as atmospheric environmental conditions, weather, cosmic phenomena, GPS satellite malfunctioning, and physical obstructions on the ground, all of which can prevent a direct line of sight signal between the GPS satellites and the cellular phone. Therefore, not only the accuracy of GPS positioning can decrease, but GPS signals are often blocked and cannot reach a cell phone, and in such a case, there is no GPS positioning indication at all to the user. FIG. 1 shows an example of no received GPS signal and the response of the cell phone to indicate that there is no received GPS signal, as indicated at 1. The technical information previously described herein is also applicable to other GPS receivers in general.

Figure 2:
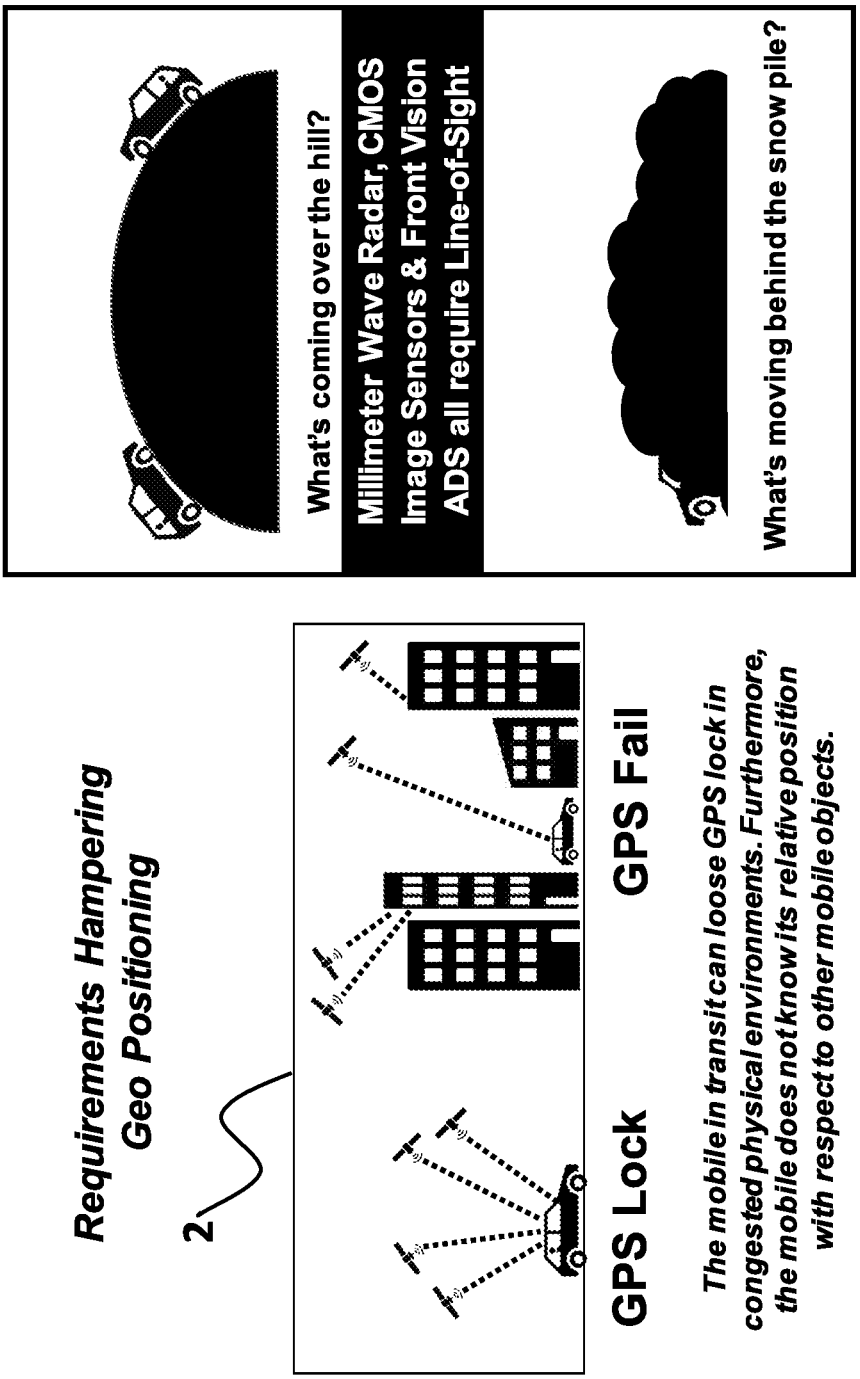
FIG. 2. One of the problems with GPS is that a mobile in transit can fail GPS lock in congested physical environments. Furthermore, the mobile does not know its relative position with respect to other mobile objects.

FIG. 2 shows the challenge that GPS and other positional systems face due to their dependence of line-of-sight (LOS) from GPS satellites for their accuracy and actual performance. GPS technology requires that GPS receivers on earth maintain an uninterrupted communication link with four GPS satellites on geosynchronous orbit around the earth. As the transmitted satellite GPS signals from 20000 km in space reach a GPS receiver on earth, the signal is exposed to several measures of degradation. Space radiation (from the sun and cosmos), atmospheric attenuation and distortion, and geometric diffractions are the major culprits for signal degradation. Degraded GPS signals produce wrong or total lack of GPS positioning calculation by GPS receivers. Of the several causes of GPS signal degradation, geometric diffraction is often the most observable one to a user, since it is more observable nearby the GPS receiver the user owns. When there is not a direct LOS between the GPS satellites and the GPS receiver, it means, that as shown in FIG. 2, the signals transmitted by the GPS satellites are being interrupted by physical obstacles (e.g. buildings, as shown in FIG. 2), hence the signals get diffracted and/or reflected by these physical obstacles and may never reach the GPS receiver, and if received by the GPS receiver, the signals will be distorted (i.e. phase and magnitude) which will result in erroneous positioning calculations or no positioning calculations at all. Having said all this, the most important vulnerabilities of GPS signaling are the uncontrollable and unrecoverable factors: malfunctioning satellites, solar flares and solar wind and overall sun output, and the uncertainty of the extraterrestrial space environment.

An important salient feature concerning GPS receiver measurements is that such GPS receiver measurements are individually (singularly) isolated for each receiver. Therefore, each user that has its own GPS receiver can only know its own position, not the position of any other GPS user in its own vicinity, nor it is capable either of knowing the relative position of other GPS users in its vicinity with respect to its own.

Figure 3:
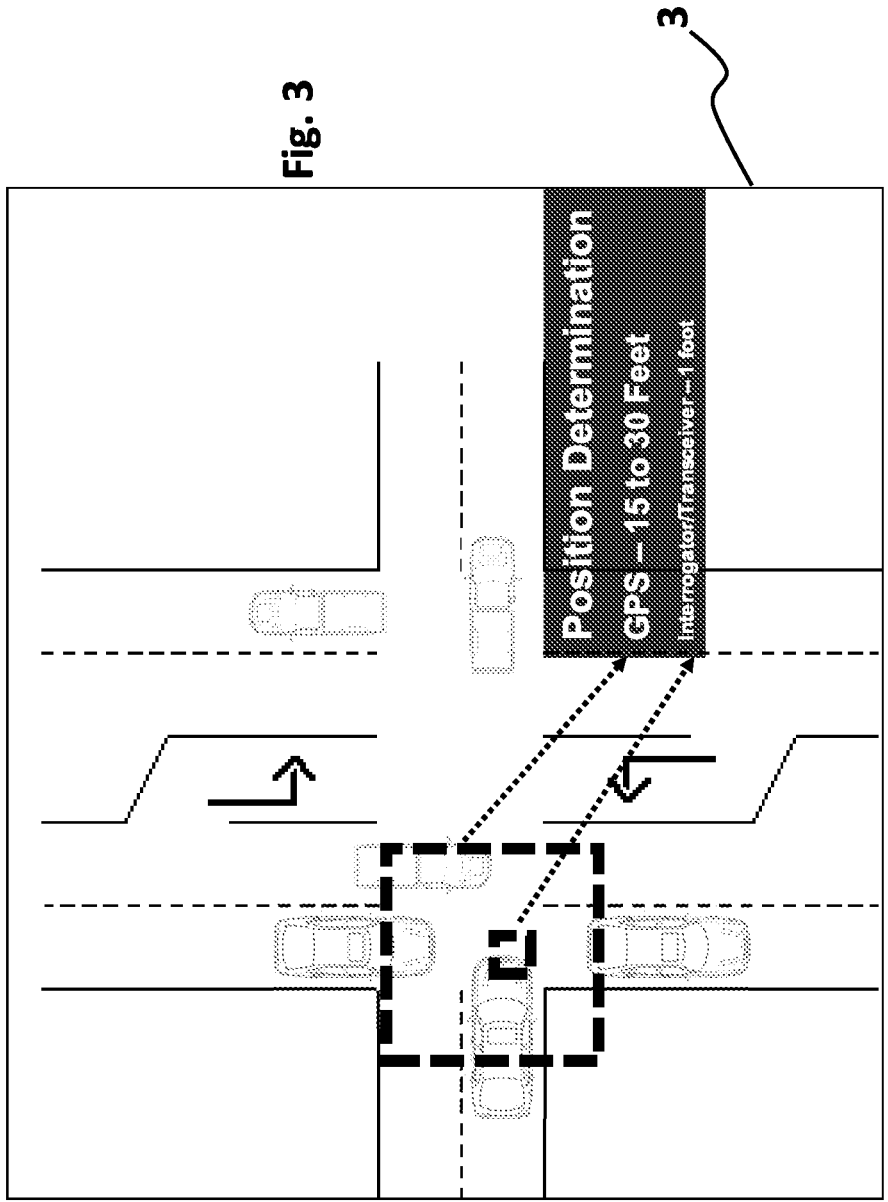
FIG. 3. Some basic advantages of ATPS over GPS are shown. The figure shows that in addition to accurate positioning of a mobile (more accurate than GPS) the ATPS can perform additional functions not available in the GPS.

FIG. 3 shows an example of a specific application of the ATPS. The figure shows the simultaneous tracking of multiple mobiles in a highly physically congested workspace. The congested workspace is made up of many mobiles and surrounding physical obstructions 3. The figure shows that if a mobile with a GPS receiver, can establish, in such a congested physical environment, a GPS connection via a direct LOS to four GPS satellites, the accuracy of its true position is between 15 and 30 feet. The same figure also shows that using the ATPS the accuracy of the true position of the same mobile increases significantly to about 1 foot. Because the accuracy of position determination in the ATPS is much superior than GPS, the relative position of multiple mobiles in a congested workspace can also be determined. The ATPS can determine the accurate positioning (to 1 foot) of multiple mobiles very close to each other as shown in the figure. Furthermore, the ATPS can also determine the relative positioning of the multiple mobiles with respect to each other. The GPS positioning system is incapable of determining relative positioning of any mobile with respect to any other mobile and is also incapable of tracking multiple mobiles because it can only provide singular positioning to GPS receivers.

ATPS has the capability to interact with technologies that are presently being used in autonomous mobile systems such as in autonomous mobiles equipped with radar and proximity sensors, vision and image sensors. Eventually, ATPS will interface with 5G wireless systems.

Figure 4:
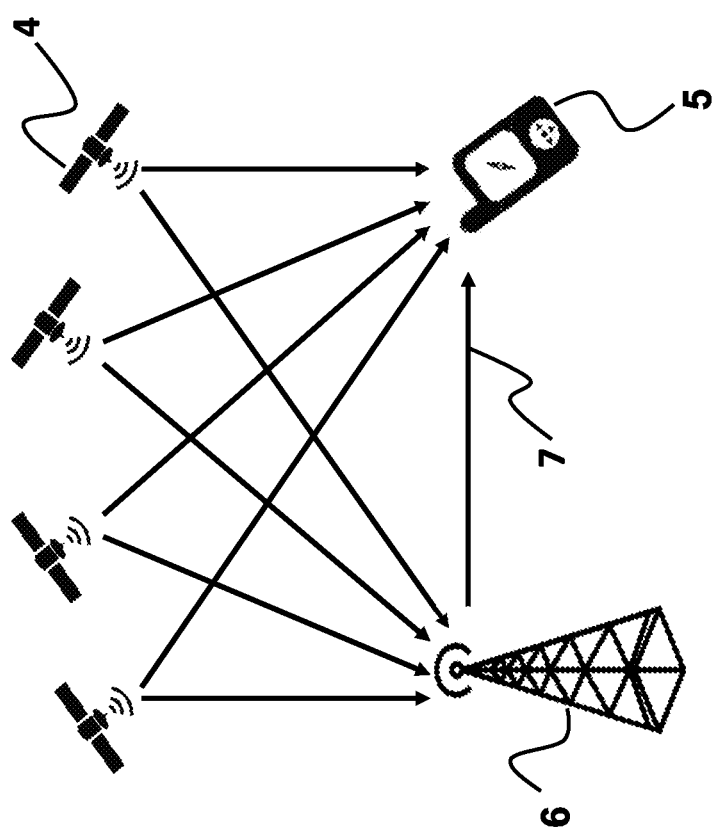
FIG. 4. Differential GPS techniques increases the accuracy of user position by receiving corrected positioning data from a nearby receiver base station. The ATPS also makes use an improved type of differential positioning among the AWIs.

An introduction of how GPS works is shown in FIG. 4. FIG. 4 is shown to introduce some terminology that will also be used in ATPS. As of today, the most successful individual (singular) position determination technology, which is widely used all over the world, and which has been incorporated in most wireless personal communication devices is the global positioning system or GPS. FIG. 4 provides a description of the GPS at the satellite level. The GPS requires four satellites 4 to estimate the location of a user possessing a GPS receiver 5. All four satellites communicate with the ground-based GPS receiver. Of the four satellites, three of the satellites are used to triangulate the location of the GPS receiver, the fourth satellite is used to resolve the time uncertainty incurred by the other three independent satellites. To increase the accuracy of the GPS receiver location 5, the same four satellites also communicate with a receiver at a GPS base station 6 that has a known and fixed GPS location. The base station that has a known GPS location compares its known GPS location with the location revealed by its own GPS measurements. The known errors (differences in x, y and z coordinates) known as differential correction 7 (or correction factor) is applied to the user of GPS receiver 5. The position determination using GPS requires several measurements from different sources (GPS satellites) because position determination is based on triangulation of four received timing signals. However, the accuracy of the received timing signals is limited because the satellites are 20,000 km away and the radio signals are exposed to the everchanging space and atmospheric environment which change the timing of the received signals in addition to other potential degrading factors such as transmitter and receiver noise and physical obstructions, as previously explained. Four distance vectors (D) are calculated using the equation $D_n=(186000 \text{ miles/sec})*(T_n)*C_f$, where T represents the measured timed (in sec) from the GPS satellite to the GPS receiver, n=1, 2, 3, 4 represents the 4 closest GPS satellites to the GPS receiver, and Cf represents the correction factor calculated by the base station with known GPS location and transmitted to the GPS receiver of the user. The triangulation of the four distance vectors on a GIS map produces the receiver GPS position indication.

Figure 5:
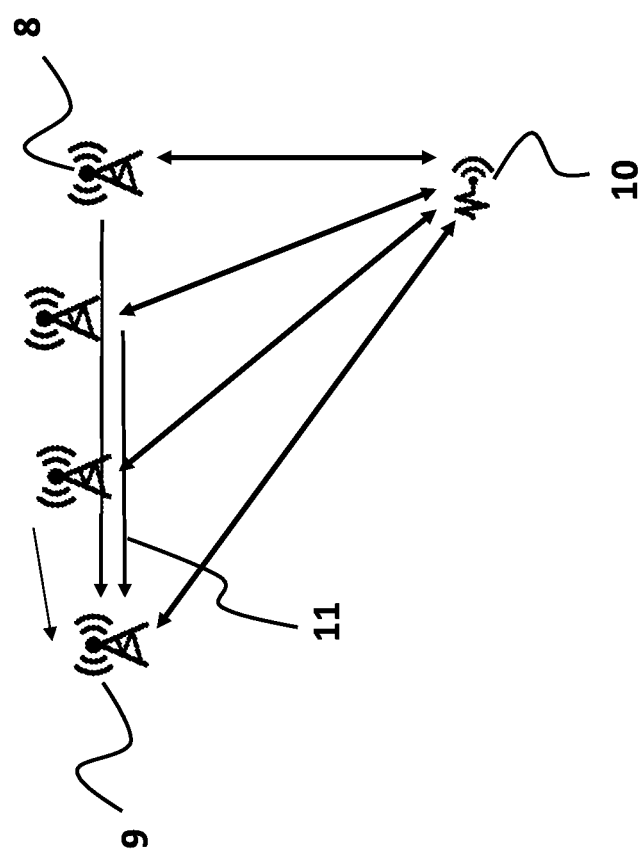
FIG. 5. Accurate tracking of the position of an AWR uses multiple AWIs to accomplish serial correction for differential positioning. In the figure four AWIs use differential positioning to track a single AWR. AWIs can track multiple AWRs simultaneously.

ATPS is not a singular position determination technology as GPS, but rather, ATPS is a ground-based wireless positioning system that allows for the simultaneous determination of the position and the tracking of multiple tagged objects. Furthermore, ATPS allows for the flow of location information and tracking information about these tagged objects for further use by other future wireless communication systems (e.g. 5G). FIG. 5 shows the basic elements of the ATPS. At the basic level, with no expansion, the ATPS consists of a cluster of AWI stations. Each cluster contains four AWI stations (or "interrogators") 8. One of the four AWI stations, chosen as station 9 in FIG. 5, is configured to receive the timing information, provided by the AWR transceiver 10, from the three other AWI stations in the cluster. The chosen AWI station 9 resolves and performs the triangulation calculation needed for the location of the AWR in a GIS. The AWI station 9 chosen to perform triangulation calculation for the cluster is called the Master and the remaining three AWI stations are called the Slaves. However, the AWI station chosen to perform triangulation calculation can be any of the four AWI stations in the cluster since each of the AWI stations in the cluster are identical. Therefore, within a cluster, the AWI station which is first contacted by the AWR transceiver 10 after being interrogated by the AWI stations becomes the Master 9 and assumes the responsibility of performing the triangulation calculation for the cluster. It may usually be the AWI station closest to the AWR transceiver 10 that becomes Master 9. The AWR transceiver 10, however, must be able to communicate with the Master 9 and the Slave AWIs 8 as shown in FIG. 5. The timing information from each slave AWI 8 is passed on to the AWI station 9 chosen as the Master, as indicated at 11, during the tracking of the AWR transceiver 10. The final link in the process is for the Master AWI station 9 to transmit the calculated position information to the AWR transceiver 10 and/or any other recipient and track such positional information continuously and autonomously while the AWR transceiver 10 is within the wireless reach of the cluster.

The AWI stations may be equipped with an embedded fault management system. If the designated Master AWI station later becomes unavailable, another of the remaining three AWI stations becomes the Master and the remaining two AWI stations becomes Slaves AWI stations. If another of the remaining three AWI stations designed as Master becomes unavailable, one of the two remaining AWI station becomes the Master and the other remaining AWI station becomes the Slave. If there is only one AWI station remaining the remaining AWI station is the Master. If a Slave AWI station fails, the Master AWI station may ignore it. Multiple AWRs can be tracked within the cluster which means that depending on the number of AWRs being tracked within the cluster each AWI station can serve both as Master and Slave multiple times.

Each AWI station within the cluster uses different frequencies. The frequency range for all the AWI stations is 3-3.65 GHz and this frequency range is parceled out among the four AWI stations. The bandwidth for each allocated frequency is a minimum 200 Khz and this is also the channel bandwidth for each allocated frequency. As the tagged object being tracked moves away from the cluster, the AWI frequencies are re-used for any other mobile tagged object(s) that enter the range of the cluster. Each AWR is interrogated by an AWI station, and the AWR responds by providing its own identification (ID) and other pertinent information to the AWI station which is needed to assess the AWR positioning. Upon the activation of the AWR transceiver by a AWI station, the AWR transceiver broadcasts its ID number, its transmitted signal strength, and time-stamped time of transmission. Therefore, all AWI stations in the cluster will determine or receive: a) the AWR transceiver ID number, b) the AWR transceiver transmitted signal strength, c) the received signal strength at the AWI station, d) time-stamped time of the transmission by the AWR transceiver, and e) time-stamped time of signal reception by the AWI station. This procedure is repeated for any AWR transceiver that falls within range of any AWI station within the cluster. The multiple AWR transceivers are simultaneously tracked by AWI stations using beamforming smart antennas connected to each AWI station. Tracking involves location determination and velocity (speed with direction, if any) of the tagged object. Each AWI station accurately knows its own fixed GPS location in a geographic information system (GIS). The interaction between an AWI station and an AWR transceiver may be implemented by RFID technology.

AWI station clusters can be positioned strategically to provide coverage in a defined path so that any tagged object in that path can be tracked at its location by four AWI stations. Some fault tolerant conditions may preserve to some degree the fidelity of the ATPS. When the tagged object can only be tracked by one AWI station, the range (not location) of the tagged object can be estimated by the AWI station by assessing only a few measured parameters, but velocity cannot be estimated. When the tagged object can only be tracked by two AWI stations, the location of the tagged object can be partially estimated by assessing a few more parameters from the AWR transceiver and measured by the two AWI stations, and velocity can only be partially estimated. When three AWIs stations are operating, the location can be estimated much more accurately, including velocity estimation, but without the benefit of resolving for accuracy. When the four AWI stations are operating, the location of the AWR transceiver can be accurately estimated using the several parameters from the AWR transceiver and as measured by the four AWI stations. In addition to the several parameters exchanged between the AWR transceiver and the AWI stations, firmware and dedicated hardware in all the AWI stations may use position determination via triangulation. Triangulation uses the time-stamped timing data from the AWR transceiver and the AWI stations, and velocity can also be accurately estimated using triangulation.

Figure 6:
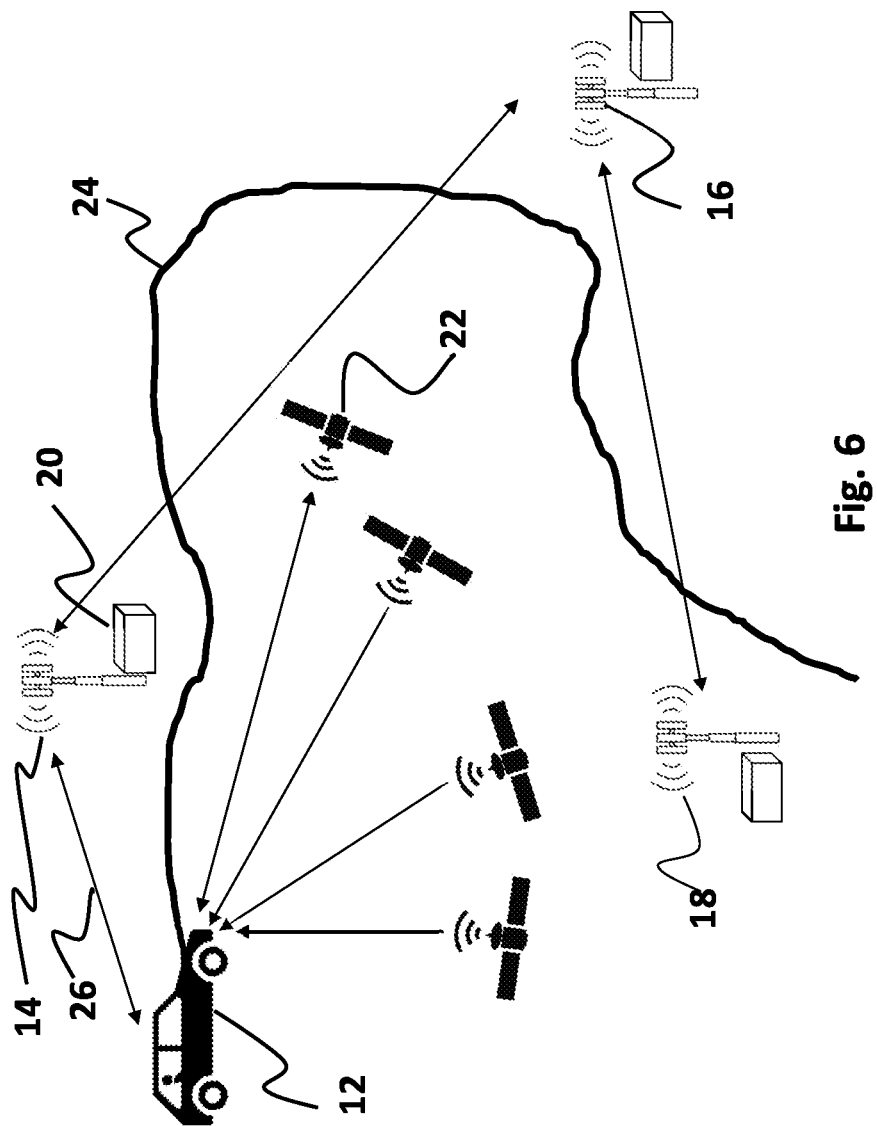
FIG. 6. A passenger with a cell phone inside a mobile knows its GPS position (and that of the mobile) because the cell towers that keep track of the cell phone communications are also used to track the GPS receiver inside the cell phones.

Tracking of objects is an important technology that has gained a lot of applications over the last few years. One of the simplest applications of tracking technology is the use of RFID technology for tracking goods for inventory and evaluation purposes. A much more advanced version of tracking is performed by cell towers as shown in FIG. 6. In the figure, cell towers 14, 16, 18 have the capability to track the phone conversations of a user on a mobile as the mobile moves through far distances if the cell towers are available along the path of the mobile. It is also because of the tracking capability of phone conversations by cell towers that the GPS position of the owner of the cell phone can also be tracked, as cell phones have built in GPS receivers. FIG. 6 shows a mobile unit 12 with a driver having a cell phone and communicating 26 with the nearest cell tower 14 and its base station 20. As the mobile unit moves along the path 24 of FIG. 6, the cell phone conversation and the location of the driver within a GIS are also being tracked by the multiple cell towers 14, 16, and 18. As the mobile goes through the path, the phone conversation and the location of the driver is "handedover" from tower to tower as the mobile unit 12 moves along the path 24. Therefore, as the cell phone conversation is being tracked, the GPS position of the mobile provided by GPS satellites 22 is also been tracked.

Figure 7:
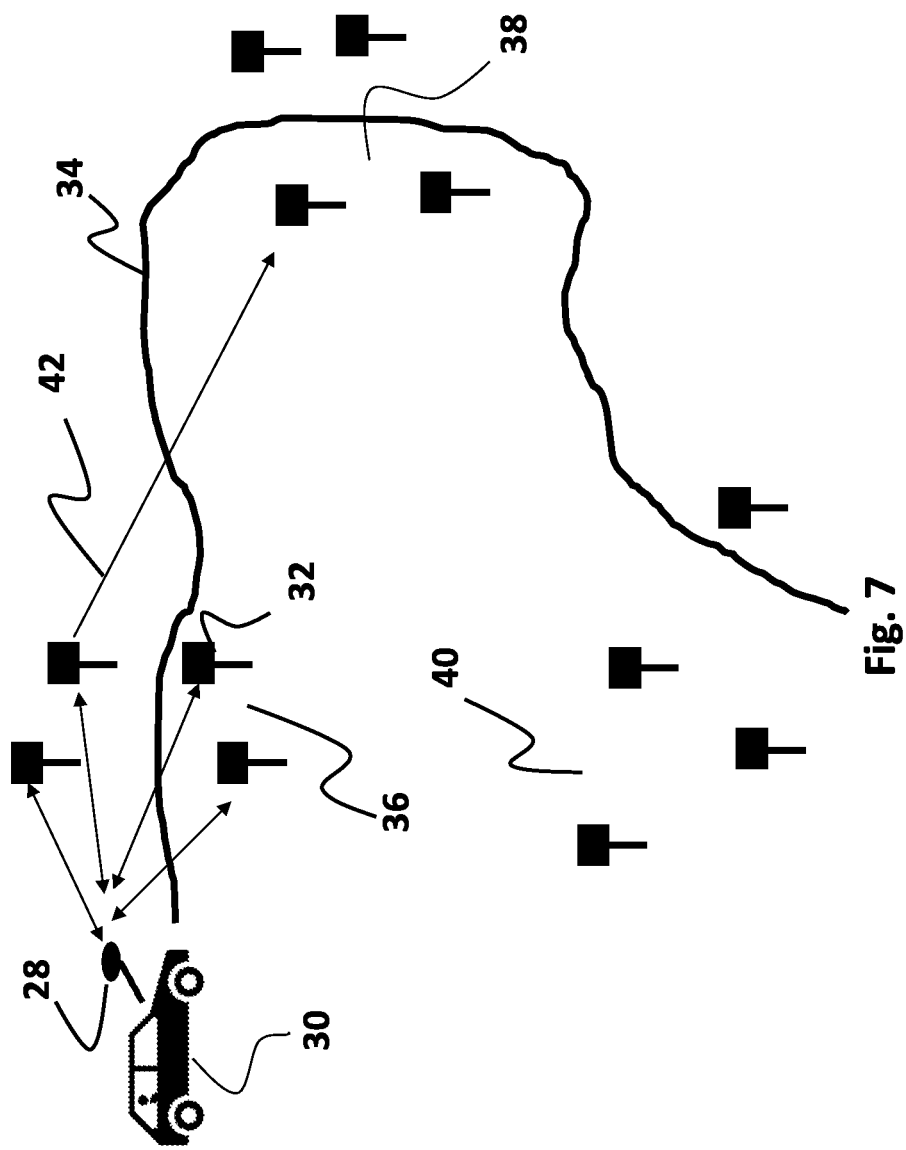
FIG. 7. Mobile unit (with an AWR) moving among several AWI units arranged in clusters of four AWIs each. In the figure, four AWIs units are used to track an AWR unit.

The ATPS uses several clusters of ground-based AWI stations to track autonomously the passage of multiple mobiles with their AWR transceivers, as shown in FIG. 7. In the figure, a mobile unit 30 is equipped with an AWR transceiver 28. The mobile unit equipped with an AWR transceiver will follow path 34. In the path of the mobile unit there are a series of clusters 36, 38, and 40 each including four AWI stations, each AWI station 32 being identical to the others. In certain embodiments of the cluster technology the number of AWI stations in a cluster can be greater than four. As the mobile unit moves along the path 34 it will be moving away from one AWI stations cluster and approaching another AWI stations cluster. Therefore, the ATPS can calculate the position using all available AWI stations in the cluster within range of any given mobile with an AWR transceiver. As the mobile with an AWR transceiver moves out of range from one cluster of AWI stations and enters in the range of another cluster of AWI stations, the AWR transceiver on the mobile will be tracked continuously as tracking transfers from one cluster to another cluster, as indicated at 42. The cluster of AWI stations can be strategically located along a prescribed path for the AWI stations to effectively track an AWR transceiver. Therefore, the extent of the ATPS, in a workspace, is limited only by the number of available clusters of AWI stations in the given workspace. There is no limit to the number of clusters of AWI stations that can be used as the available workspace expands. The cluster of AWI stations can be used in indoor and outdoor workspaces.

Figure 8:
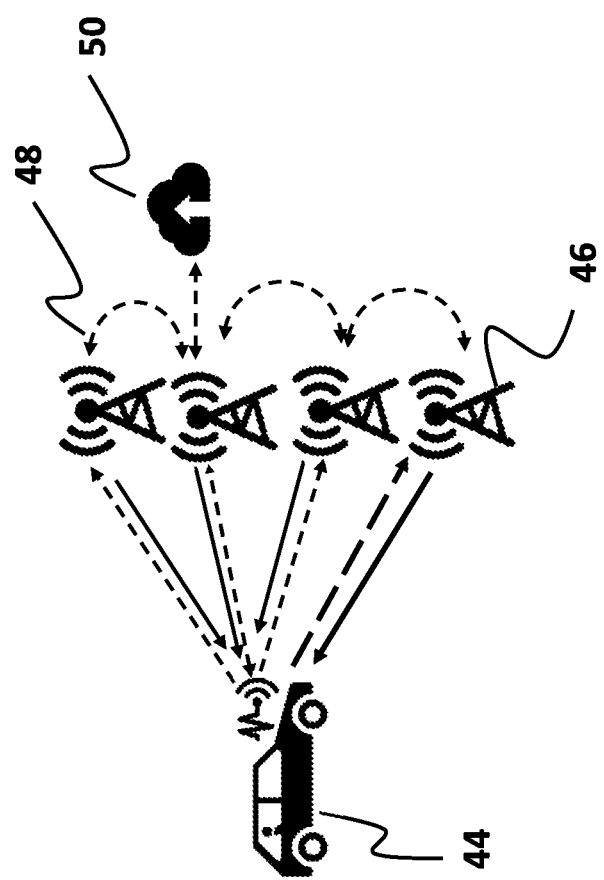
FIG. 8. The ATPS system communication capability with WWW is shown via the cloud. In the figure an AWR unit on a mobile is tracked by four AWI units and one of the AWI units communicates with the WWW via the cloud.

FIG. 8 shows the communications links in the ATPS between ATPS stations and an AWR transceiver on a mobile unit. The figure shows four AWI stations 46 forming a cluster. The figure shows an AWR transceiver on a mobile unit 44. The communication between any AWI station and an AWR transceiver is a two-way communications link as shown. The AWI stations "pings" the AWR transceiver and activates it, and as previously stated, the first AWI station that receives feedback from the AWR transceiver becomes the Master AWI station. The AWR transceivers behave as active tags as it would be in an RFID system. The AWR transceivers are battery powered, but they are dormant unless they become activated by an AWI station. Any AWI station can activate an AWR transceiver and most likely the AWR transceiver will be activated by the AWI station closest to the AWR transceiver. The exchange of information between AWI stations and an AWR transceiver allows for the AWI stations to calculate the location of the AWR transceiver. AWI stations are capable of communication among themselves, as indicated at 48, to exchange timing information as it is in the case of the Master and Slaves AWI stations previously discussed. Furthermore, the AWI stations can also communicate with the outside world to provide position information about the mobiles 44 being tracked. In the figure one AWI station provides in a dedicated fashion internet access with the outside world via the cloud 50 and through a wireless network. As used herein, the term "cloud" may refer to software and services that run on the Internet.

Figure 9:
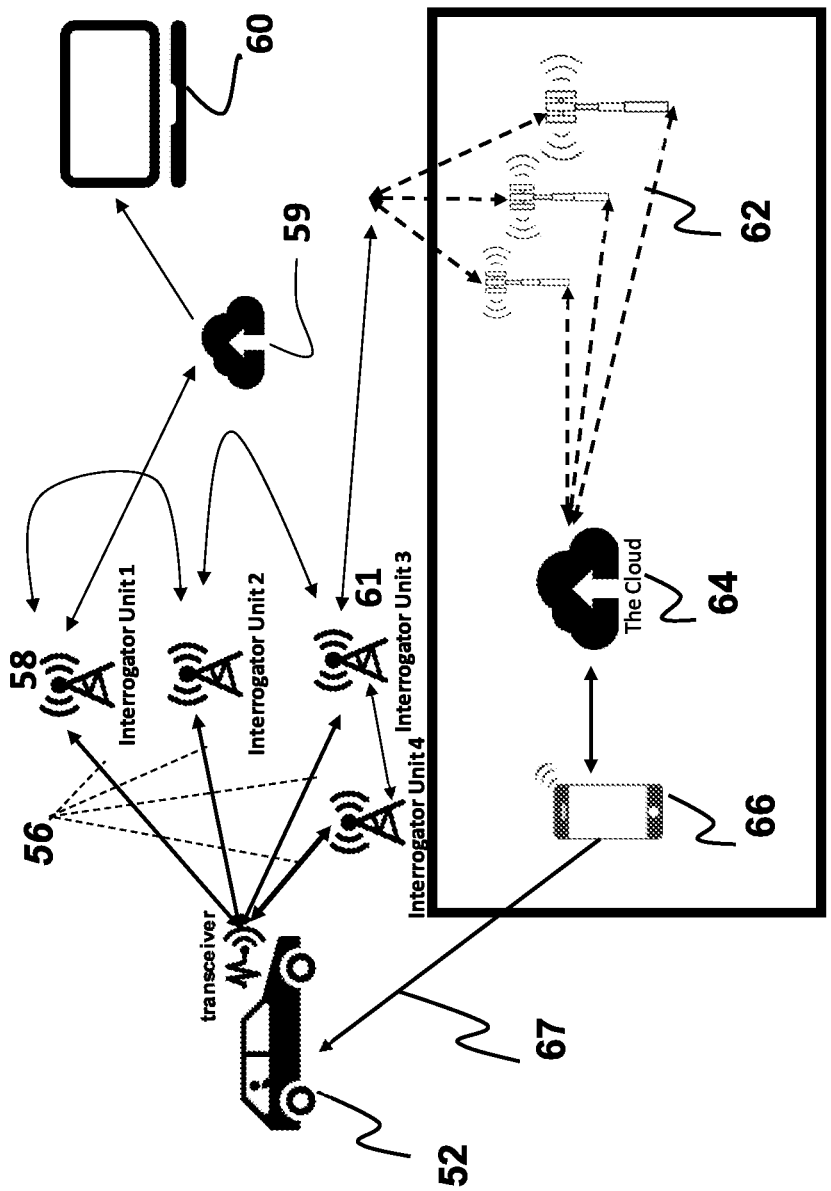
FIG. 9. Closed loop communications between the ATPS and other communications venues. In the figure there is closed loop communication system between the ATPS, the internet, and a cell phone such that data flows through each of them in an integrated manner.

FIG. 9 is an expanded version of FIG. 8 and shows possibilities that exist with ATPS in the wireless environment. FIG. 9 shows the ATPS communicating with the outside world, and this is one of the strengths of the ATPS, its capability to eventually become integrated with 5G. The mobile unit 52 with an AWR transceiver communicates with four AWI stations 56 for position determination. Once the position of the mobile unit has been determined, the information may be delivered to a user (or multiple users) who may use such information for a purpose (or multiple purposes). Therefore, the position information may be sent outside the ATPS. In the figure, one of the AWI stations 58 communicates via WIFI with the Cloud 59 where the position information can be stored for further analysis by multiple potential customers 60, such as 5G. In the figure another AWI station 61 communicates, in a dedicated fashion, with a WiMAX system 62. Once positional data is on the WiMAX system it can be shared in the WWW 64 and even with personal communications devices 66 via WWW 64, such as a personal communications device 66 belonging to the mobile user, as indicated at 67.

Figure 10:
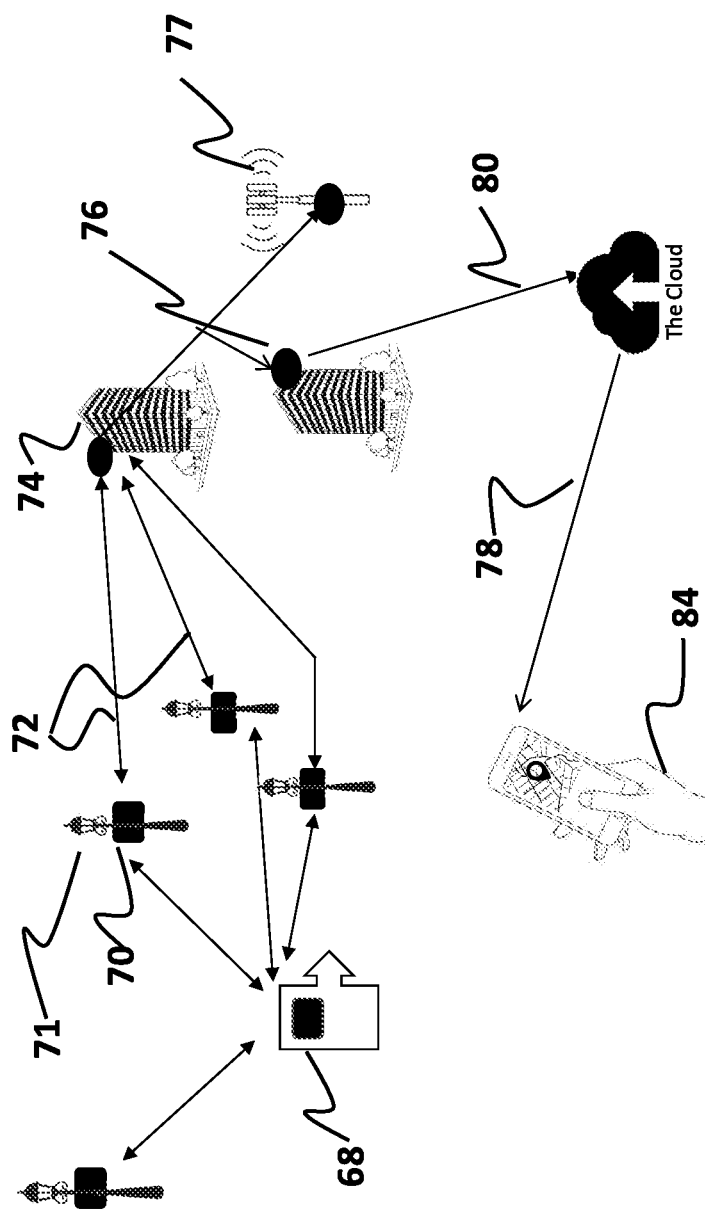
FIG. 10. The figure shows basic components of an advanced mobile communication solution using ATPS. The integrated system involves ATPS, personal communications devices, and the WWW.

FIG. 10 shows the diverse ways where the AWI hardware can be positioned in a diverse local environment. FIG. 10 shows a generalized AWR transceiver 68 communicating with four AWI stations 70 affixed to lamps posts 71. The figure clearly shows that because of their small size, the AWI stations do not need special fixtures or towers on which to be installed. Rather, an AWI station may be mounted or installed on any tall fixture that has access to electrical power (e.g., solar or wired-in). AWI stations are relatively small, about the size of a half-gallon milk carton, and therefore can be affixed to many types of fixtures, such as buildings 74, 76 and even cell towers 77. As the mobile moves along the workspace environment, AWI stations may keep communications with other AWI stations, as indicated at 72, as part of the handover process. FIG. 10 also shows ATPS stations accessing the Cloud, as indicated at 80, via WIFI, and, from there, communicating via personal wireless devices 84, as indicated at 78. Therefore, a user with a cell phone riding on a mobile equipped with an AWR transceiver may be able to find its position in a workspace as calculated by the AWI stations and may be able to track its position on a continuous basis.

Figure 11:
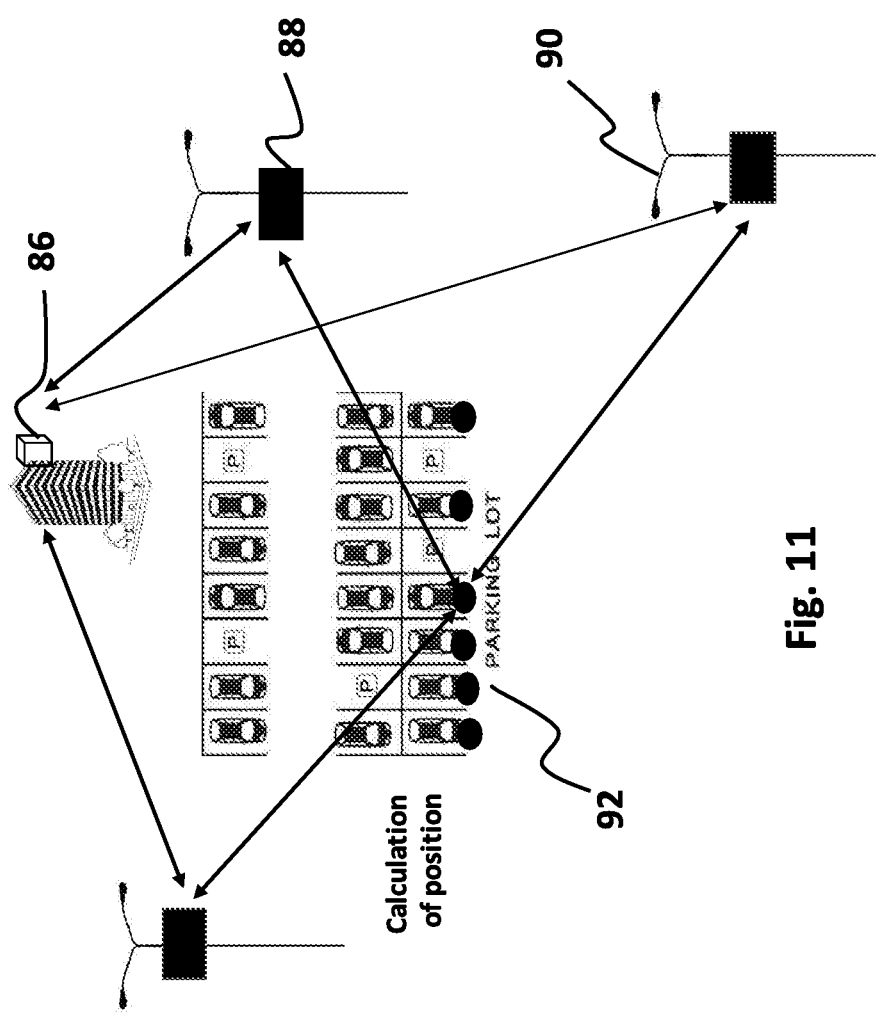
FIG. 11. Application of the ATPS to a "smart parking" application. AWIs stations are located within the parking area and enable mobiles, equipped with AWRs, to be guided in and out of parking spaces.

FIG. 11 provides a description of the first of two applications of the ATPS that goes beyond the tracking of mobile tagged objects. FIG. 11 shows an application of the use of ATPS for SmartPark™, a "smart parking" application. In the application of FIG. 11, AWI stations are used to guide vehicles to empty parking slots in a parking structure 92 (indoor or outdoor). Since existing parking structures have a variety of landscapes, FIG. 11 shows that AWI stations are suited for these varieties of landscapes. For example, FIG. 11 shows that AWI stations can be installed in buildings 86 and lamp posts 88, 90 near or inside parking structures. When a car equipped with an AWR transceiver enters a parking structure, the AWR transceiver is activated by the nearest AWI station among a set of AWI stations at the entrance of the parking structure. This set of AWI stations keeps track of cars coming in and going out of the parking structure. Therefore, this set of AWI stations keeps track of the overall number of empty spaces and occupied spaces in the parking structure. As the car moves inside the parking structure it goes past several AWI stations, with all the AWI stations contributing to the coverage of all the parking spaces (some full, some empty) within the parking structure. The car may then be tracked by several AWI stations as it moves. Since there is wireless communication among the AWI stations, the locations of empty parking spaces within the domain of AWI stations is known. This is possible because for each parking space that is occupied by a vehicle, the vehicle has its own AWR transceiver which provides a simple binary indication of empty/full to its closest AWI station. Therefore, as the car moves within the parking structure a given AWI station communicating with the car's AWR transceiver can provide numerical information to the car's AWR transceiver of how many empty spaces (if any) are available within the workspace of a given AWI station. If there are no parking spaces available, the car moves along to the next set of AWI stations, and so on. If there are no empty parking spaces available to the car, then the car may be so instructed before the car enters the parking structure and immediately after the car encounters its first set of AWI stations. Since the AWI stations are capable of tracking time (e.g., via an internal clock), this feature can also be used for dynamically charging parking fees, and such information can be transmitted wirelessly and remotely if a given AWI station can connect to the Cloud via WIFI.

Figure 12:
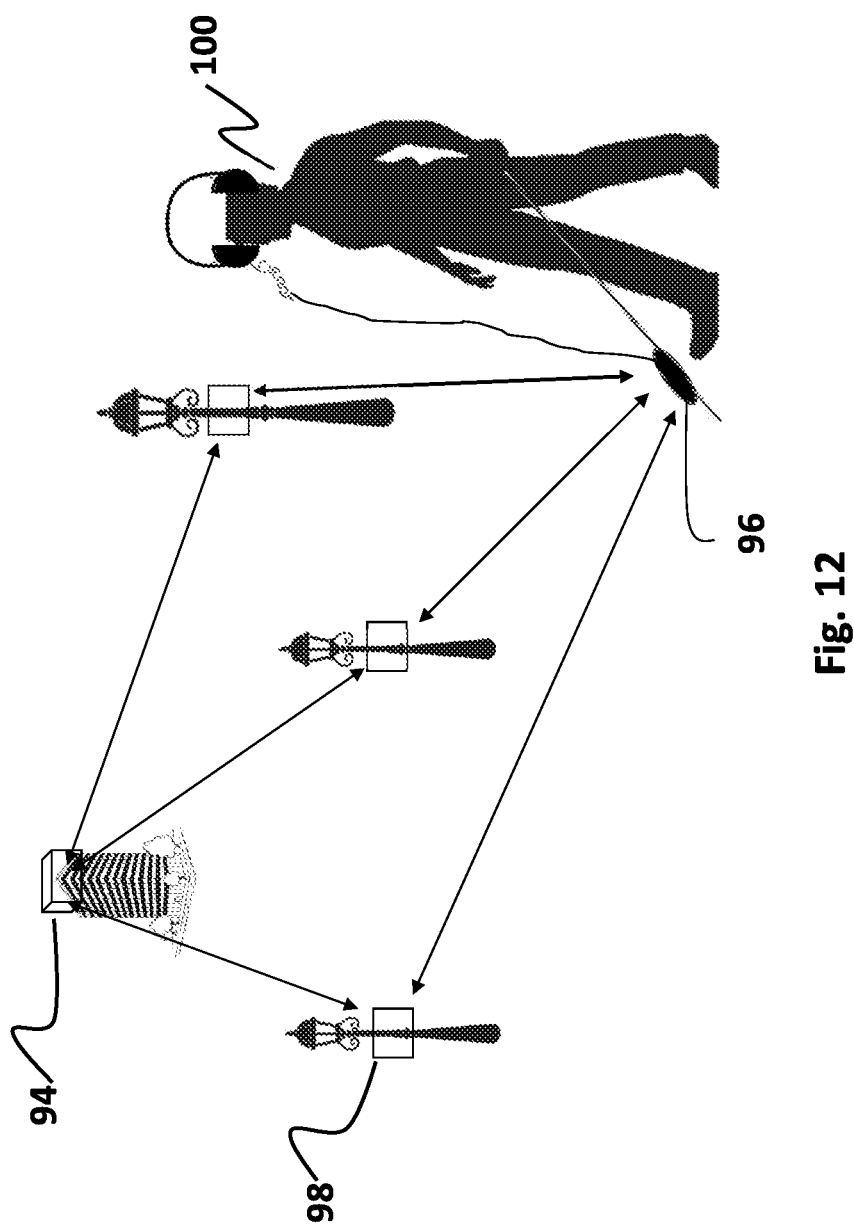
FIG. 12. Application of the ATPS to a handicapped blind individual using a "wireless cane" which behaves as an AWR. The AWIs stations provide positioning guidance to a handicapped blind person equipped with a cane containing an AWR.

FIG. 12 is similar in principle to the scenario described in FIG. 11, and the same elements are involved: AWI stations in diverse locations 94, 98 and an AWR transceiver 96 serving a blind man 100. The blind man may know his position as he moves through his workspace.

Figure 13:
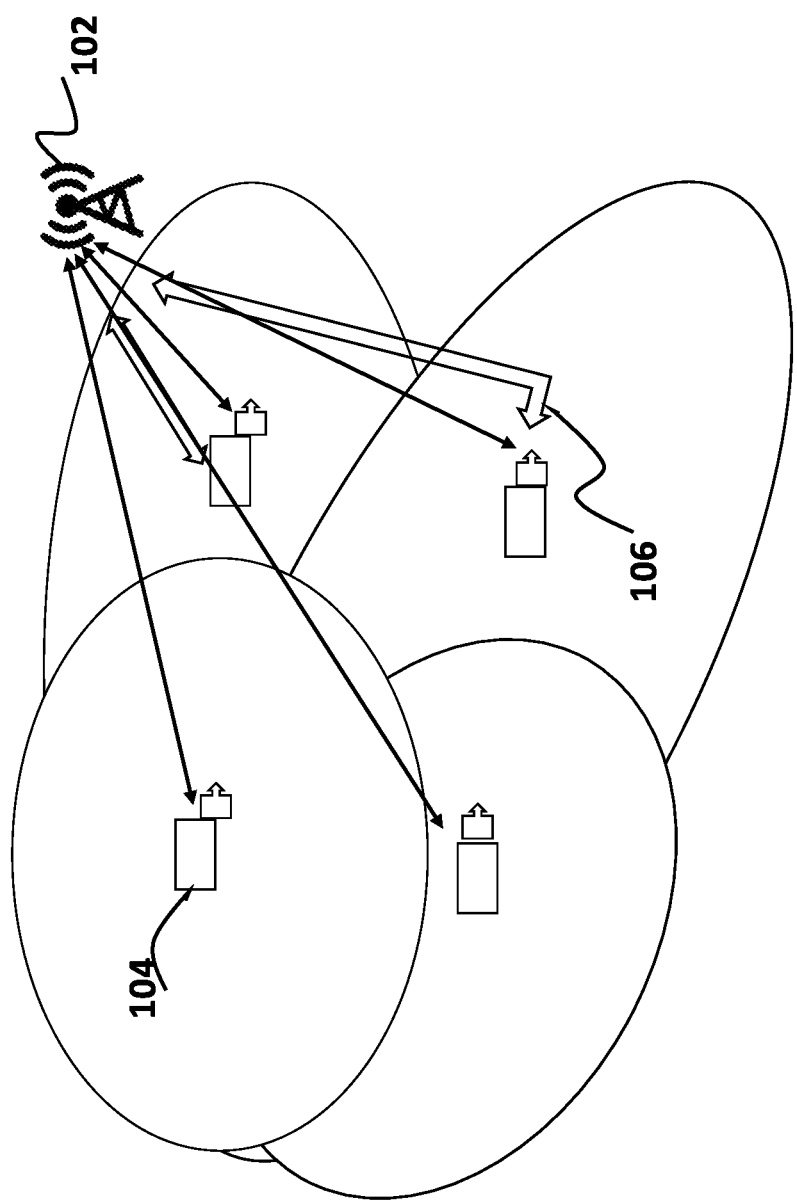
FIG. 13. An AWI station is simultaneously tracking four AWRs and allowing the Poles to simultaneously exchange data among them.

FIG. 13 shows what has already been stated before, that one AWI station can establish communications with multiple AWR transceivers. FIG. 13 shows four AWR transceivers 104 being tracked by a single AWI station 102. The number of AWR transceivers that a single AWI station can track is limited only by channel capacity and not by technology changes. In this example, since four AWI station frequency channels are needed to track a single AWR transceiver, and there are four AWR transceivers in the workspace of FIG. 13, each AWI station must allocate four different frequencies, each with its own bandwidth, to track the four AWR transceivers. Each of the four different frequencies may be associated with four respective frequency channels. Accordingly, there may be sixteen channels involved in tracking these four AWR transceivers. Therefore, for N number of AWR transceivers to be tracked there is a need for 4×N channels. One of the FCC frequency allocations for position determination is the range of 3-3.65 Ghz. If the whole frequency spectrum were to be used (i.e., 650 MHz), and assuming a 200 Khz channel bandwidth with an additional 20 Khz for channel separation, the number of potential channels is 2954, which means that up to 738 AWRs could be tracked. The tracking includes the pinging by AWI stations of AWR transceivers, the response of the AWR transceivers, and the data exchange 106.

Figure 14:
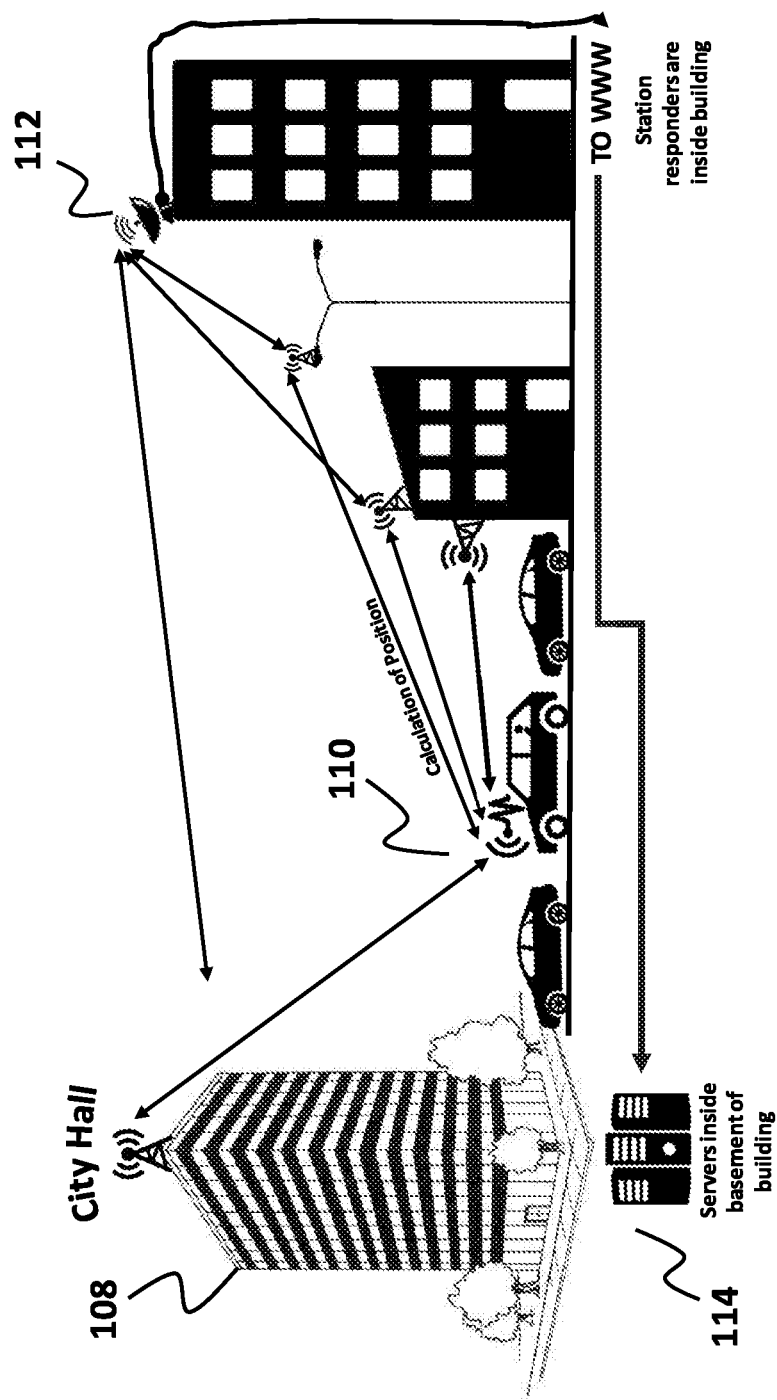
FIG. 14. Application of the ATPS for traffic monitoring. The ATPS can track the traffic of multiple mobiles in and out of the coverage workspace.

The amount of data exchange and the type of data exchange is tailored to the application, but, at a minimum, the data exchange may include an identifier for an AWI station to be able to contribute to the calculation of the AWR transceiver position. For example, FIG. 14 shows an application where traffic is being monitored near a city government building (e.g., for security purposes). Cars equipped with AWR transceivers (e.g., security or VIP-carrying vehicles) 110 are being tracked by AWI stations 108 which relay position information and possible security data to another station 112 outside the ATPS, and the information and data may be eventually transmitted elsewhere via the WWW. Closing the loop, the same position information and data can be relayed back to the government building 114.

Figure 15:
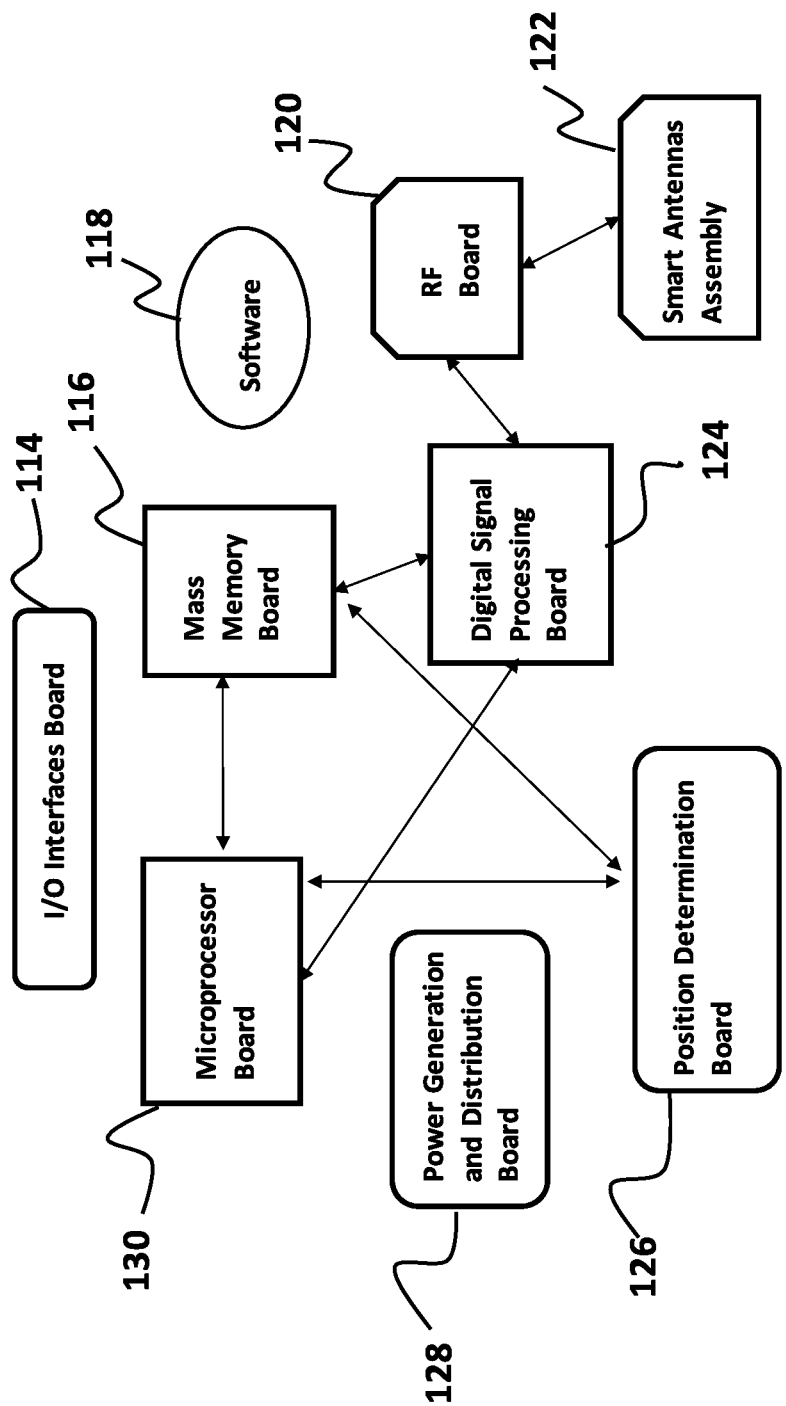
FIG. 15. Overview of AWI hardware architecture. The figure broadly shows the eight major subsystems of the AWI architecture.

FIG. 15 illustrates the hardware components of the AWI stations. From a hardware point of view the AWI station may be composed of several sets of electronics boards each tailored to perform a specific function. As previously stated, the AWI station may include nine electronic boards: a) transceiver sub-system to communicate with AWRs and other AWI stations. The transceiver sub-system also contains a GPS receiver, b) a microprocessor based sub-system to process data, commands, and implement embedded software algorithms, c) positioning board is the electronics sub-system responsible for calculating the position of the AWR transceiver. It is composed of ASIC and FPGA electronics in addition to interface electronics and firmware, d) a digital signal processing sub-system to process analog and digital data, e) power generation and power distribution sub-system, f) memory sub-system, g) interfaces sub-system to account for multiple interfaces such as remote access, hardware testing, antennas, and external and internal-generated data, h) antennas and their feed network, and i) embedded software.

The power generation and distribution board 128 provides DC power to all the electronics of the AWI station. The power board has the dual capability to receive either AC (power utility mains) or DC (solar) power. The power board is also equipped with a back-up Li-Ion battery. The operating bus voltage to the power board may be 30-36V dc. The microprocessor subsystem 130 is the CPU board for the AWI station. This small board computer may operate with a clock speed greater than 1 GHz. The interfaces board 114 inputs/outputs have hardwired data external interfaces with the outside world (including user interface) and internal interfaces. The transceiver subsystem board 116 contains all the RF electronics for two-way wireless communications with other AWI stations and with the AWR transceivers (via dedicated channels). Another dedicated daughter board contains RF switches 118 for different modes of communications and matching impedance networks 120 for the transceiver antennas. The transceiver antennas constitute another subsystem 122 including smart antennas to create beam forming patterns. The digital signal processing (DSP) subsystem 124 may process large amounts of location and velocity data from multiple AWRs on a continuous basis (tracking). The digital signal processing (DSP) subsystem 124 may also enable the same type of data to be transmitted to other AWI stations. The position determination board 126 assists in the development of algorithms for position and velocity determination. This board contains several ASIC and/or FPGA ICs.

Figure 16:
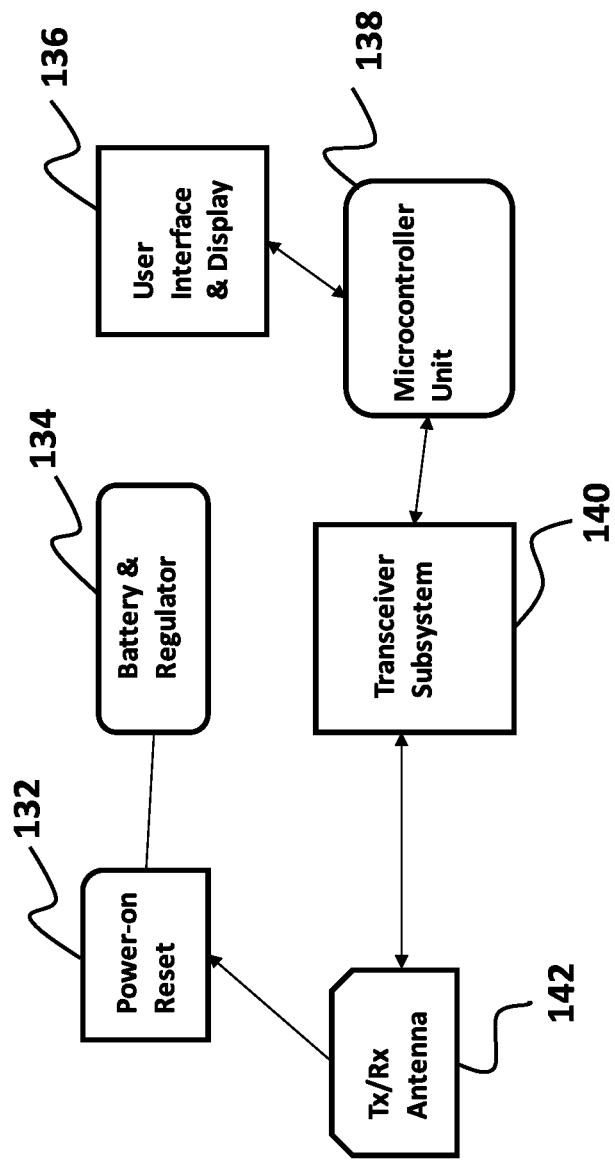
FIG. 16. Overview of AWR hardware architecture. The figure broadly shows the main components of the AWR architecture.

FIG. 16 shows the AWR transceiver hardware architecture. The AWR transceiver for ATPS has a Li-Ion battery 134. However, the battery is only activated via a power-on reset circuit 132 when the AWR transceiver gets pinged by an AWI station. The battery feeds regulator circuits to generate the voltages required by the AWR transceiver electronics. The AWR transceiver stays powered-on as long as the it can detect being pinged by an AWI station, afterwards it turns itself off. This approach allows battery power in the AWR transceiver to remain useful for many months. The AWR transceiver has a dedicated transceiver subsystem 140 responsible for communicating with the AWI stations. The transceiver subsystem connects to a matching network and then to a transmitter/receiver antenna 142. A microcontroller 138 is used for command and processing of AWR data to/from the AWI station. The microcontroller also connects to a user interface 136.

The details of the eight electronic boards comprising the AWI are outlined in FIG. 17 through FIG. 24. The ninth electronic board comprising the AWR is shown in FIG. 25.

The nine electronic boards, which in total make up the AWI and AWR assemblies, may all be multilayer boards. Each multilayer board may have at least eight layers, but some boards may reach up to sixteen layers. The boards may include solid ground and solid power copper planes, and the signal layers may be routed between power and ground planes and between ground planes to minimize EMI. There may be four types of multilayer boards (also known as printed circuit boards-PCB) that may be part of the AWL: a) the power board which may accommodate the analog nature of the power electronics converters, b) the digital boards which may accommodate traffic of digital data from digital circuits, c) the mixed-mode analog-digital boards which may accommodate data from both analog and digital circuits, and d) the radio frequency board which may accommodate radio frequency circuits.

Figure 17:
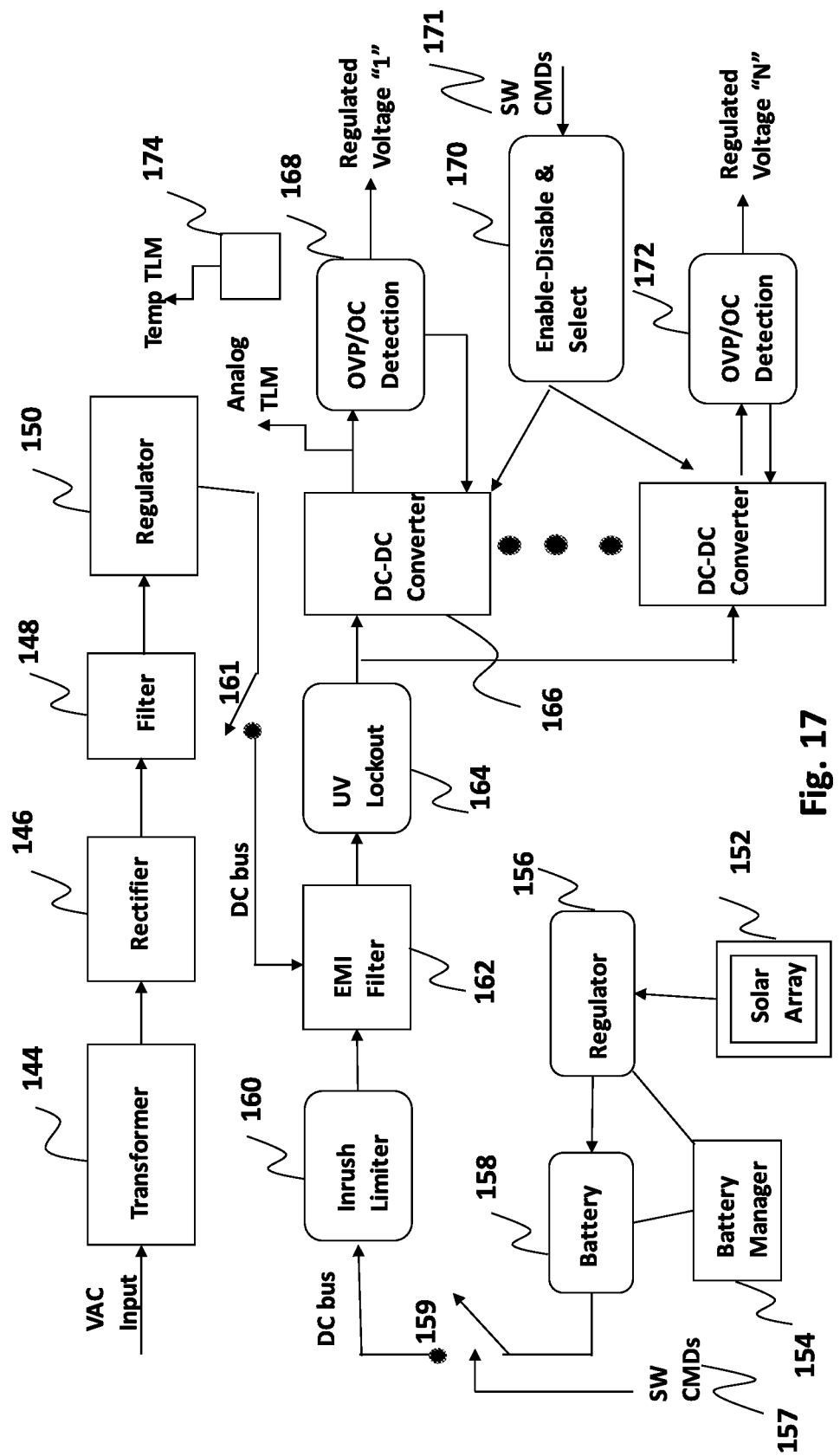
FIG. 17. Functional description and associated hardware of the power supply for the AWI. The power supply will provide all the dc voltages required for the operation of the AWI.

FIG. 17 provides a functional description of the power generation board for the AWI. FIG. 17 provides a description of all the electronic functionalities needed to generate the DC voltages for all the electronics in the AWI. The generated DC voltages may be distributed to all the other boards through a backplane. The power board may generate regulated lower-level DC voltages from either a 120V AC (public utility mains) or DC voltages such as those from solar arrays (17-24V). If the AWI uses the public utility mains voltage of 120V AC, the voltage must be first converted to a DC voltage and then regulated to a lower level voltage as shown in FIG. 17. The 120V AC voltage is converted to a DC voltage using a rectification process that involves first a transformer 144 and then a rectifier 146. Any intermittent voltage noise generated by the rectification process is eliminated via a filter 148. In the use of a voltage regulator 150 the resulting DC voltage is down converted to 24V before fed through an EMI filter 162. The purpose of the EMI filter is to protect the main DC bus voltages (bus voltages shown in FIG. 17) from voltage noise. If the AWI uses DC voltage generated from solar array 152, the voltage may again be regulated using a regulator 156 and a storage battery 158. The battery may be used for power storage since solar power is only partially available. The battery also serves as backup power in case of a power supply emergency. Proper charging of the battery is performed via battery manager 154 which provides charge control of the battery. Bus power (~24V) is channeled to several DC-DC converters 166 to convert the bus voltage to lower levels. The lower level voltages needed are 1.5V, 3.3V, 5V, and 12V. There is a DC-DC converter for the generation of each of these voltages. There are three systems of protection shown in FIG. 17 for the DC-DC converters. These systems of protection disable the DC-DC converters to avoid hardware damage in case of faults and this protection also leverage the capability to re-start the converters and the power supply in general for any type of multiple reasons. Furthermore, these protections also allow to power up in a sequential manner. The first layer of protection is the undervoltage lockout 164. This feature protects the DC-DC converters from being damaged due to a bus voltage that is very low (much less than 24V). The second layer of protection is the overvoltage protection (OVP)/over current (OC) protection 168. Each DC-DC converter has its own OVP/OC as shown in 172. This feature allows the power supply to be protected due to shorts occurring downstream the DC-DC converter including its loads. The last protection feature is the capability to disable the DC-DC converters via software commands 171 which activate enable and disable circuits 170 remotely in the DC-DC converters. The same type of software command is shown on the power switches 159 and 161 which can be disabled or enabled via software commands 157. The switches are used to isolate the two main sources of the bus voltage (solar vs utility mains) depending on the availability. Temperature telemetry (Temp. TLM) 174 of the board is provided via dedicated discrete signal to the analog/digital (A/D) converter of the DSP board.

Figure 18:
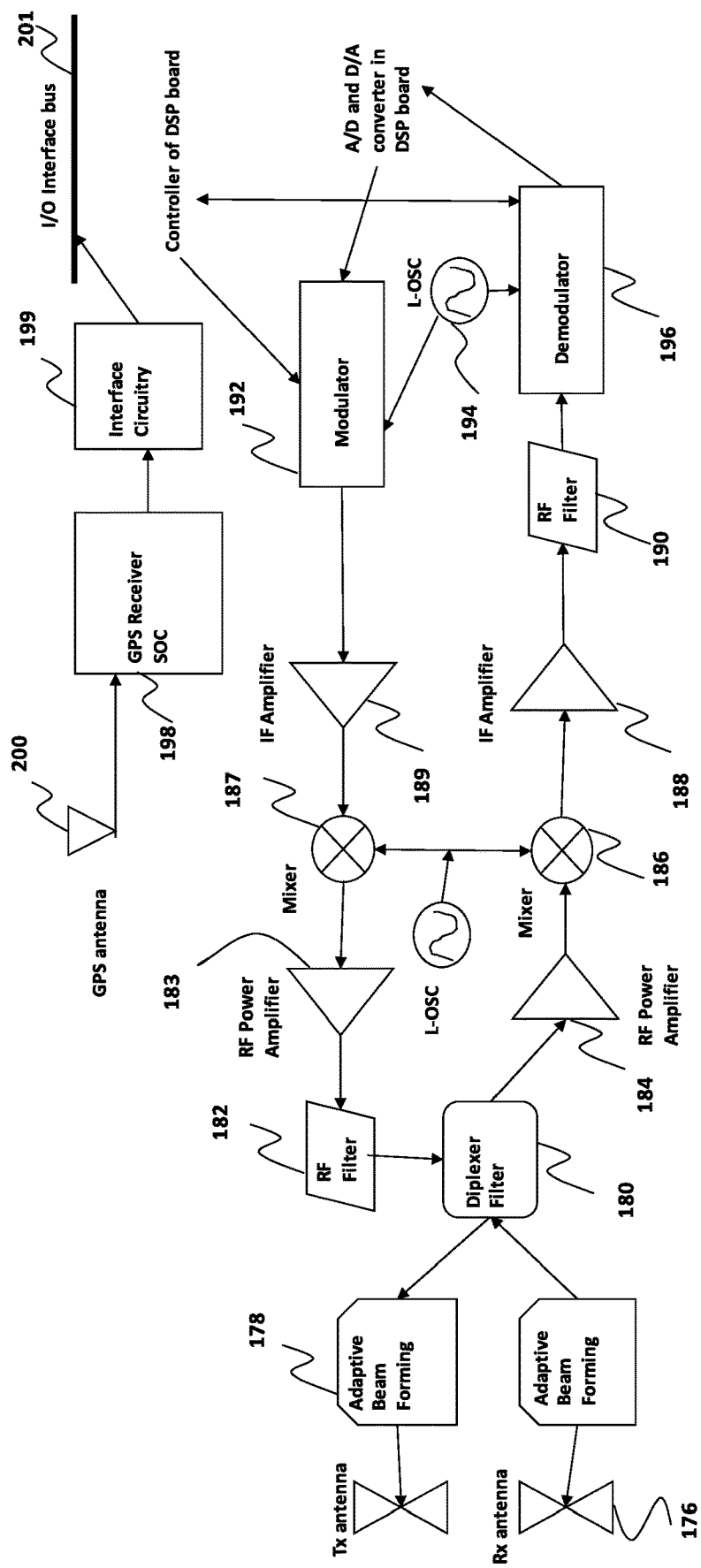
FIG. 18. Functional description and associated hardware of the radio frequency (RF) assembly of the AWI. The RF assembly will provide two-way RF communications between the AWI and AWR. It is the only assembly in the AWI that can communicate with the AWR.

FIG. 18 provides a functional description of the RF transceiver board for the AWI. FIG. 18 provides a description of all the electronic functionalities needed to transmit and receive a RF signal to/from the AWR and the AWI. The RF signal contains the baseband information needed to calculate the position, velocity, and additional data from each AWR. The receiver and transmitter paths contain the smart antennas 176 to communicate with AWRs and AWIs. The antenna to be used is an adaptive beam forming antenna whose gain is sufficiently high to acquire signals from an AWR as far as 100 meters away. The beam forming antennas also have electronic scanning capabilities to track multiple AWRs simultaneously. The smart antennas are aided by an adaptive beam forming network 178 which is discussed in more detail in FIG. 24. A diplexer filter 180 is used to properly channel the transmitted and received signals simultaneously. In the receive path, the weak incoming signal is amplified using a low noise and high gain amplifier 184. Using a mixer 186 the amplified signal is down converted in frequency to the intermediate frequency (IF) and is amplified again using an IF amplifier 188. Since the amplification process generates unwanted frequency side bands, the IF signal may be filtered 190 from all other strenuous RF signals. The IF signals contain the baseband information. The demodulator 196 extracts the useful baseband information provided by the AWR. The baseband information is channeled through an analog to digital (A/D) converter before being sent to digital signal processing (DSP) in the DSP board. In the transmit path, baseband digital information from the DSP goes through the digital to analog (D/A) converter and is then modulated 192. It should be observed that a stable frequency of a local oscillator 194 is needed for both the modulator and demodulator to work accurately and also needed for the mixer. In the reverse process, or the transmitted path, the modulated information is amplified through an IF amplifier 189 and upconverted to a much higher frequency using a mixer 187. The resulting modulated high frequency signal is amplified 183. Since the amplification process generates unwanted frequency side bands, the higher frequency modulated signal must be filtered through an RF filter 182. The ready-to-be transmitted signal uses the same diplexer 180 and a transmitter adapting beam forming antenna network 178 which will be discussed in more detail in FIG. 24. The RF transceiver board also contains a GPS receiver in the form of system on a chip (SOC) block 198. The GPS receiver is connected to its own antenna 200 and interface circuitry 199 is provided for GPS data to be sent to the I/O interface bus 201 which sends the data to the DSP board.

Figure 19:
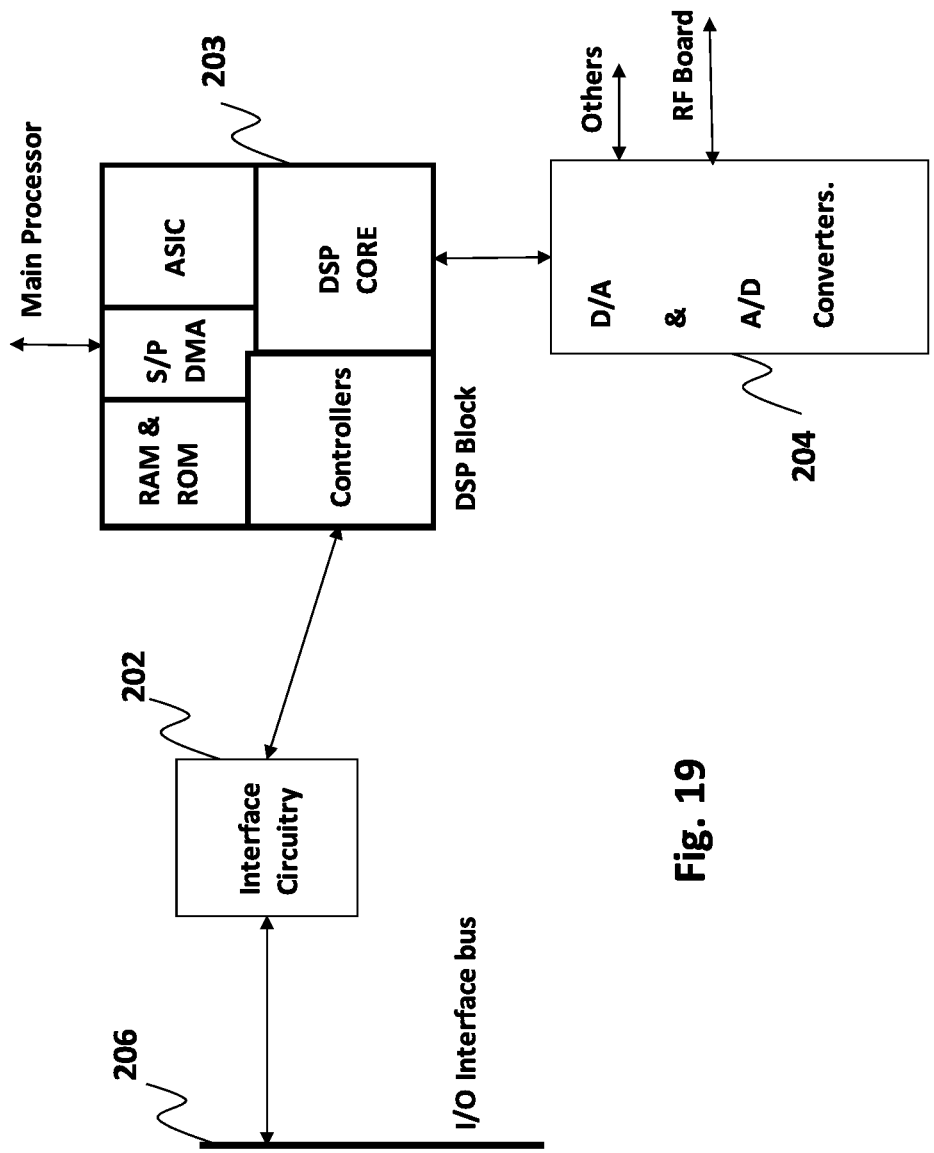
FIG. 19. Functional description and associated hardware of the digital signal processor (DSP) assembly. The DSP assembly processes all communications between the AWI and AWR in useful formats and extracts the valuable data which will allow the AWI and AWR to achieve their goals.

FIG. 19 provides a functional description of the DSP board for the AWI. FIG. 19 provides a description of all the electronic functionalities needed to process all the baseband signals provided by the RF transceiver board and other sources of data from other boards. The DSP board extracts the digital information received from the AWR. The extracted digital information is needed to calculate the position, velocity, and additional data from each AWR. The DSP board also provides the electronics to provide the transceiver RF board with baseband information to be transmitted to the AWR. The work of the A/D & D/A converter 204 was described briefly in FIG. 18. The A/D and D/A converter main function is to process baseband signals coming from and going to the DSP board. The DSP makes the digital information from the baseband signals useful for the computation of position, velocity, and other types of communications between the AWI and AWR. The DSP block 203 contains all the basic elements of the DSP architecture. The DSP block interfaces with the external I/O bus 206 through interface circuitry 202. The DSP block also interfaces with the main processor as shown in FIG. 19. The main processor performs the external control functions acting on the DSP block. The combined elements of the DSP block work as a dedicated central processing unit (CPU) for a specific task. The DSP block processes digitally large quantity of position, velocity, and communication data coming from multiples of AWR on a continuous tracking basis. The complexity of the DSP for this application can be as large as that of processing video data.

Figure 20:
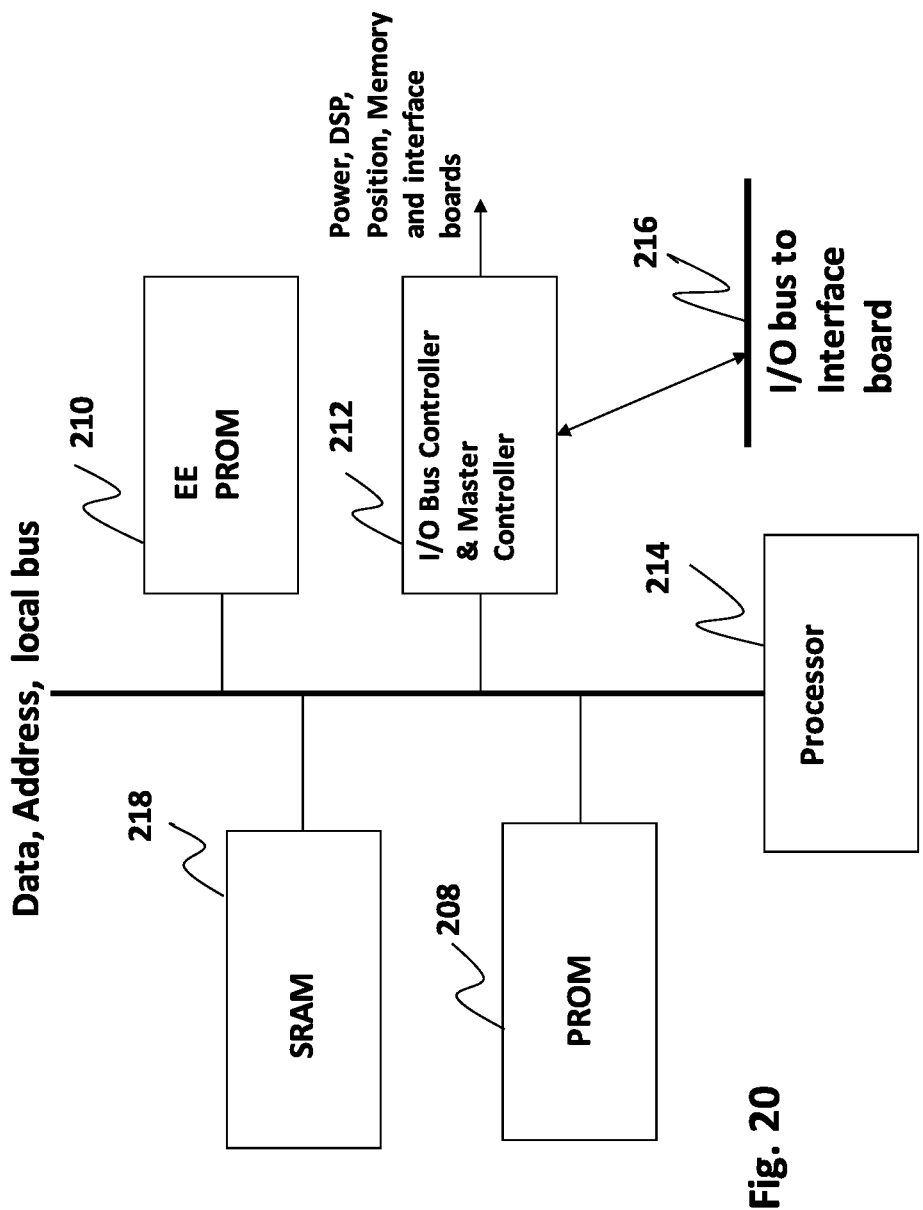
FIG. 20. Functional description and associated hardware of the main processor assembly for the AWI. The main processor assembly controls the I/O interface serial data bus and all the data flow in that bus as well as execution of control instructions on the bus for the other AWI assemblies.

FIG. 20 provides a functional description of the CPU board or main processor board for the AWI. FIG. 20 provides a description of all the electronics functionalities needed to perform the overall control functions of the AWI, which also includes the main control functions for the I/O serial interface bus. The CPU board contains a main processor 214, with its SRAM 218, PROM 208, EEPROM 210, and I/O bus controller 212. The CPU board has self-test diagnostic capabilities and performs in self-test mode, program initialization mode, cold start mode, warm start mode, acquisition and tracking mode. The CPU board may provide I/O interface board servicing via the I/O interface bus 216, DSP control, position measurement control, and mass memory control.

Figure 21:
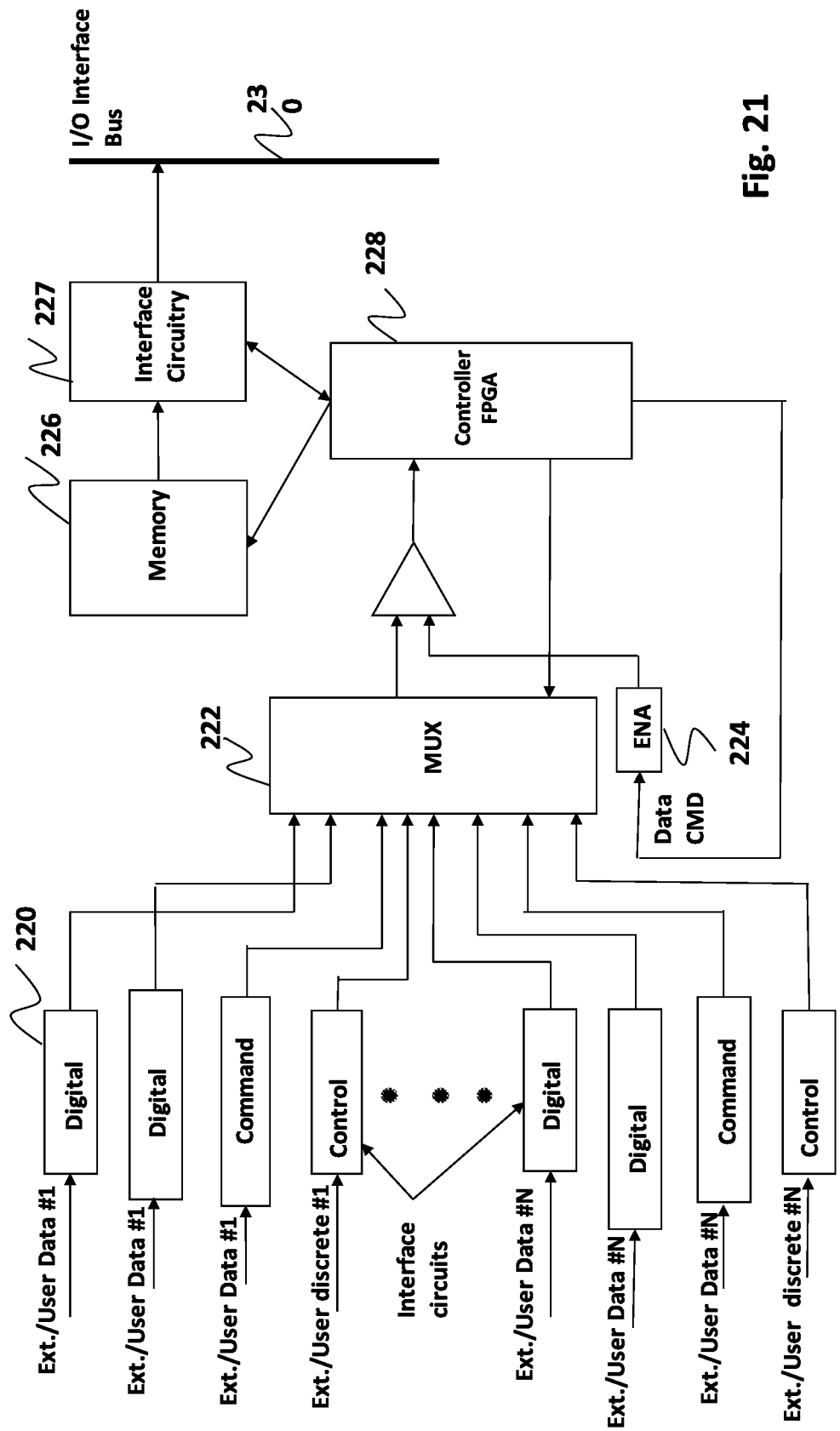
FIG. 21. Functional description and associated hardware of the interface assembly. The assembly provides an interface for all externally generated and user provided information to the AWI. It's the AWI interface to the outside world such as the WWW and external users input.

FIG. 21 is the I/O interface board. The I/O interface board is the AWI portal to the outside world. FIG. 21 provides a description of all the electronic functionalities needed to process data from external sources of information. The I/O interface board extracts and manages the multiple sources of information, such as data, commands, and control signals that arrive to AWI from external sources. The extracted and managed information is needed to help AWI with the many functions that need these external inputs. The I/O interface board is also responsible for channeling the required information to the I/O interface bus which is available to most of the boards in the AWI. External sources of information, that at some point may be needed by the AWI, can be of several types. For example, external information can be in the form of digital data (e.g. information from the WWW and other sources), command signals, and control signals which allows for external user interface. The multiple external sources of information are multiplexed 222 so that one source of information is addressed at a time and collisions of data are avoided. The I/O interface controller 228 provides the control function such as enable transmission 224, for the I/O interface board. The controller also is in change of control functions for memory 226 and interface circuitry 227 in the board. All data is eventually channeled through the I/O interface bus 230. The controller design processes large amounts of data that must first be temporarily stored in memory before buffered out via the interface circuitry.

Figure 22:
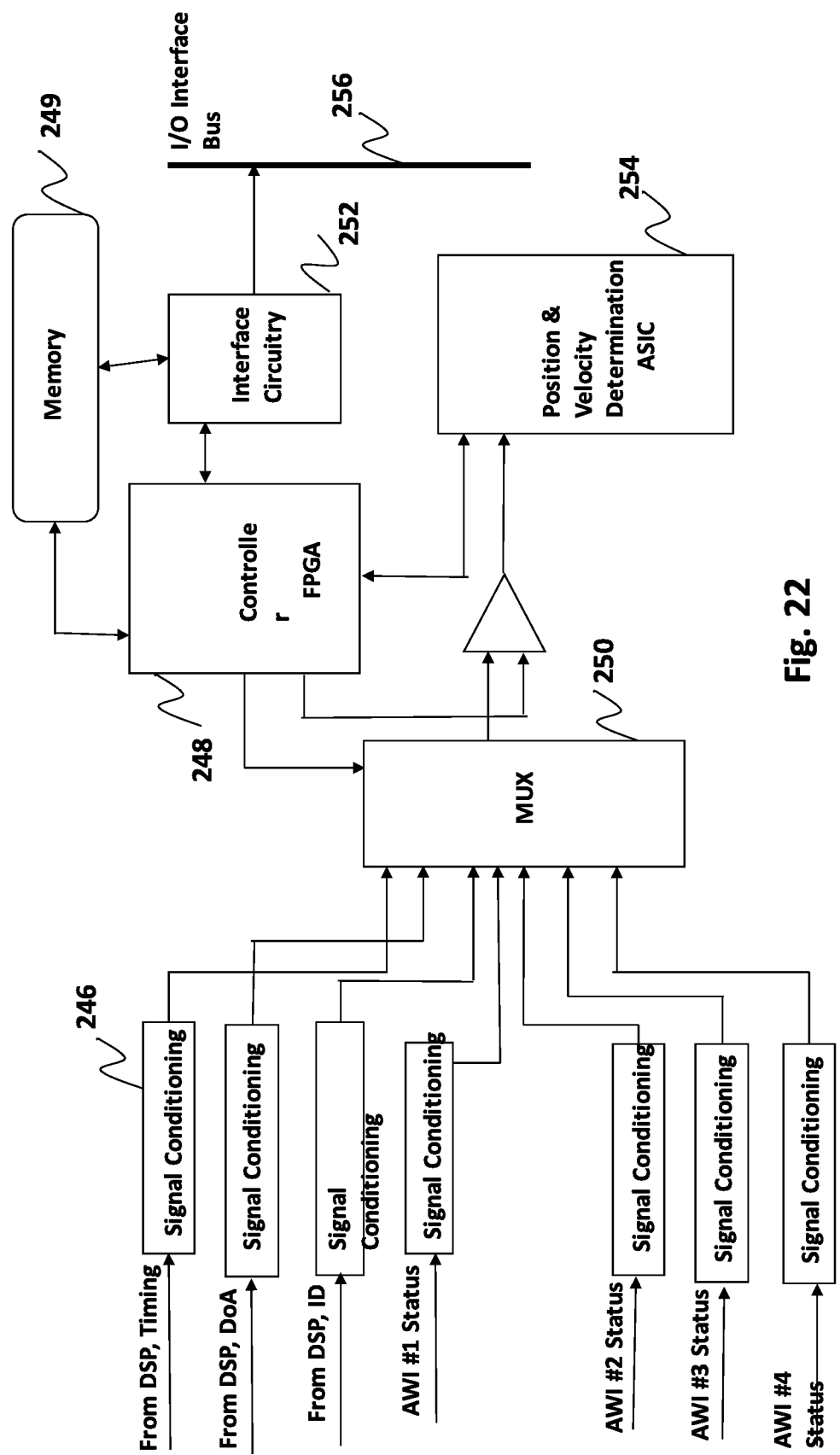
FIG. 22. Functional description and associated hardware describing how the useful data information from each of the AWI and processed by the DSP assembly is used to calculate position, velocity, and direction of motion of an object.

FIG. 22 is the position and velocity determination board. The position and velocity determination board are the AWI board responsible for calculating the position (coordinates), speed, and direction of motion from multiple AWR. The position and velocity determination board are additionally responsible for continuously tracking the multiple AWR. The position and determination board are the most complex boards in the AWI from a design point of view. FIG. 22 provides a description of all the electronic functionalities needed to process data from external sources of information. In FIG. 22 it is shown that signal conditioning circuits 246 interface the position and velocity determination board input signals coming from the DSP board. The DSP board provides four types of data to the position determination and velocity determination board: timing, from which the speed component of the AWR may be obtained; direction of arrival (DoA) from which direction of motion of the AWR, hence velocity, may be calculated; identification of the AWR; and status information from the other three AWIs since all four AWIs may work in synch during the tracking of AWR. All inputs to the position and velocity determination board are multiplexed via a multiplexer 250 to avoid data input collisions in the position and velocity determination board. The multiplexer's data flow is under the management of a controller FPGA 248. The controller FPGA 248 also manages the flow of multiplexed data input to the position and velocity determination ASIC, the board memory, and the interface circuitry to the I/O interface bus. The position and velocity determination are provided by an ASIC chip 254. As a large amount of data is processed from multiple AWRs, the data is first stored in memory 249 and is sourced out via interface circuitry 252 to the I/O interface bus 256.

Figure 23:
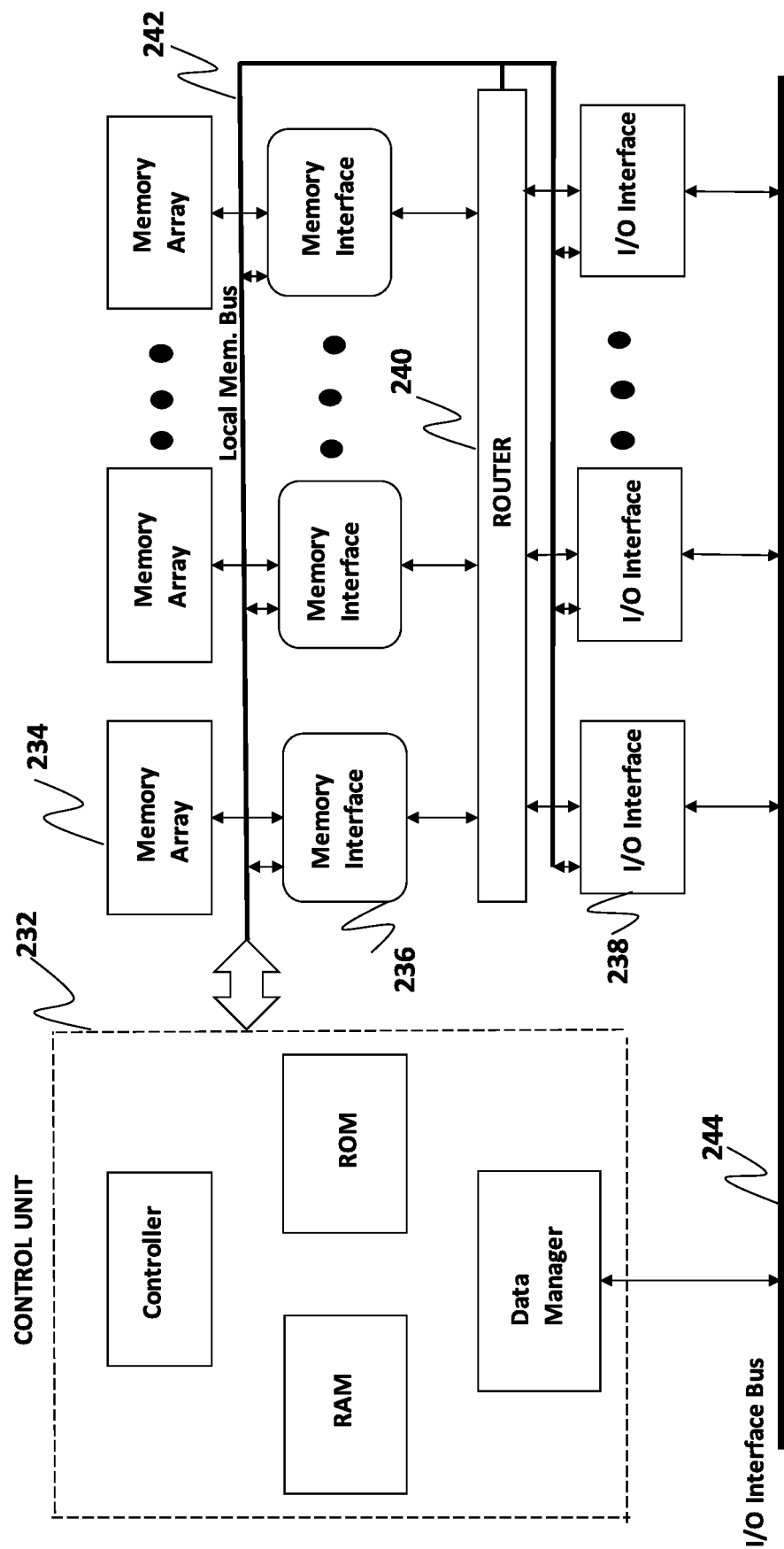
FIG. 23. Functional description and associated hardware for the storage of information (position, velocity, and direction of motion) from multiple objects being continuously tracked by multiple AWI in a continuous manner.

FIG. 23 is the mass memory board for the AWI. The mass memory board is the AWI board responsible for temporary storage of position, velocity, and general data coming into the AWI and flowing through the I/O interface bus. A mass memory board is needed due to the large quantity of data from multiple AWRs which must be tracked simultaneously, plus the potential large quantity of data from external sources and coming through the I/O interface board. The mass memory board has a control unit 232 with its own controller, RAM, ROM, and a data manager which provides a control function to the I/O interface bus 244 and the rest of the board. The other elements of the mass memory, such as the I/O interface 238, memory interface 236, the actual memory components or memory array 234, the internal router 240, and the local memory bus 242 may all be standard design components of mass memory boards.

Figure 24:
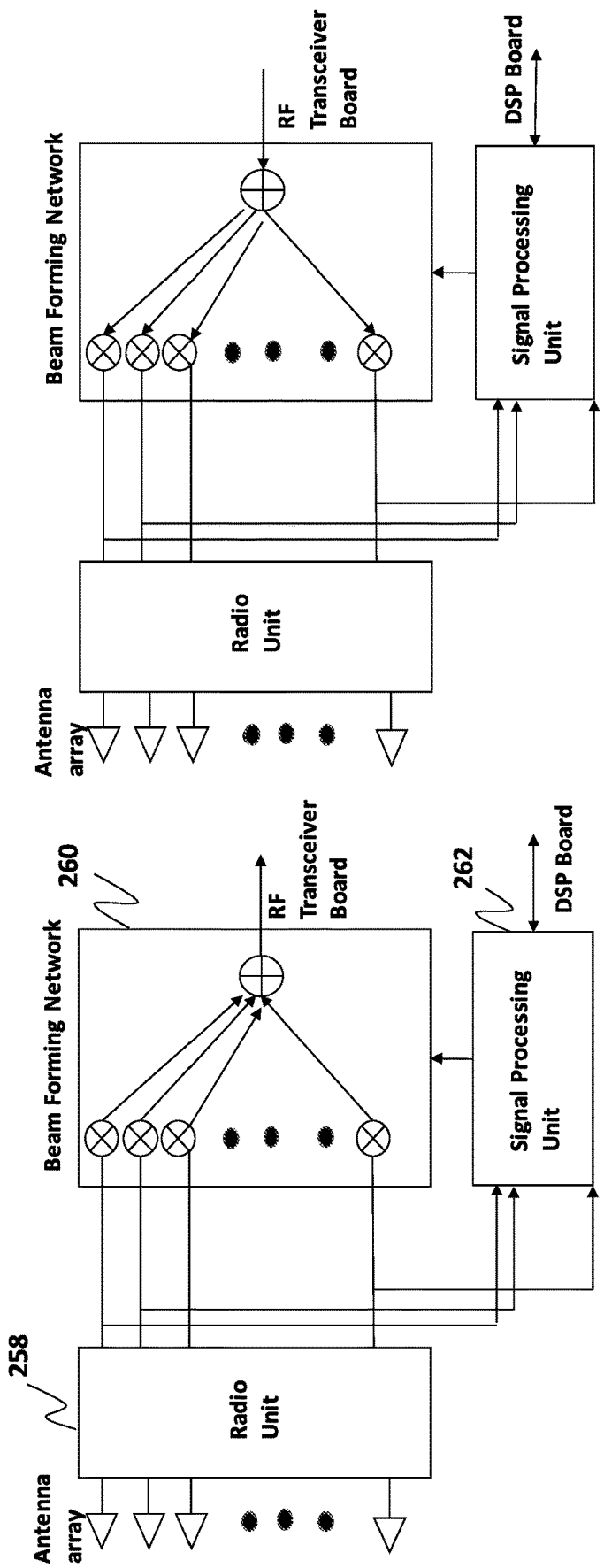
FIG. 24. Functional description and associated hardware for the front end of a smart antenna arrangement (adaptive beam forming) for the simultaneous efficient tracking of multiple objects in motion or stationary.
Figure 25:
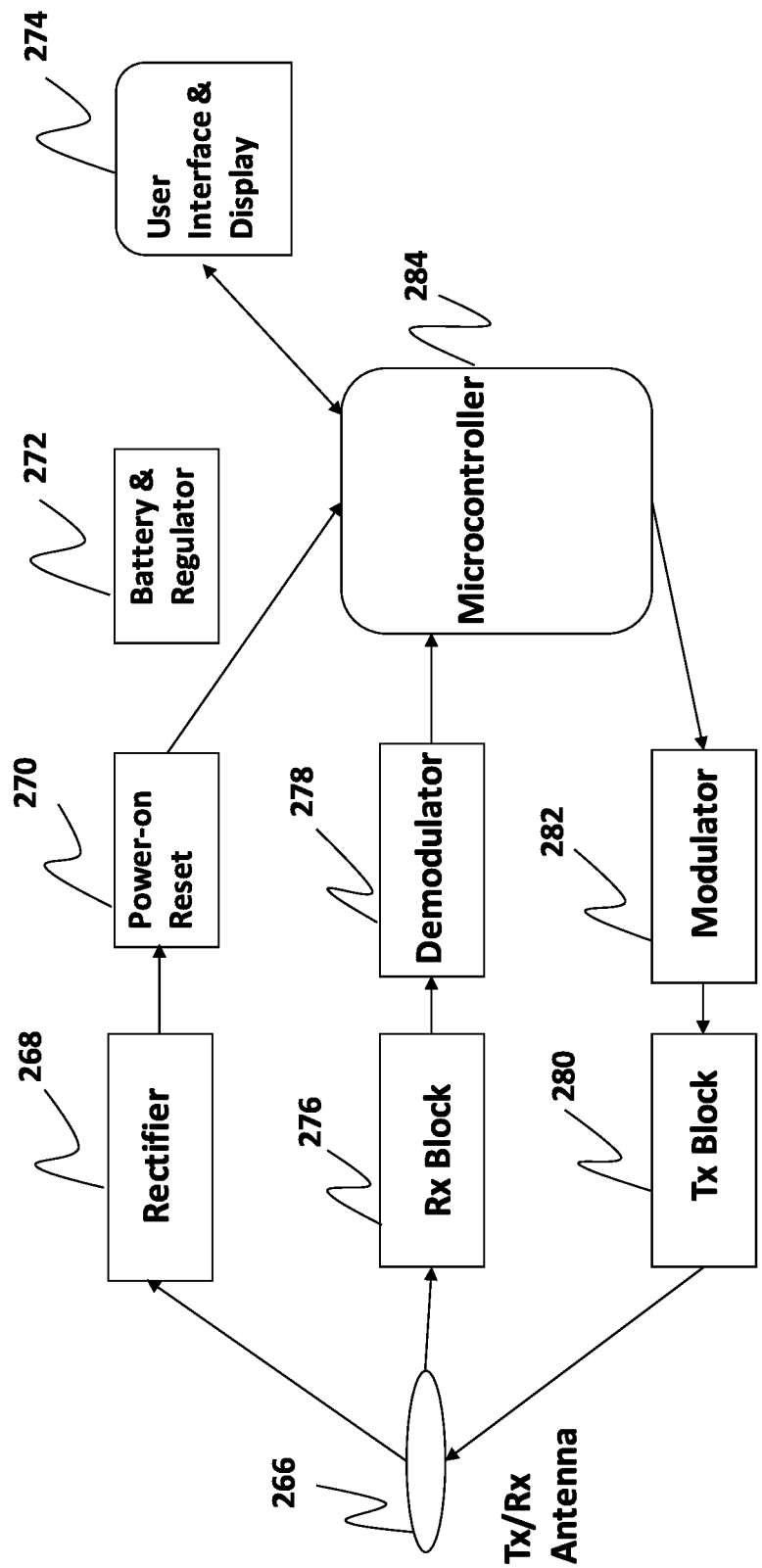
FIG. 25. Functional description and associated hardware of the AWR.

FIG. 24 shows the main functional components of an adaptive beamforming antenna, a type of smart antenna. The design of adaptive beamforming antennas is composed of three main elements. The radio unit 258 contains the antenna arrays and all the matching antenna feed networks. The beamforming network 260 is responsible for electronic steering the beam in the antenna arrays for maximum gain in the chosen direction. Maximum gain is needed due to the possible weak signals from AWRs from as far as 100 meters away. The very fast beam steering can track multiple AWR simultaneously. The beam steering is possible through as signal processing unit 262 which independently commands the steering of the beam in a closed loop architecture. The outputs and inputs of the adaptive beam forming antenna are channeled via the RF transceiver board. The signal processing unit is under the control of the DSP board.

FIG. 25 shows the architecture of the AWR. The AWR may be a small transceiver with some control functions and a user interface. The AWR main function is to provide its location and direction of motion. The AWR contains a simple omni-directional antenna 266. The transceiver block is composed of a receiver 276 and a demodulator 278 for the receiving path of the transceiver, and a transmitter 280 and modulator 282 for the transmitting path of the transceiver. The transceiver may consist of a single chip. The AWR remains off until pinged by the AWI. Therefore, a power on reset 270 may be in the AWR. The pinged input signal from the AWI may be rectified 268 before the-on reset is useful and can be activated. A battery with its regulator 272 may allow the AWR to perform as an active transceiver with a sustainable power source. The AWR also contains a microcontroller 284 which is powered upon activation of the AWR by the AWI. The microcontroller manages the transceiver and a user interface with its display 274.

Figure 26:
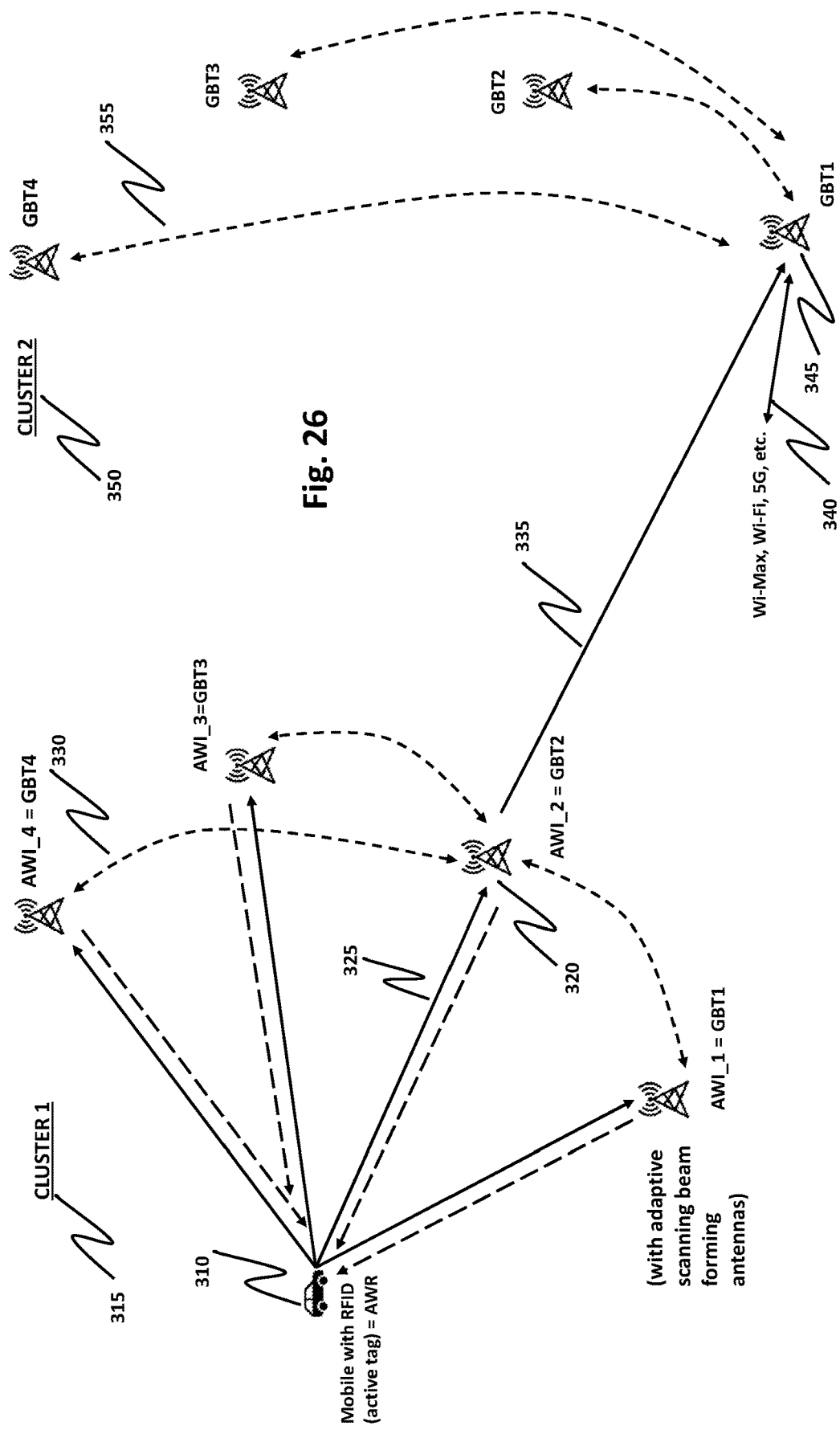
FIG. 26. A mobile with its own RFID (active tag), previously named an Autonomous Wireless Receiver (AWR), enters a Cluster of four (4) Ground Base Transceivers (GBT), previously named Autonomous Wireless Interrogators (AWI). The mobile with its own RFID enters and passes-thru the first Cluster (Cluster 1) of four GBT and then enters and passes-thru a second Cluster (Cluster 2) of four GBT. The tracking of communications between the four GBT and the mobile with its own RFID can be handed over from Cluster 1 to Cluster 2. Communications channels exists among the four GBT in Cluster 1 and also among the four GBT in Cluster 2.

FIG. 26. provides a more detailed extension of FIG. 9. In FIG. 26 the terminology of autonomous wireless interrogators (AWI), shown in FIG. 9, has been replace by the terminology of ground-based transceivers (GBT) because the focus now shifts to ground assets. FIG. 26 illustrates the two-way communications 325 between the mobile, with its RFID (active tag) 310, and the four ground-based transceivers (GBT1 through GBT4) of the first the first cluster (Cluster 1) 315. It is shown in the figure that there is also communication between the GBTs. For example, the figure shows communications between GBT2 320 and GBT4 via a communications channel 330. The figure also shows a communications channel between GBT2 and GBT3, and between GBT2 and GBT1. Per design, GBT1 through GBT4 are identical. Per design, GBT1 through GBT4 are capable of communicating with each other, via a protocol to be discussed later. As the mobile moves from Cluster 1 to Cluster 2 350 communication transfers 335 to a GBT in Cluster 2 (e.g. to GBT1 in Cluster 2 345). This process is called the "handover" which is to be discussed later in detail. As it was for Cluster 1, once the mobile is in Cluster 2 communications will also exists among the GBTs in Cluster 2, as shown, for example, in the figure between GBT1 and GBT4 335. This communication is via a protocol to be discussed later in detail. The figure also shows that external access to the GBTs at any cluster is possible, such as is the case for Wi-Max, Wi-Fi, and 5G devices 340 in Cluster 2. The GBTs have external ports that can be plugged into it for such access.

Figure 27:
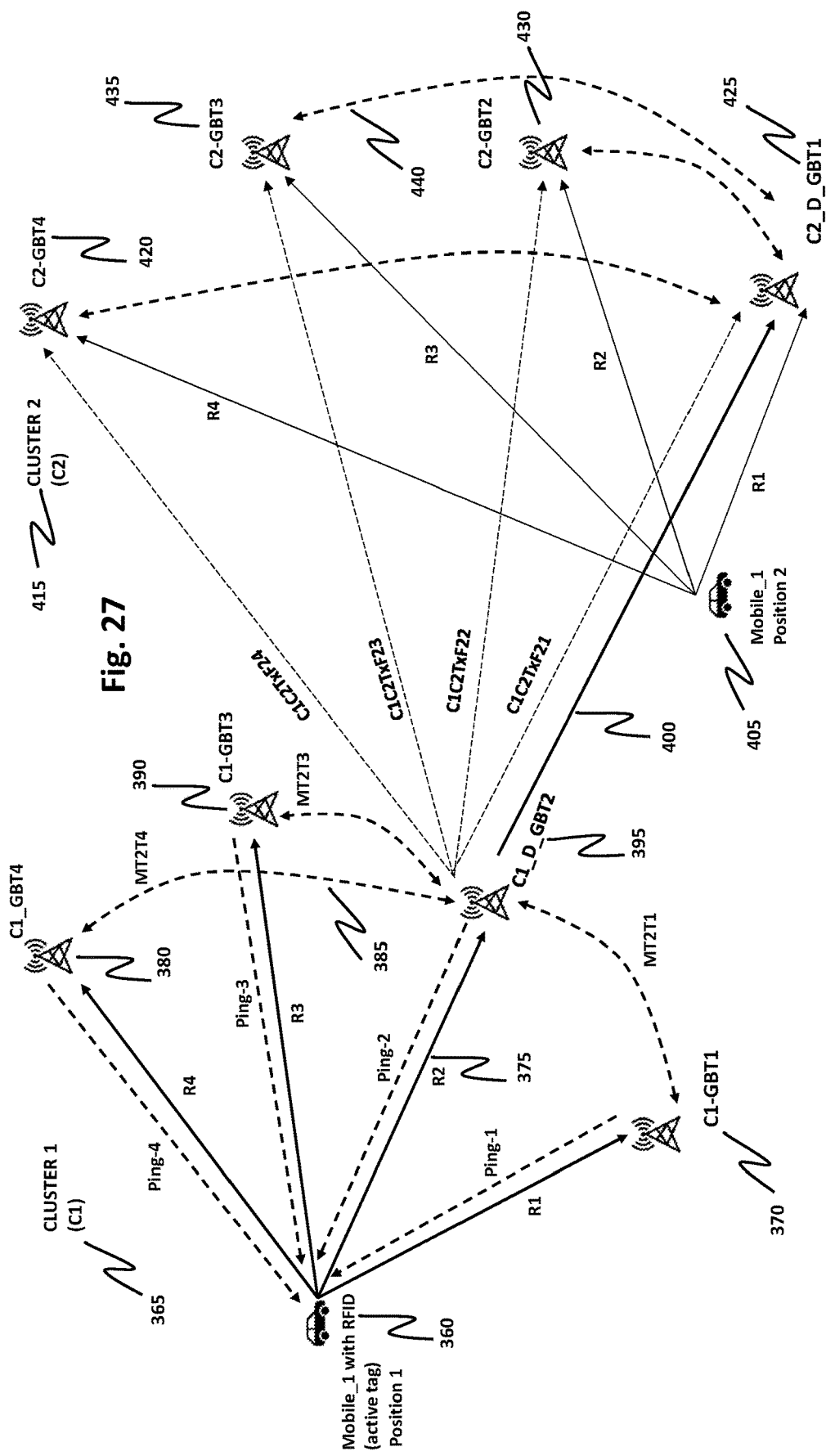
FIG. 27. A mobile with its own RFID (active tag) enters Cluster 1 (C1). C1 is composed of four (4) Ground-Based Transceivers (GBT1 thru GBT4). The mobile with its own RFID communicates with each GBT1 thru GBT4 in C1. Likewise, each GBT1 thru GBT4 in C1 also communicates with the mobile with its own RFID. Communications is also generated among GBT1 thru GBT4 in C1. As the mobile moves from Cluster 1 to Cluster 2 (C2) communication is handle by GBT1 thru GBT4 in C2. The mobile with its own RFID communicates with each GBT1 thru GBT4 in C2. Likewise, each GBT1 thru GBT4 in C2 also communicates with the mobile with its own RFID. Communications is also generated among GBT1 thru GBT4 in C2. In C1 one GBT is named the designated (D) GBT (C1_D_GBT) as shown in the figure for GBT2 (i.e. C1_D_GBT2). In C2 one GBT is named the designated (D) GBT (C2_DGBT) as shown in the figure for GBT1 (C2_GBT1).

FIG. 27 is a much more detailed extension of FIG. 26. The mobile with its RFID (i.e. mobile/RFID) 360 enters Cluster 1 (C1) 365 which is composed (as all the clusters are) of four (4) ground-based transceivers (GBT1 through GBT4). Because these GBTs are part of Cluster 1, they are re-named in the figure as C1_GBT1 through C1_GBT4; 370, 395, 390, and 380 respectively. All GBTs are identical in design.

The locations of the GBTs in any cluster must be such that every GBT in the cluster must be in direct line of sight (LOS) with the mobile/RFID in order to avoid destructive/constructive interfere. Furthermore, every GBT in a cluster must also be in direct LOS with any other GBT in the nearest cluster (in FIG. 27, the nearest cluster will be Cluster 2 (C2)) in order to avoid destructive/constructive interference. Therefore, the location of the GBTs at any cluster must be such that there is not a significant advantage by any GBT over any other GBT concerning communications capabilities with the mobile/RFID or with any other GBT in the nearest cluster. This is an important qualification because all four GBTs in a cluster are needed to calculate position and velocity of a mobile and positionally none of the GBT in a cluster should have an advantage over any other.

As the mobile enters Cluster 1 it can detect signals from up to four GBTs. We classify these signals from the GBTs are "Pings". Therefore, up to four "Pings" can be received: Ping-1 from GBT1 through Ping-4 from GBT4. Eventually, as the mobile/RFID moves well into Cluster 1 it will be able to capture all four Pings. The Pings from the four GBTs in Cluster 1 will be received at different times by the mobile/RFID since the locations of the GBTs are different relative to the position for the mobile/RFID, as the clusters of GBTs are designed in such a way, that it is always true. The timing of the "Pings" from each GBT to the mobile/RFID is yet to be defined, but it is expected the "Pings" from each GBT to be every # of seconds.

Upon signal ("Ping") detection the mobile/RFID provides a response (R). For example, the figure shows response R2 from the mobile/RFID to C1_GBT2 375. The figure shows four responses (R1 through R4) from the mobile/RFID to each of the GBTs.

As previously stated for FIG. 26, FIG. 27 shows two-way communications among the GBTs in Cluster 1. For example, the figure shows two ways communications between C1_GBT2 and C1_GBT4 385. For example, for Cluster 1, such communicates are labeled as follows: MT2T1 means "mutual" communications between GBT2 and GBT1 (notice MT1T2=MT2T1); MT2T3 means "mutual" communications between GBT2 and GBT3 (notice MT3T2=MT2T3); MT2T4 means "mutual" communications between GBT2 and GBT4 (notice MT4T2=MT2T4). Not shown in the figure are MT1T4 (same as MT4T1), MT1T3 (same as MT3T1) and MT3T4 (same as MT4T3).

Each response R1 through R4 from the mobile/RFI to C1_GBT1 through C1_GBT4 respectively, provides "time stamped" timing information for: (1) when did the mobile/RFID first receive the "Ping" from a given GBT (e.g. "Ping-1" from GBT1) as shown in the figure (this is known as time-of-capture or TOC), and (2) when did the mobile/RFID first sent the response R to a given GBT (e.g. R1 to GBT1) as shown in the figure (this is known as time-of-response or TOR). Therefore, each GBT receives both pieces of timing information (TOC and TOR) from a given mobile/RFID. Furthermore, (3) each GBT records its own timing information of when it received the response R from the mobile/RFID (this is known as time-of-arrival or TOA).

In an autonomous manner each GBT sends its own TOC/TOR/TOA ensemble to the other three (3) GBTs. Therefore, each GBT accumulates four (4) sets of TOC/TOR/TOA data; its own, plus the TOC/TOR/TOA ensemble from the other three (3) GBTs. Each GBT performs a heuristic technique where each GBT compares its own TOA with the TOA of the other three GBTs. If its own TOA is higher than any of the other GBTs' TOA, the given GBT goes into a "wait" state. One GBT (the closest one to the mobile) will find its TOA smaller than the TOA of the other three (3) GBTs. The GBT with the smallest TOA will then assume "control" of the cluster and it sends a command to the other GBTs to that effect. The GBT that assumes control of a cluster is called the "Designated" (D) GBT. In FIG. 27, and for illustrative purposes, C1_GBT2 is redefined as C1_D_GBT2 395. The "Designated" GBT (i.e. C1_D_GBT2 in FIG. 27) is responsible for gathering timing data from the other GBTs and use the timing data to perform position, velocity, and relative velocity calculations as the mobile moves through Cluster 1. Therefore, since C1_D-GBT2 in FIG. 27 perform such calculations in a recursive manner, and it is said that the C1_D_GBT2 is responsible for tracking the motion of the mobile/RFID. To increase the accuracy of TOC/TOR/TOA the timing measurements are defined in terms of milliseconds.

As the mobile/RFID moves away from Cluster 1 into the domain of Cluster 2 415 the signal strength of the response (R) signal captured by the C1_D_GBT2 goes below a threshold level. C1_D_GBT2 is then ready to transfer control (handover) to another GBT in Cluster 2. However, a minimum level of signal strength is required of the response signals (R1, R2, R3, R4 in Cluster 2) by each GBT in Cluster 2 before the transfer of control (handover) is accomplished, but when such level is reached, C1_D_GBT2 commands each C2_GBT1 through C2_GBT4 425, 430, 435, 420 (see signals C1C2TxF21 thru C1C2TxF24 in FIG. 27, e.g. C1C2TxF21=signal from C1 to C2 being transmitted (Tx) from GBT2 to GBT1) to start sending "Pings" to the mobile/RFID, and the whole process of acquisition of response signals (R) starts all over again for the GBTs in Cluster 2, and another designated GBT in Cluster 2 will be chosen. In FIG. 27 the designated GBT chosen is C2_GBT1 425. In FIG. 27, and for illustrative purposes, the transfer of control form Cluster 1 to Cluster 2 occurs from C1_D_GBT2 to C1_D_GBT1 400. As it was with Cluster 1, the C2_D_GBT1 in Cluster 2 communicates with each GBT (e.g. 440) in its cluster.

A simple fault management discussion is needed concerning designated GBT (D_GBT). If either C1_D_GBT or C2_D_GBT (or Cn_D_GBT, where "n" is the number of the cluster) hardware fails (permanently or temporarily), the GBT is Cluster 1 or Cluster 2 which received the second fastest TOA will become the new designated GBT. Position and velocity calculations can still be performed with the remaining three (3) GBTs, but the Cn_D_GBT will function with double duty (i.e. that of a D_GBT and a provider of data). Therefore, the design is single-fault-tolerant. The fault management architecture is still in work.

Figure 28:
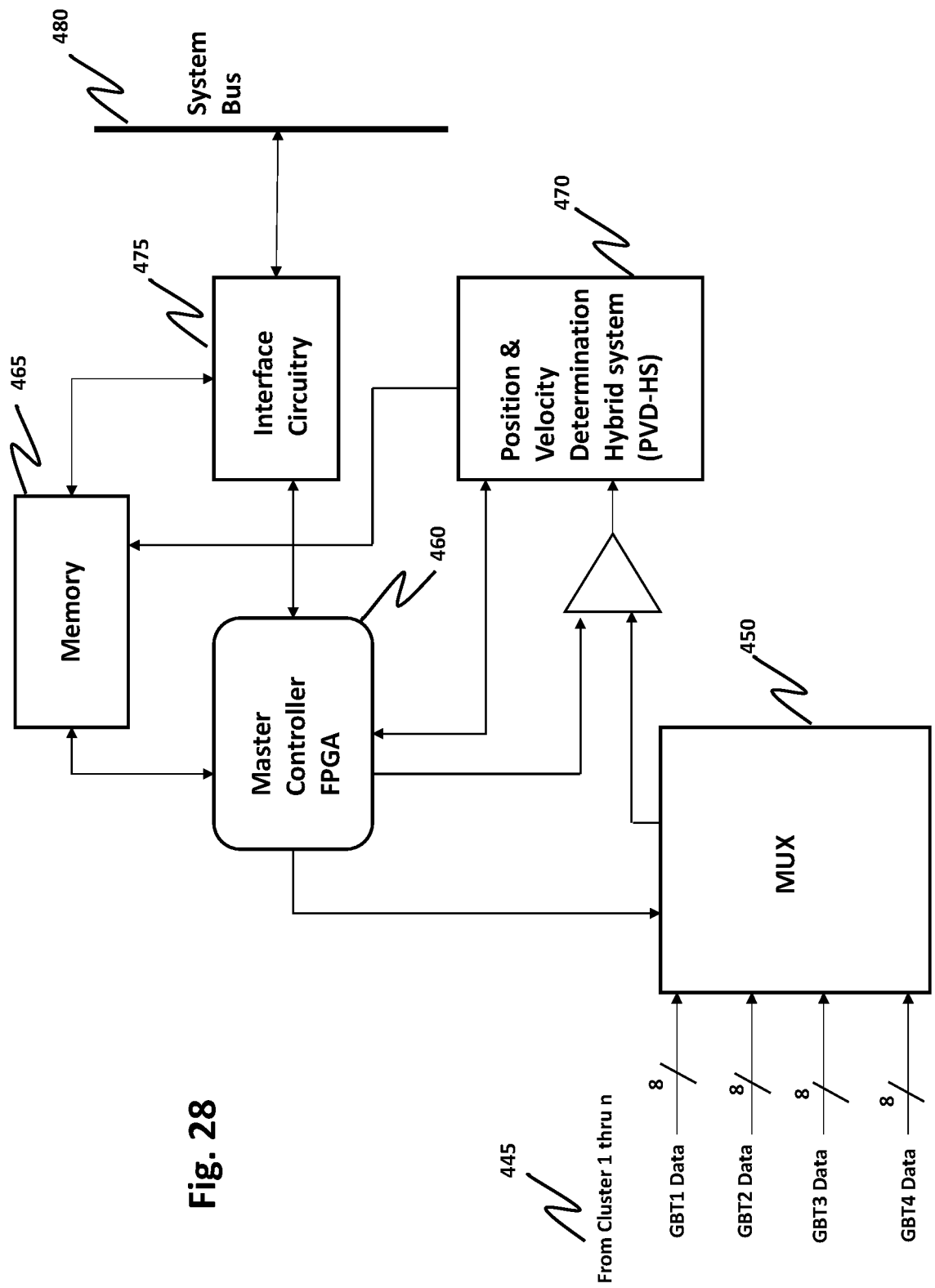
FIG. 28. The hybrid FPGA-Processor chip system for position and velocity determination. The chip calculates continuously the position and velocity of the mobile. The figure contains supporting electronics to accomplish the tasks, such as multiplexers (MUX) which process incoming data from up to four ground-based transceivers (GBT1-GBT4) to be sorted out, a master controller FPGA which coordinates the functions of the other electronics, a memory to hold data in-and-out of the interface circuitry, and an interface electronics which allows the transfer of data to the system bus.

FIG. 28. The figure is a re-do of FIG. 22 which was previously named (in FIG. 22) the position and velocity determination board. Specific Integrated Circuit (ASIC) term (in FIG. 22) has been replaced by a Field Programmable Gate Array (FPGA) and the name of the chip has been changed to Position and Velocity Determination (PVD) Hybrid System (HS), or PVD-HS. The I/O Interface Bus name in FIG. 22 has been renamed System Bus. The different types of data coming into the multiplexer (MUX) has been renamed for simplicity "Data" coming from GBT1 though GBT4.

There is a large volume of data coming into GBT1 through GBT4 in every cluster 445 from the mobile/RFID every # of seconds. The data comes in the form of 8 words (discussed in more details in FIG. 31) into the multiplex/demultiplexer system 450. The data is channeled into the PVD-HS 470 (discussed in more details in FIG. 31) under the control of a master controller FPGA 460. Data needs to be stored temporarily in memory 465 before it is channeled to interface circuitry 475 on its way to the system bus 480. The master controller FPGA coordinates these operations.

Figure 29:
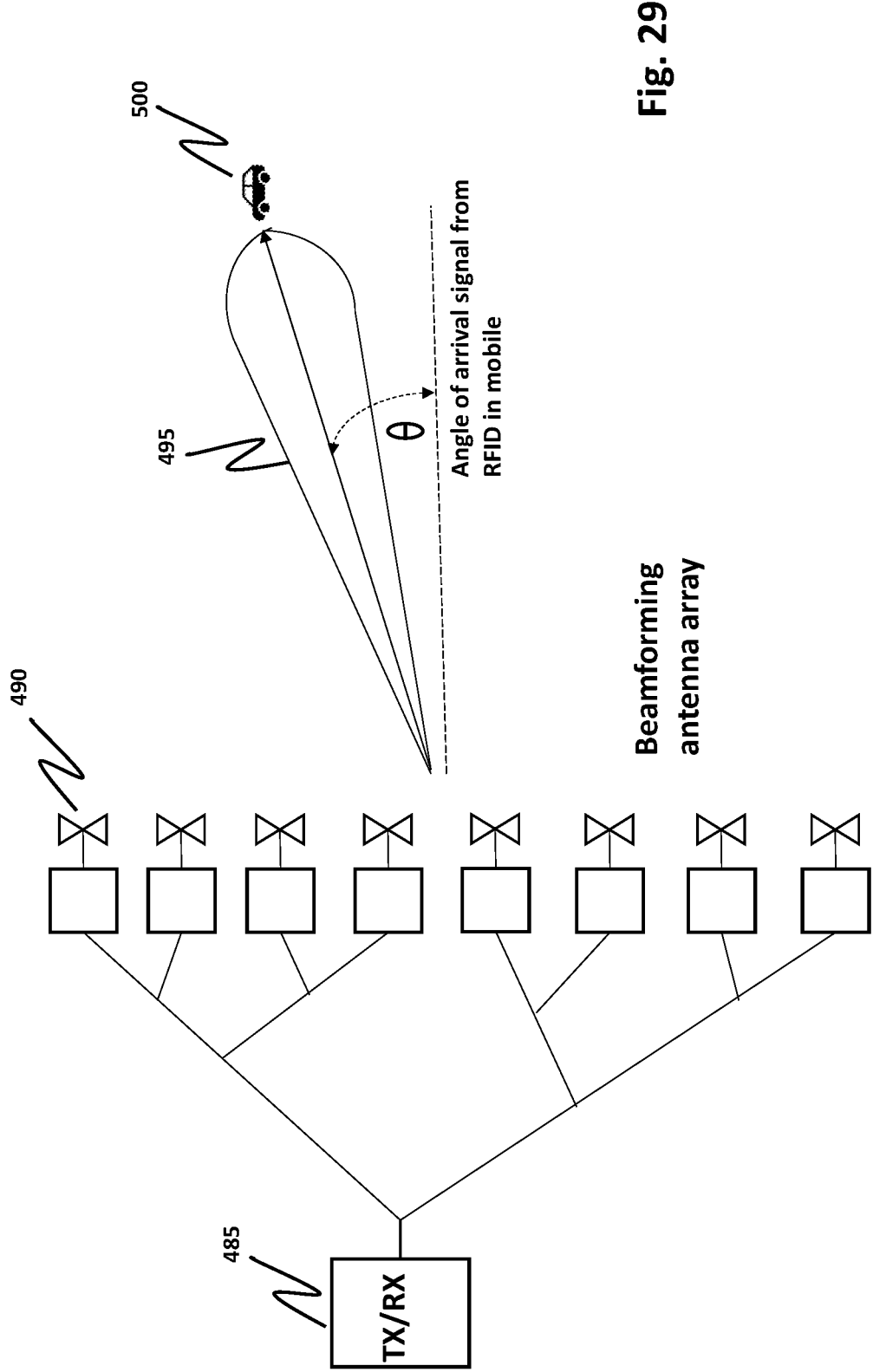
FIG. 29. Illustration of the beamforming antenna array for tracking the direction of motion of the mobile with its RFID. There is a beamforming antenna array in each GBT. The designated GBT (D-GBT) in the cluster measures the angle-of-arrival theta ($\Theta$) between the mobile and the D-GBT. The angle $\Theta$ is used to calculate the relative velocity of the mobile with its RFID (i.e. Velocity (V)=Speed+angle $\Theta$.

FIG. 29 The figure provides a more detailed look at the antenna array of FIG. 24 for the purpose of illustrating a needed data point. The figure illustrates the angle of arrival (AOA) angle theta ($\Theta$) 495 from the mobile/RFID 500 with respect to the designated GBT (D_GBT) in the cluster. Therefore, the AOA starts being measured after a GBT has been selected as the D_GBT. The beamforming antenna array 490 connects directly to the radio unit (Tx/Rx) 485 as shown in the figure. Since the distance (Di) to the mobile from the D_GBTi (where i=1, or 2, or 3, or 4) can be accurately calculated (to be discussed in FIGS. 31 and 32) the directional distance vectors of the mobile with respect to the D_GBTi can be calculated as; $Di\_x=Di*Cos(\Theta)$ and $Di\_y=Di*Sin(\Theta)$. Di_y and Di_x are the directional vector components of the velocity of the mobile; i.e. Velocity of mobile (vector quantity)=Speed+Di_x+Di_y. Furthermore, the relative velocity of two mobiles with respect to each other can be calculated by vector addition/subtraction of Di_x and Di_y of both mobiles and their speeds.

Figure 30:
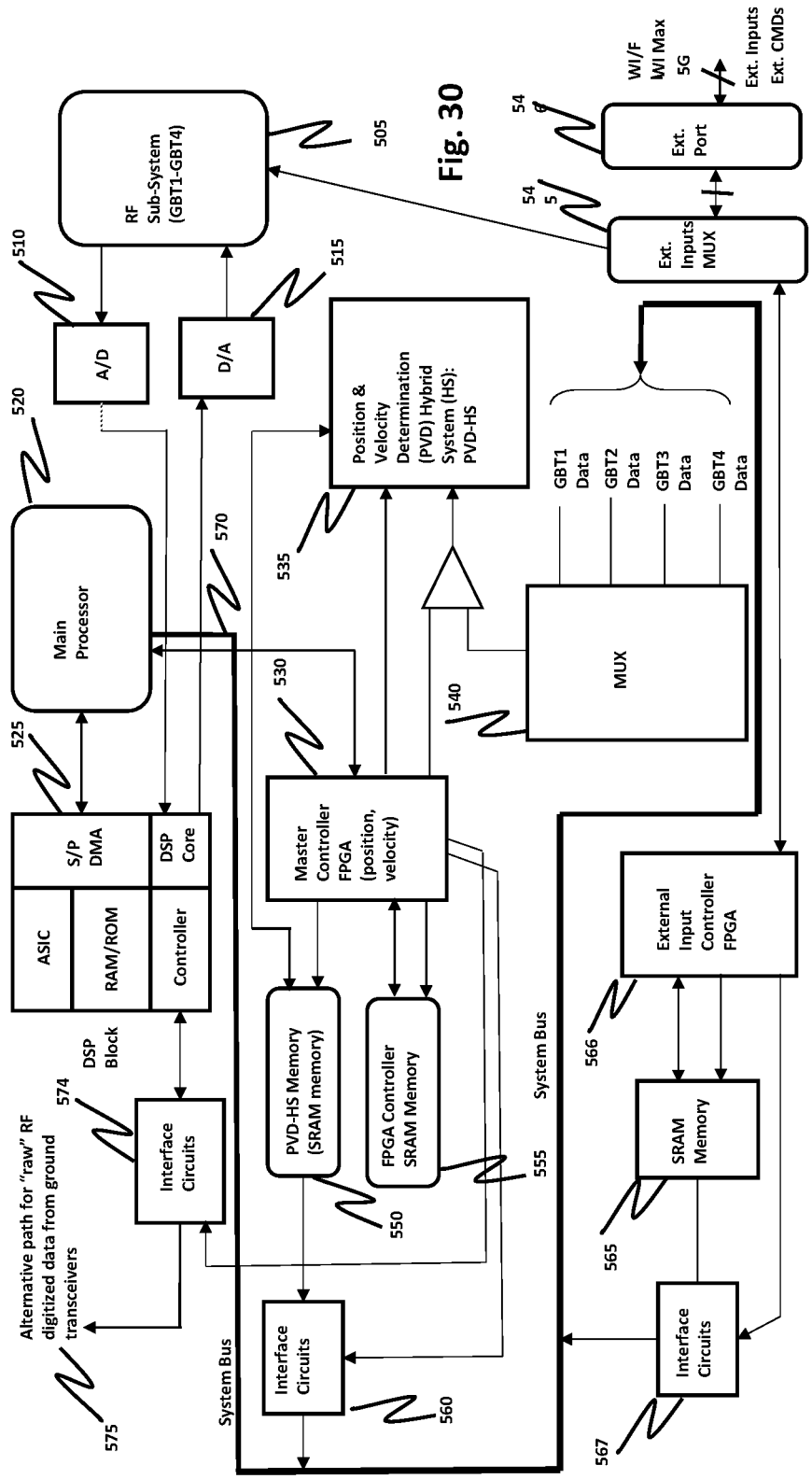
FIG. 30. A system's view of the GBT. There are five (5) major subsystem within the GBT system: (a) the RF sub-system, previously discussed in some details in FIG. 18, (b) the hybrid FPGA-Processor chip sub-system for position and velocity determination, discussed in FIG. 28, and previously addressed, more generally, in FIG. 21 and FIG. 22, (c) the digital signal processing sub-system (DSP block) previously addressed more generally in FIG. 19, (d) main processor sub-system which holds the control of the system bus (the highway by which all data flow). The main processor connects to the DSP block to extract the digitized data from the RF sub-system, and (e) the external interface subsystem which allows communication (data/commands) from external sources (e.g. Wi-Fi, 5G, etc.).

FIG. 30 is a system's view of the GBT. All GBTs are identical in design. There are five (5) major subsystem within the GBT system: (a) the RF sub-system, previously discussed in some details in FIG. 18, (b) the position and velocity determination hybrid sub system (PVD-HS) for position and velocity determination, discussed in FIG. 28, and previously addressed more generally in FIG. 22, (c) the digital signal processing (DSP) sub-system (or DSP block) previously addressed more generally in FIG. 19, (d) main processor sub-system which holds the control of the system bus (the highway by which all data flow) and which was previously addressed in FIG. 20. The main processor connects to the DSP block (also briefly outlined in FIG. 19) to extract the digitized data from the RF sub-system, and (e) the interface subsystem which allows communication (data/commands) from external sources (e.g. Wi-Fi, 5G, etc.) and which was previously briefly addressed in FIG. 21. It also provide the interfaces for moving data into the system bus from the PVD-HS The RF subsystem 505 facilitates the acquisition of the response (R) signals from the mobile/RFID. The RF subsystem send the "Pings" signals to the Mobiles/RFID. The RF subsystem allows for communications among the GBTs within a cluster since such a link is needed for the selection of the D_GBT among the four (4) GBTs in a cluster. The RF subsystem allows for communications of the D_GBT in a cluster with other GBTs in the next cluster, as such communications are needed for the handover procedure when the mobile moves from cluster to cluster. The RF subsystem allows the acquisition of signals (data, commands, etc.) from external sources via a direct external port 546 which is connected to an external inputs' multiplexer 545; such signals can be Wi-Fi, Wi-Max, external inputs/commands. The RF subsystem also contains a GPS electronics which allows for the exact coordinates of any GBT.

The digital signal processing (DSP) subsystem is composed of analog/digital (A/D) 510 and digital/analog (D/A) 515 conversion electronics and a DSP block 525. The analog data coming from the RF subsystem is digitized by A/D converter before being sent to the DSP block (e.g. response (R) signals from the mobile/RFID, a total of 8 words to be discussed in FIG. 31). Digital data from the DSP block can be converted into analog signal by the D/A converter before being sent to the RF subsystem (e.g. the "Pings" signals). The DSP block processes the data from/to the A/D and D/A converters respectively. The DSP block also provides an alternative use of the generated digital data from analog signals 575. The digitized raw data can be sent out for external use (e.g. quality control testing, data quality, troubleshooting, etc.).

The position and velocity determination hybrid sub system (PVD-HS) for position and velocity determination of the mobile is composed of several designs. The sub-system requires three major designs: (1) The FPGA-Processor block 535 which acquires all the data via multiplexer 540 and perform all the functions needed to calculate the position and velocity of the mobile/RFID, (2) a master controller FPGA 530 which manages memory and data pathways to/from the PVD-HS, (3) memory elements for the master controller 550, and for the PVD-HS 555. A more detailed discussion of the PVD-HS subsystem is reserve for FIG. 31.

The main processor subsystem is composed of the main processor 520 and the system bus 570. A brief description of the internal design of the main processor was shown in FIG. 20. The main processor manages the data flow from the DSP to the PVD-HS via the system bus. It is also connected to the master controller FPGA because it is the master controller FPGA that request the data transfer (8 words) to the PVD-HS from the DSP block via the main processor.

The interface subsystem allows: (a) data to move from the PVD-HS to the system bus 560 (data interface will be covered in more details in FIG. 37), and (b) data that was externally received 545, 546 to be also moved into the system 567 bus via external dedicated controller 566, and localized memory 565.

Figure 31:
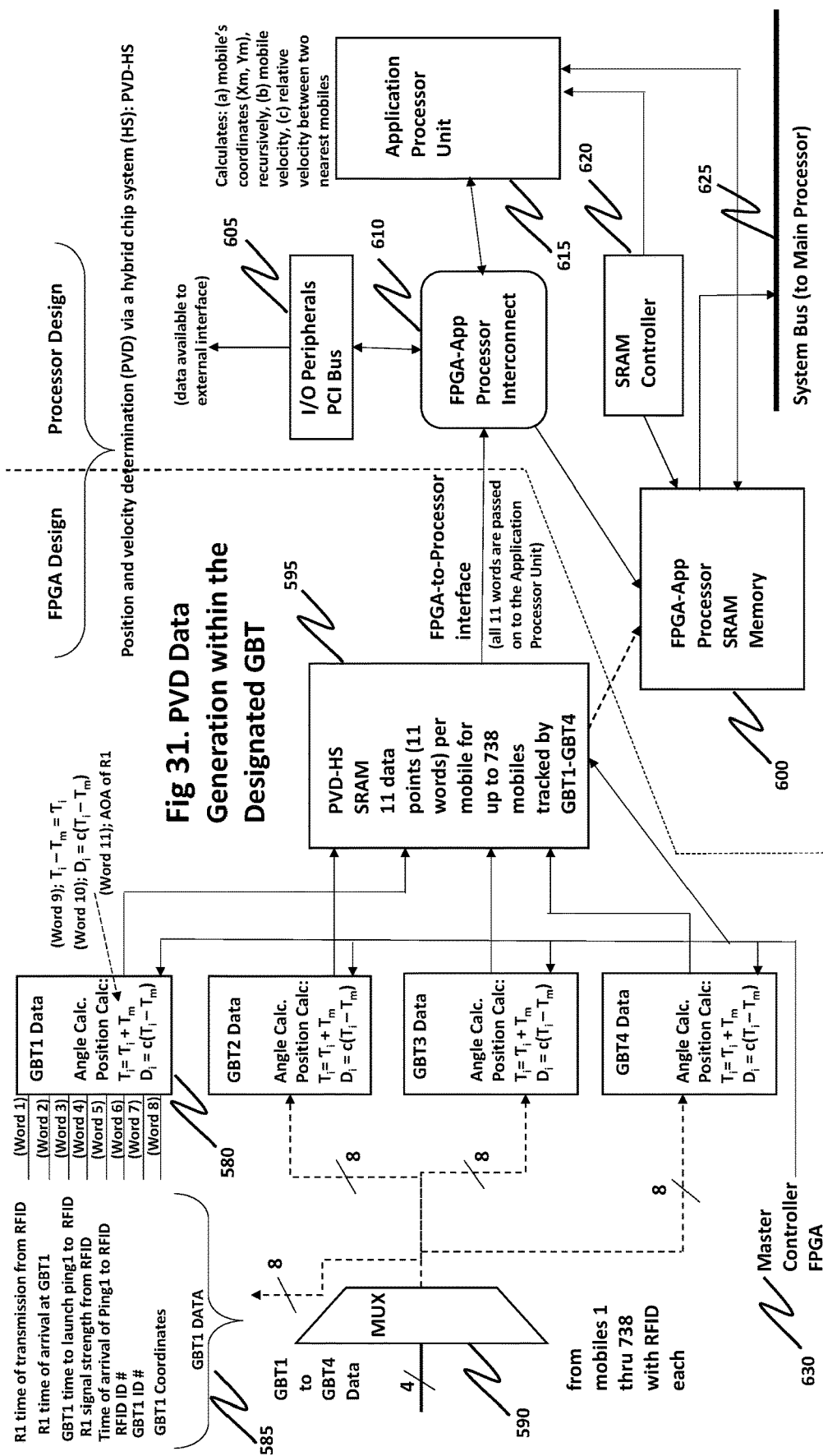
FIG. 31. The design of the position and velocity determination (PVD) hybrid system (HS) for the designated GBT (D-GBT) in a cluster: The PVD-HS/D-GBT system, for a given cluster, is a hybrid combination of FPGA design and a microprocessor design architecture, hence the name HS. The PVD-HS/D-GBT design is composed of four sections: (a) the multiplexer (MUX) interface which gathers 8 data points (words) from each of the 4 GBT in a cluster, (b) an FPGA design which manages the received data from the MUX to calculate timing and position information (2 additional words being generated: timing and position), storing the now 10 words (8+2) in memory and making available the data to an application processor unit, (c) the application processor unit which will calculate the mobile's coordinates with respect to the D-GBT, the mobile velocity, and the relative velocity between the mobile being tracked and its nearest neighbor mobile, and (d) The FPGA-Application Processor Interface which manages the transfer of the 10 words to the application processor unit.

FIG. 31 represents the design of the part of D_GBT responsible for calculating the position, velocity, and relative velocity (PVD-HS) of the mobile within a cluster. The figure represents the design of the PVD-HS which has its own electronic board, known as the PVD-HS board. The PVD-HS is the most complex design within the GBT, it is composed of two parts: (1) an FPGA driven design and (2) a dedicated processor design. The FPGA driven design process incoming data from the GBTs and creates some of its own data. The dedicated processor design takes the processed data from the FPGA driven design and creates additional data of more complex nature, such as the mobile positional coordinates, mobile velocity, and mobiles' relative velocities. The PVD-HS was briefly discussed in FIG. 30. The PVD-HS in FIG. 31 represents a detailed design of the more general design previously shown in FIG. 22.

Timing data, ID data, signal strength of RFD response data, all flow from the three (3) non-D_GBT into the D_GBT. The AOA data (i.e. theta ($\Theta$) angle) originates within the D_GBT as previously explained when discussing FIG. 29. In total, there are 8 words 585, as described in FIG. 31, that arrive to the D_GBT from each of the three (3) non-D_GBT. The PVD-HS provides three (3) words: (a) angle of arrival (AOA) from the mobile/RFID, (b) Word 9, and word 10. Therefore, the words coming into the PVD-HS from the other three (3) non-D_GBT are: Word 1: response (R) time of transmission from mobile (i.e. the time at which the mobile/RFID response to the "Ping" form a GBT, Word 2: response (R) time of arrival at a GBT (i.e. the time, as recorded by the GBT, when the mobile/RFID's response arrives at the GBT, Word 3: T_ping is the recorded time, as recorded by the GBT, when the GBT sends a "Ping", Word 4: signal strength of the response (R) signal from the mobile/RFID, Word 5: recorded time, as recorded by the mobile/RFID, of arrival of Ping to mobile/RFID, Word 6: identification number (ID) of the mobile/RFID whose timing data is recorded from, Word 7: identification number (ID) of the GBT whose timing data is recorded from, Word 8: GPS coordinates of the GBT. Using the "Words" described above, from any given non-D_GBT (FIG. 31 only shows these words for GBT1), the PVD-HS calculates Ti (i=represents the GBT #) which is the time of flight between the mobile/RFID and the GBTi. The PVD-HS calculates the time of transmission at the mobile/RFID (i.e. Word 1), Tm. The PVD-HS uses the time of arrival at GBTi (Word 2) to calculate Ti−Tm=Ti which is Word 9. The PVD-HS calculates the distance Di (Word 10) from the mobile/RFID to the GBTi, $Di=c*(Ti-Tm)=c*Ti$, where c is the speed of light, as shown in 580. Word 11 is angle of arrival (AOA) of response signal (R) from the mobile/RFID to the D_GBT in the cluster.

All data from Words 1 through Word 8 from the three (3) non-D_GBTs are channeled through a multiplexer 590 in the PVD-HS, but it also includes the same words (Words 1 through Word 8) in the D_GBT, which is the reason why the figure shows data coming from all four (4) GBTs. All words (Word 1 through Word 11) are stored in the dedicated internal PVD-HS SRAM 595 which is controlled by the Master Controller FPGA 630 whose functions were addressed in FIG. 30. It is important to know that Words 1 through Word 8 and Word 11 flow through the Systems Bus (addressed also in FIG. 30) from the Main Processor.

All 11 words are passed from the dedicated internal PVD-HS SRAM to the second half of the PVD-HS which is managed by a secondary processor, known as the Application Processor Unit 615. The data transfer is managed by another FPGA design known as the FPGA-App Processor Interconnect 610. Data generated by the Application Processor Unit is stored in the FPGA-App Processor SRAM Memory 600 before being sent to the system bus 625. A memory controller 620 is needed to manage the storage of data from the Application Processor Unit.

The Application Processor Unit in the PVD-HS is responsible for calculating the mobile/RFID coordinates (Xm, Ym) continuously. It is also responsible for calculating the mobile/RFID's velocity, and the relative velocity of a mobile/RFID and its nearest neighbor.

FIG. 31 allows for all data (Words 1 through 11, mobile/RFID coordinates, mobile/RFID velocity, mobile/RFID relative velocity) to be sent to a peripheral device(s) via a PCI bus 605. The approach allows the monitoring of the D_GBT and the three (3) other non-D_GBT performance for diagnostics and troubleshooting purposes. A simplification of this feature was first addressed in FIG. 21.

Figure 32:
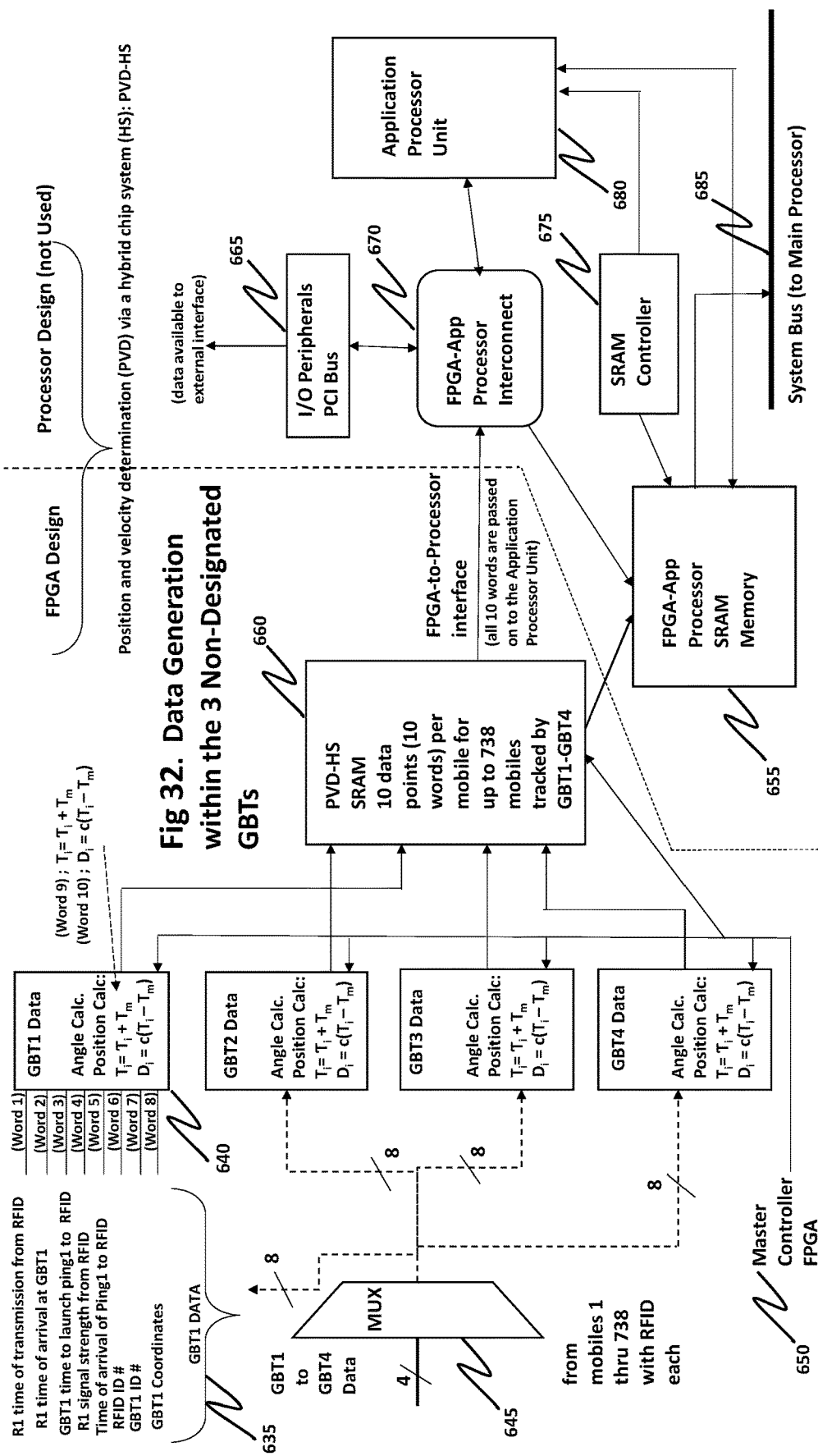
FIG. 32. The design of the position and velocity determination (PVD) hybrid system (HS) for the three non-designated GBT (non-D-GBT) in a cluster: The PVD-HS/non-D-GBT system, for a given cluster, has the same design than the PVD-HS/D-GBT of FIG. 31 because all GBT are of identical design, since any GBT has the capability of being a D-GBT. However, for a non-D-GBT the application processor unit does not make any calculations (mobile's position coordinates, mobile's velocity, mobile's relative velocity) but rather passes the 10 words to the D-GBT.

FIG. 32 The design of FIG. 32 is similar to the design of FIG. 31 because all GBT are identical in design and therefore any GBT is capable of being selected as the D_GBT. However, if a GBT is not selected as the D_GBT only a portion of the PVD-HS hardware is used. If a GBT is not selected as a D_GBT only 10 Words will be generated in the PVD-HS by the hardware 635, 645, 640. The PVD-HS will not calculate the mobile/RFID coordinates, will not calculate the mobile/RFID velocity, will not calculate the mobile/RFID relative velocities (i.e. hardware 670, 665, and 680 will not be used), and will not calculate the AOA of the mobile/RFID (Word 11 in FIG. 31). In essence, if a GBT is not selected as a D_GBT the PVD-HS's "processor design" hardware will not be used and it is automatically bypassed. The 10 Words will flow from SRAM 660 to the FPGA-App Processor SRAM Memory 655 (i.e. from one memory location to another) using the Master Controller FPGA 650. The 10 Words will then flow to the System Bus 685 using the SRAM Controller 675.

Figure 33:
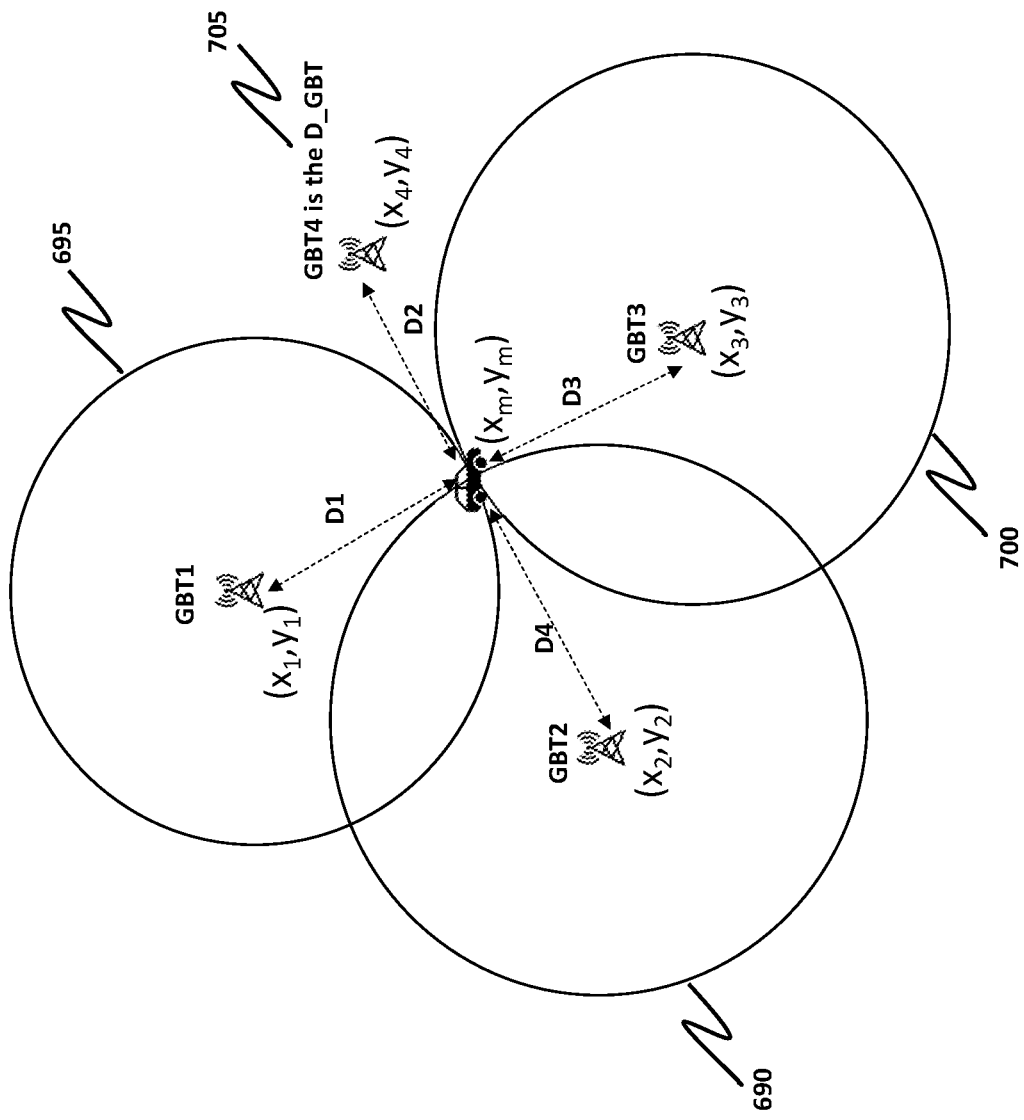
FIG. 33. Three of the GBT of a given cluster are used to constantly calculate the coordinates of the mobile ($X_m$, $Y_m$) with its RFID, as the mobile moves through a cluster. The coordinates of each of the four GBT for a given cluster are known: ($X_1$, $Y_1$), ($X_2$, $Y_2$), ($X_3$, $Y_3$), and ($X_4$, $Y_4$). The distance calculations between each GBT to the mobile are constantly made: $D_1$, $D_2$, $D_3$, and $D_4$ as the mobile moves through a cluster. One of the GBT in the cluster becomes the designated GBT (D_GBT). In the figure, as an example, GBT2 is the D_GBT. The D_GBT gathers all the distance and timing calculation from each of the other three GBT.

FIG. 33 provides the mathematical implementation of the location of the mobile/RFID using 4 GBTs, of which 1 GBT will be the designated GBT (D_GBT4) 705, the other GBTs (GBT1, GBT2, and GBT3) will triangulate 690, 695, 700 the location of the mobile. From FIG. 31 it was observed that we can calculate the distance (Di, where i=1, 2, 3, 4 representing each of the GBT) from the mobile/RFID to any of the GBT, and this is shown in the figure as D1, D2, d3, and D4. The GPS coordinates of the 4 GBTs are known since the RF-subsystem in each GBT (see FIG. 18) has the capability of finding such exact coordinates. Therefore, the GPS coordinates of GBT1 through GBT4 are shown in FIG. 33 as $(X_1, Y_1)$, $(X_2, Y_2)$, $(X_3, Y_3)$ and $(X_4, Y_4)$ respectively.

From the GPS coordinates of GBT1, GBT2, and GBT3 and from the calculated values of $D_1$, $D_2$, and $D_3$, the coordinates of the mobile/RFID $(X_m, Y_m)$ can be calculated as follows:

$$Ym = (X_2-X_3)*\{(X_2^2-X_1^2)+(Y_2^2-Y_1^2)+(D_1^2-D_2^2)\}-(X_1-X_2)*\{(X_3^2-X_2^2)+(Y_3^2-Y_2^2)+(D_2^2-D_3^2)\}/[2*\{(Y_1-Y_2)(X_2-X_3)-(Y_2-Y_3)(X_1-X_2)\}]$$

$$Xm = =(Y_2-Y_3)*\{(Y_2^2-Y_1^2)+(X_2^2-X_1^2)+(D_1^2-D_2^2)\}-(Y_1-Y_2)*\{(Y_3^2-Y_2^2)+(X_3^2-X_2^2)+(D_2^2-D_3^2)\}/[2*\{(X_1-X_2)(Y_2-Y_3)-(X_2-X_3)(Y_1-Y_2)\}]$$

Figure 34:
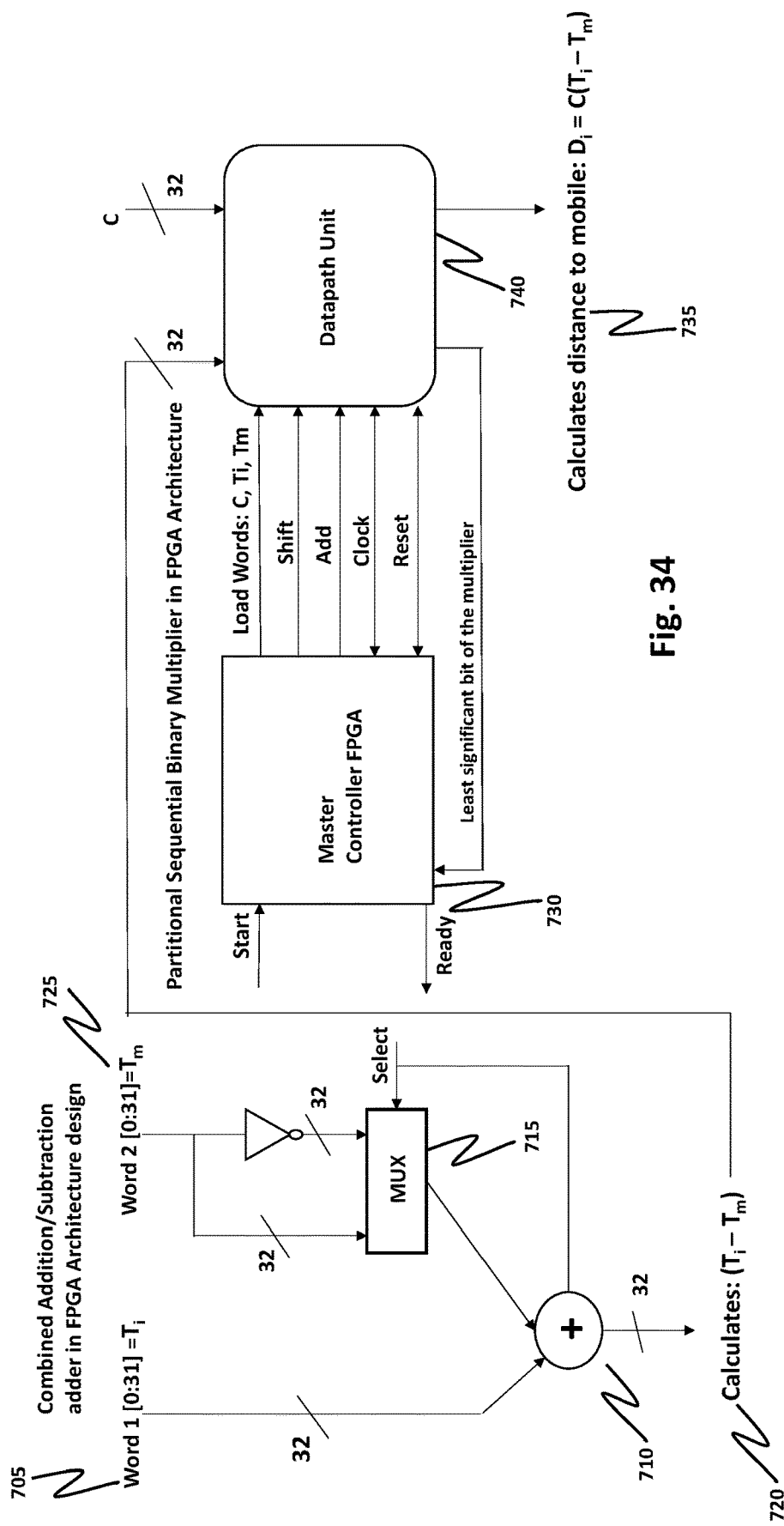
FIG. 34. The figure shows a graphical interpretation of how distance calculations are implemented in an FPGA. The figure shows a graphical implementation of combined addition/subtraction adder in an FPGA architecture. It allows for the calculation of the time difference between the time of arrival (TOA) of the signal from the mobile to a given GBT and the time of transmission of the signal from the mobile (Ti-Tm). The figure also shows a graphical implementation of the multiplier algorithm (partitional sequential binary multiplier) in an FPGA. The multiplier algorithm constantly evaluated the distance (Di) between the mobile and a GBT. The multiplier algorithm is implemented by the Datapath Unit shown in the figure. The timing accuracy is in the order of milliseconds, hence the need to use 32 bits for each word related to timing issues.

FIG. 34 The figure shows a graphical interpretation of how distance calculations are implemented in an FPGA. The figure shows a graphical implementation of combined addition/subtraction adder in an FPGA architecture. It allows for the calculation of the time difference between the time of arrival (TOA) of the signal from the mobile to a given GBT and the time of transmission of the signal from the mobile (Ti−Tm). A hardware implementation in an FPGA implements subtraction of two 32 bits words 705, 725 by adding is complement of the subtrahend to the minuend, and then adding 1 to the result 710. This can be implemented with the architecture shown in FIG. 34. One adder unit can be used for addition or subtraction, depending on the value of the signal select 715. The figure also shows a graphical implementation of the multiplier algorithm (partitional sequential binary multiplier) in an FPGA. The multiplier algorithm constantly evaluates the distance (Di) between the mobile and a GBT. The multiplier algorithm is implemented by the Datapath Unit 740 shown in the figure and a master controller FPGA 730 (the same master controller FPGA of FIG. 30). The timing accuracy is in the order of milliseconds, hence the need to use 32 bits for each word to quantize the timing.

Figure 35:
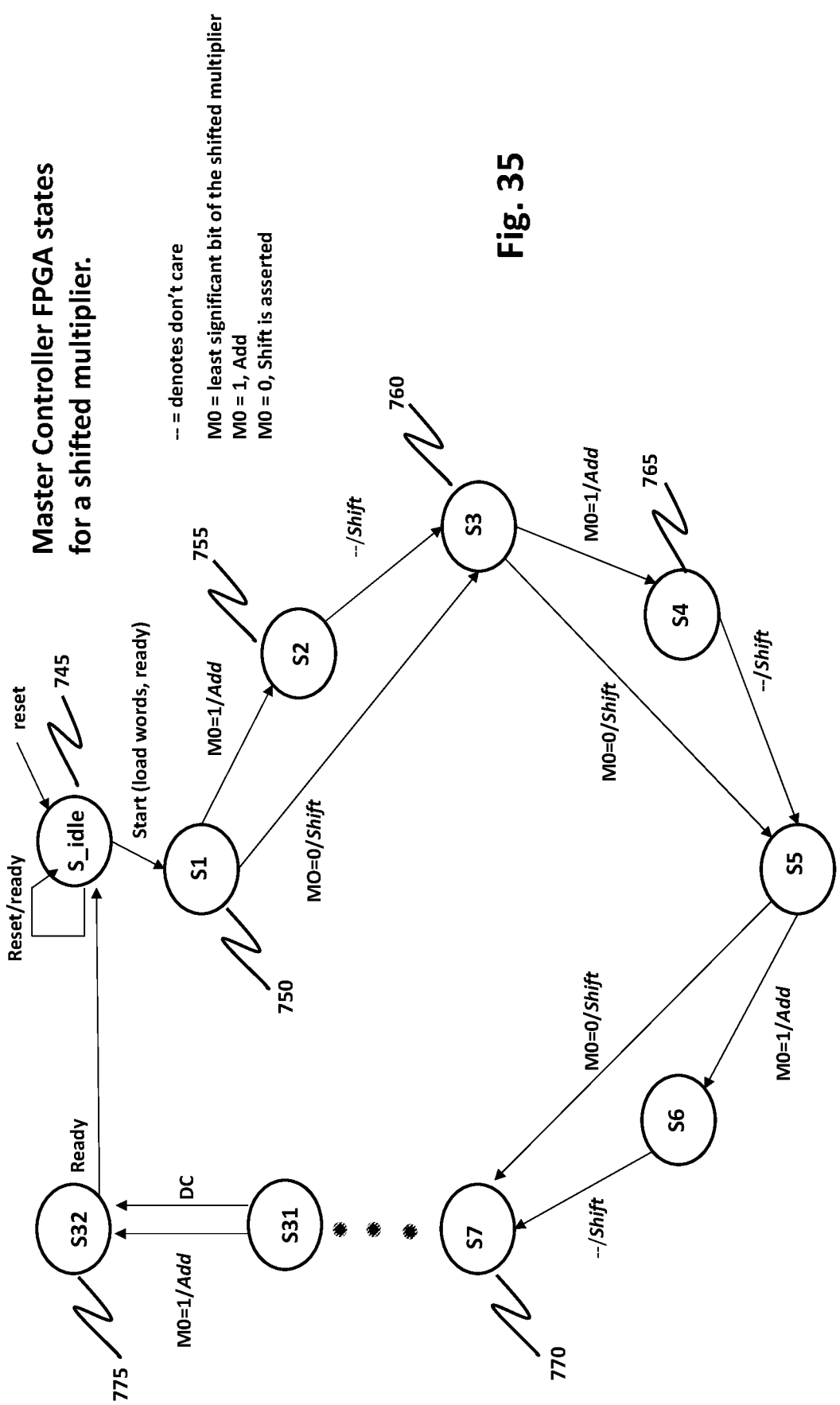
FIG. 35. The sequence of controlling events needed to implement the multiplier algorithm of FIG. 34 is shown in FIG. 35. The controlling events for the multiplier algorithm are implemented by the Master Controller FPGA shown in FIG. 34. The description of the controlling events is shown by the flow diagram of FIG. 35. The controlling FPGA functions consists of 32 steps (or states S1 thru S32) of manipulating bits in a multiplication process for millisecond accuracy.

FIG. 35. The sequence of controlling events needed to implement the multiplier algorithm of FIG. 34 is shown in FIG. 35. The controlling events for the multiplier algorithm are implemented by the Master Controller FPGA shown in FIG. 34. The description of the controlling events is shown by the flow diagram of FIG. 35. The controlling FPGA functions consists of 32 steps (or states S1 thru S32) of manipulating bits in a multiplication process for millisecond accuracy in calculating the distance between the mobile/RFID and a GBT. FIG. 35 is known as a state transition diagram for the controller. State transitions occur during the active edge of the controller's clock and are governed by the conditions outlined in the graph. Under the condition of reset the controller enter an S_idle state 745 from any state and stays there. When the reset/ready state is asserted S_idle moves away and the controller reaches state 1 (S1) 750. From S1 the transitions to other states 755, 760, 765, 770, 775 covering 32 bits depends on M0, the least significant bit of the shifted multiplier. If M0=1, the signal is asserted and a transition is made to a state from which Shift is asserted at the edge of the next active clock. If M0=0, Shift is asserted. When the state S32 is reached, Ready is asserted and at the active edge of the clock, the controller transitions to S_Idle.

Figure 36:
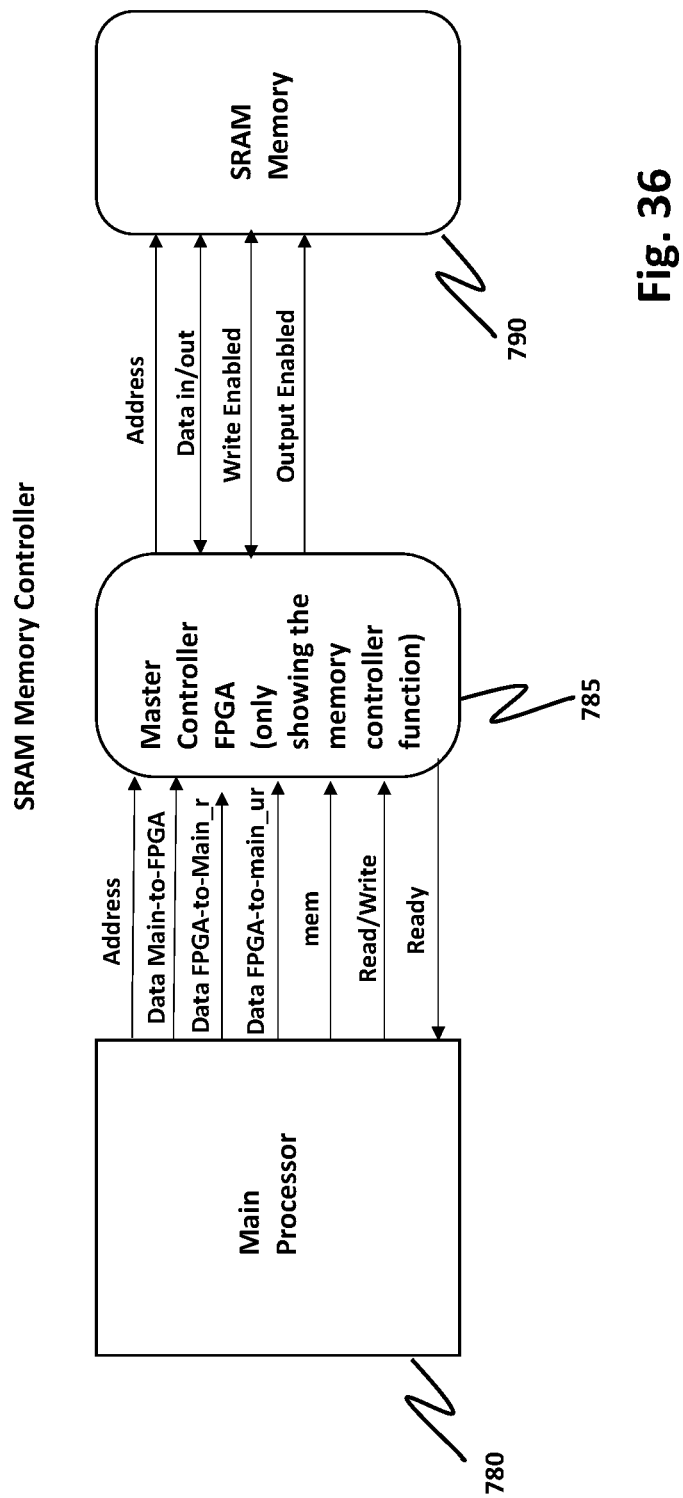
FIG. 36. The main processor, per FIG. 30, exercises a control function on the Master Controller FPGA. Also, per FIG. 30 the Master Controller FPGA exercises a control function on the SRAM memory. Both control functions are illustrated in more details in FIG. 36.

FIG. 36. The figure describes the memory controller function previously outlined in FIG. 30 between the main processor, the master controller FPGA, and memories (PVD-HS memory and FPGA controller SRAM memory). A very preliminary illustration of memory control functions was outlined in FIG. 23. The main processor, per FIG. 30, exercises a control function on the Master Controller FPGA. Also, per FIG. 30 the Master Controller FPGA exercises a control function on the controller SRAM memory and the PVD-HS memory (also SRAM). Both control functions are illustrated in details in FIG. 36 between the main processor 780, master controller FPGA 785, and SRAM memories 790.

Figure 37:
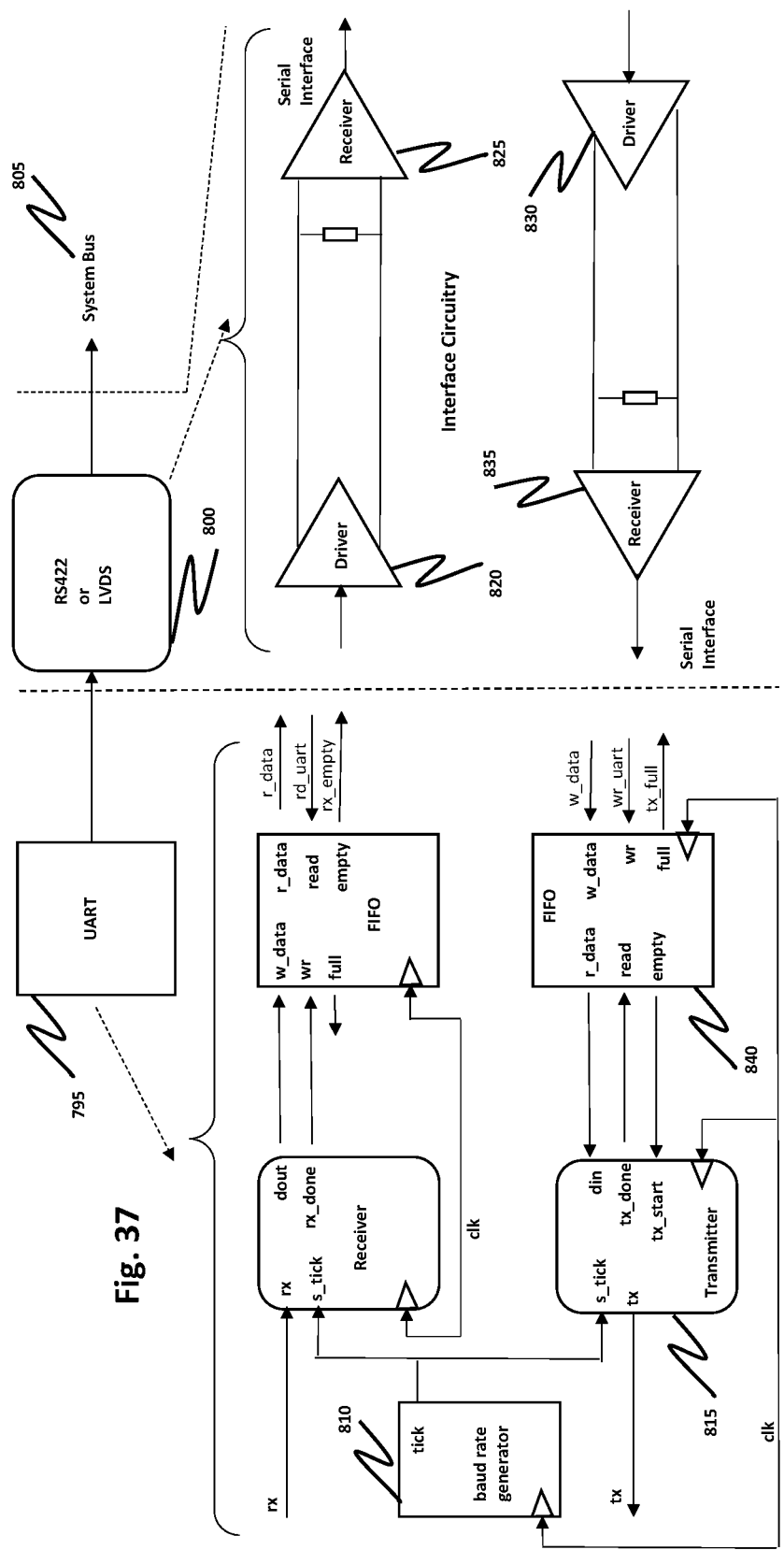
FIG. 37. The figure provides a more detailed description of the "Interface Circuits" block in FIG. 28 and FIG. 30. The figure shows the Universal Asynchronous Receiver Transmitter (UART) design implemented within the following: Master Controller FPGA, External Input Controller FPGA, and the DSP Block Controller, all of which are shown in FIG. 30. The figure also shows the UART connection to potentially two different types of serial data interfaces, both of which are industry standards, the RS422 and the LVDS.

FIG. 37. The figure provides a more detailed description of the "interface circuits" block 475 in FIG. 28 and the "interface circuits" blocks 560, 567, and 574 in FIG. 30. The figure shows the Universal Asynchronous Receiver-Transmitter (UART) 795 design which is implemented within the following FPGAs: Master Controller FPGA, External Input Controller FPGA, and the DSP Block Controller, all of which are shown in FIG. 30. The figure also shows the UART connection to potentially two different types of serial data interfaces 800, the RS422 and the LVDS, both of which are industry standards, and will not be discussed herein. The serial interfaces connect to the system bus 805. The RS422 and the LVDS serial interfaces are composed of driver/receiver pairs to bring the UART signals out 820, 825 or to bring signals into the UART 830, 835. A block diagram description of the UART and its signals is also shown 810, 840, 815 in the figure.

FIG. 38. Provides the formatting details of the 11 Words described in FIG. 31 and FIG. 32. The Words 845. 850, 855, 860, 865, 870, 875, 880, 885, 890, 895 are 64 bits long, of which 32 bits are reserved for timing information and other numerical data.

FIG. 39. Represents the sequence of steps 895, 900, 905, 910, 915, 920, 925, 930, 935, 940, 945 (known as processes: Process 1a thru Process 3a) concerning signal acquisition (from the mobile/RFID) as it enters a cluster of GBTs, signal processing by the four (4) GBTs of the cluster, signal handover from one cluster to another cluster, and signal tracking in general as the mobile/RFID moves through clusters of four GBTs each.

What is claimed is:

1. An arrangement for determining position, velocity, and relative velocity of a ground mobile device with an active radio frequency identification device (RFID), the arrangement comprising:
   a plurality of clusters of ground-based transceivers positioned such that the ground mobile device moves through the clusters, each cluster composed of four ground-based transceivers;
   and an electronic processing apparatus configured to:
      track the mobile device as the mobile device moves through one of the clusters of ground-based transceivers;
      generate timing data consisting of timing parameters including:
         (1) response time of transmission from the RFID;
         (2) response time of arrival of a signal from the RFID at one of the ground-based transceivers;
         (3) the one ground-based transceiver's recorded time to launch a ping to the RFID;
         (4) time of arrival of the ping from the one ground-based transceiver to the RFID;
         (5) angle of arrival of the RFID signal to the one ground-based transceiver; and
      transmit the timing parameters to the active RFID of the mobile device and the one ground-based transceiver, wherein all of the ground-based transceivers in a same said cluster as the one ground-based transceiver are also informed of the timing parameters, and the timing parameters are passed to a next four ground-based transceivers in a next consecutive cluster, wherein additional parameters are generated from the timing parameters to calculate, on a continuous and autonomous basis, the position and velocity of the mobile device.

2. The arrangement of claim 1 wherein each of the four ground base transceivers (GBT) in the cluster exchange timing data with other three ground base transceivers in the same cluster wherein the timing data exchanged are (1) response time of transmission from the RFID, (2) response time of arrival of a signal from the active RFID at a GBT, and (3) the GBT's recorded time to launch a ping to the active RFID, wherein each ground base transceiver has its own acquired timing data and shares such data with the three other ground base transceivers such that each ground base transceiver has its own timing data plus the timing data of the three other ground base transceivers in the cluster.

3. The arrangement of claim 2 where each ground base transceiver (GBT) compares his own acquired timing data with the timing data acquired from the other three GBTs and wherein the GBT that has the lowest timing data is autonomously and self-selected as designated ground based transceiver (D_GBT) wherein the D_GBT manages tracking of the ground mobile device with its active RFID throughout the cluster and calculates, on a continuous and autonomous basis, the position (coordinates), velocity, and relative velocity of the mobile device.

4. The arrangement of claim 3 where the designated ground base transceiver (D_GBT) in a given cluster becomes also the D_GBT for coordinating transfer and the tracking of the mobile device with its RFID from the existing cluster, where the mobile finds itself, to next consecutive cluster where the mobile is traveling to, wherein the D_GBT in the existing cluster coordinates the transfer by establishing a process of managed transmissions (MT) between the D_GBT and each of other four GBTs ins the next consecutive cluster, wherein during the MT, the D_GBT assess signal strength of the mobile device's communications with the D_GBT, as it leaves the exiting cluster, and simultaneously assesses signal strength of the mobile device's communications with each of the next four GBTs as it approaches the next consecutive cluster, wherein, as thresholds of signals strengths are met, the tracking of the mobile is handed over to a new to-be-designated DGBT in the next consecutive cluster.

5. The arrangement of claim 4 includes an arrangement for determining the angle of arrival (AOA) theta ($\ominus$) between the mobile device with its active RFID and beamforming antenna array of each of the ground base transceivers (GBTs), wherein each GBT determines its own $\ominus$ value and communicates this information to each of three other GBTs in the cluster, wherein once the designated ground base transceiver (D_GBT) is selected, the angle $\ominus$ determined by the D_GBT becomes chosen AOA for tracking the mobile device in the cluster, whereas the value of $\ominus$ is decomposed into cartesian or polar coordinates to provide direction of motion for the mobile device and such direction of motion is used in conjunction with the speed of the mobile to calculate the velocity vectors of the mobile device.

* * * * *